United States Patent
Nakahata et al.

(10) Patent No.: US 10,693,387 B2
(45) Date of Patent: Jun. 23, 2020

(54) TRANSFORMER

(71) Applicants: SUMITOMO ELECTRIC INDUSTRIES, LTD., Osaka-shi (JP); NATIONAL UNIVERSITY CORPORATION TOYOHASHI UNIV OF TECHNOLOGY, Toyohashi-shi (JP)

(72) Inventors: Hideaki Nakahata, Osaka (JP); Kenichi Hirotsu, Osaka (JP); Nobuo Shiga, Osaka (JP); Takashi Ohira, Toyohashi (JP); Kyohei Yamada, Toyohashi (JP); Daiya Egashira, Toyohashi (JP)

(73) Assignees: Sumitomo Electric Industries, Ltd., Osaka-shi (JP); National University Corporation Toyohashi University of Technology, Toyohashi-shi (JP)

( * ) Notice: Subject to any disclaimer, the term of this patent is extended or adjusted under 35 U.S.C. 154(b) by 166 days.

(21) Appl. No.: 14/911,245

(22) PCT Filed: Aug. 29, 2014

(86) PCT No.: PCT/JP2014/072706
§ 371 (c)(1),
(2) Date: Feb. 9, 2016

(87) PCT Pub. No.: WO2015/037455
PCT Pub. Date: Mar. 19, 2015

(65) Prior Publication Data
US 2016/0181937 A1    Jun. 23, 2016

(30) Foreign Application Priority Data

Sep. 12, 2013  (JP) .................................. 2013-189648
Jul. 23, 2014  (JP) .................................. 2014-149787

(51) Int. Cl.
  *H02M 5/12*    (2006.01)
  *H02M 5/293*   (2006.01)
  (Continued)

(52) U.S. Cl.
  CPC ............... *H02M 5/12* (2013.01); *H02M 3/06* (2013.01); *H02M 5/06* (2013.01); *H02M 5/293* (2013.01)

(58) Field of Classification Search
  CPC ............ H02M 5/00; H02M 5/02; H02M 5/06; H02M 5/08; H02M 5/10; H02M 5/12;
  (Continued)

(56) References Cited

U.S. PATENT DOCUMENTS

| | | | |
|---|---|---|---|
| 4,203,151 A | | 5/1980 | Baker |
| 4,894,763 A | * | 1/1990 | Ngo .......................... H02J 3/36 318/803 |

(Continued)

FOREIGN PATENT DOCUMENTS

| | | |
|---|---|---|
| CN | 1063892 C | 3/2001 |
| CN | 2798411 Y | 7/2006 |

(Continued)

OTHER PUBLICATIONS

J. Sun, "Unified Analysis of Half-Bridge Converters with Current-Doubler Rectifier", IEEE, 2001.*
(Continued)

*Primary Examiner* — Alex Torres-Rivera
*Assistant Examiner* — Carlos O Rivera-Perez
(74) *Attorney, Agent, or Firm* — Baker Botts, L.L.P.; Michael A. Sartori

(57) ABSTRACT

A transformer is provided between a power supply and a load, and includes a front stage circuit and a rear stage circuit each having a function of performing switching so as to alternately invert a polarity of output relative to input. The
(Continued)

transformer further includes: a series unit provided in at least one of both circuits and composed of a pair of reactance elements connected in series to each other via a connection point; and a switch device which, with both ends of the series unit serving as a first port, causes a part between one end of the series unit and the connection point, and a part between the other end of the series unit and the connection point, to serve as a second port alternately through switching while inverting a polarity, and executes power transmission from the first port to the second port or vice versa.

16 Claims, 53 Drawing Sheets

(51) Int. Cl.
  *H02M 3/06* (2006.01)
  *H02M 5/06* (2006.01)
(58) Field of Classification Search
  CPC ............ H02M 5/14; H02M 5/16; H02M 5/18;
     H02M 5/293; H02M 7/00; H02M 7/003;
     H02M 7/537; H02M 2001/0067; H02M
     2001/007; H02M 2001/0074; H02M
     2001/0077; H02M 2001/008; H02M
     3/155; H02M 3/156; H02M 3/158; H02M
     3/1584; H02M 3/02; H02M 3/06; H02M
     3/04; H02M 5/22; H02M 5/225; H02M
     5/257; H02M 5/2573; H02M 5/2576;
     H02M 5/27; H02M 5/273
  USPC .... 363/15–21.03, 34, 37, 39–43, 50–58, 65,
     363/95–99, 123–134; 323/205–211,
     323/215.216, 222–226, 247–264,
     323/271–276, 282–287, 351, 355–363
  See application file for complete search history.

(56) References Cited

U.S. PATENT DOCUMENTS

| | | | |
|---|---|---|---|
| 5,652,546 | A | 7/1997 | Dent |
| 5,850,337 | A | 12/1998 | Lee |
| 6,462,962 | B1 | 10/2002 | Cuk |
| 8,391,038 | B2 | 3/2013 | Zacharias et al. |
| 8,693,224 | B1 | 4/2014 | Giuliano |
| 8,829,866 | B2 | 9/2014 | Lethellier |
| 9,543,842 | B2* | 1/2017 | Jovcic ............... H02M 3/33584 |
| 9,667,139 | B2 | 5/2017 | Giuliano et al. |
| 2004/0057258 | A1* | 3/2004 | Dobrowolski ........ B05B 5/0531 363/59 |
| 2005/0030767 | A1 | 2/2005 | Phadke et al. |
| 2008/0013351 | A1* | 1/2008 | Alexander .......... H02M 3/1582 363/123 |
| 2009/0278520 | A1 | 11/2009 | Perreault et al. |
| 2010/0202176 | A1 | 8/2010 | Hallak |
| 2011/0049991 | A1 | 3/2011 | Sato et al. |
| 2013/0134777 | A1 | 5/2013 | de Sousa et al. |
| 2014/0063884 | A1 | 3/2014 | Itoh et al. |
| 2014/0063885 | A1 | 3/2014 | Itoh et al. |
| 2014/0239736 | A1* | 8/2014 | Kai ....................... B60L 11/182 307/104 |
| 2016/0129796 | A1 | 5/2016 | Tomura et al. |
| 2016/0234901 | A1 | 8/2016 | Delos Ayllon et al. |

FOREIGN PATENT DOCUMENTS

| | | | |
|---|---|---|---|
| CN | 104426381 | A | 3/2015 |
| CN | 104426382 | A | 3/2015 |
| DE | 202011102068 | U1 | 9/2012 |
| EP | 3041124 | A1 | 7/2016 |
| GB | 155219 | A | 8/1956 |
| JP | 2002-095241 | A | 3/2002 |
| JP | 2010-074931 | A | 4/2010 |
| JP | 2013-146181 | A | 7/2013 |
| WO | WO-2012176006 | A1 * | 12/2012 ........ H02M 3/33584 |

OTHER PUBLICATIONS

English translation of CN2798411.*
J. Sun et al., "Unified Analysis of Half-Bridge Converters with Current-Doubler Rectifier", IEEE, 2001.*
M. Gang et al., "A novel soft switching bi-directional dc/dc converter", IEEE, 2005, pp. 1075-1079. (Year: 2005).*
Homepage of Chuba Electric Power Co., Inc., [Pole Transformer], Internet <URL:http://www.chuden.co.jp/kids/kids_denki/home/hom_kaku/> corresponding to previous <URL:http://www.chuden.co.jp/e-museum/guide/3floor/exhibit_c23.html> [searched on Jul. 19, 2013].
Falcones et al., "Topology Comparison for Solid State Transformer Implementation," Power Energy Society General Meeting, 2010 IEEE, pp. 1-8, Minneapolis, Jul. 2010.
International Search Report in International Application No. PCT/JP2014/072706, dated Nov. 25, 2014.
Kyohei Yamada et al., "Load-Invariant Constant-Voltage-Ratio Transformer without Employing Mutual Inductance," 2013 Proceedings of the Society Conference of IEICE/the Institute of Electronics, Information and Communication Engineers, Sep. 17-20, 2013.
Extended European Search Report in corresponding European Patent Application No. 14843360.0, dated Apr. 13, 2017.
First Office Action issued in counterpart Chinese Patent Application No. 201410460772.3, dated Aug. 25, 2017.
Office Action issued in U.S. Appl. No. 15/509,296, dated Nov. 17, 2017.
Office Action issued in co-pending U.S. Appl. No. 15/509,313, dated Sep. 28, 2017.
Notice of Allowance issued in U.S. Appl. No. 15/509,313 dated Mar. 12, 2018.
Notice of Allowance issued in U.S. Appl. No. 15/509,313 dated Jun. 29, 2018.
Notice of Allowance issued in U.S. Appl. No. 15/509,296 dated Jul. 9, 2018.

* cited by examiner

T TYPE

π TYPE

TRANSFORMER

TECHNICAL FIELD

The present invention relates to a transformer.

BACKGROUND ART

In a commercial AC transmission and distribution system, a transformer is used. Just near a consumer's house, a pole transformer is used which transforms, for example, 6600 V (50 Hz or 60 Hz) to 200 V (see NON PATENT LITERATURE 1). Such a pole transformer has a thick coil as a conductive wire wound around an iron core, and therefore has a considerable weight. For example, a pole transformer with a diameter of 40 cm and a height of 80 cm has a weight of about 200 kg, including an insulating oil and a case.

On the other hand, for realizing a smart grid which is a next-generation power system, studies of an SST (Solid-State Transformer) are being conducted. For the SST, a high-frequency transformer is used (for example, see NON PATENT LITERATURE 2).

CITATION LIST

Non Patent Literature

NON PATENT LITERATURE 1: Homepage of Chubu Electric Power Co., Inc., [Pole Transformer], [online], [searched on Jul. 19, 2013], Internet <URL:http://www.chuden.cojp/e-museum/guide/3floor/exhibit_c23.html>

NON PATENT LITERATURE 2: Falcones, S.: et al., Power and Energy Society General Meeting, 2010 IEEE, pp. 1-8, Minneapolis, July 2010

SUMMARY OF INVENTION

Technical Problem

A conventional pole transformer is heavy, and therefore is not easy to handle. In addition, an attachment space that is large enough to contain the outer dimension of the transformer is needed on the pole.

On the other hand, a high-frequency transformer cannot avoid an influence of a parasitic capacitance, and has a difficulty in designing.

Considering such conventional problems, an object of the present invention is to provide an innovative next-generation transformer with a small size and a light weight, which does not need a coil, an iron core, and the like for magnetic coupling, electromagnetic induction, or mutual inductance as used in a conventional transformer.

Solution to Problem

The present inventions is a transformer provided between a power supply and a load, the transformer including: a front stage circuit having input ports P1 and P2 on a front end side connected to the power supply, and output ports P3 and P4 on a rear end side; and a rear stage circuit having output ports P7 and P8 on a rear end side connected to the load, and input ports P5 and P6 on a front end side. As the front stage circuit, one of the following (F1) to (F5) can be selected:

(F1) a front stage circuit in which both ends of a series unit composed of a pair of capacitors connected in series to each other via a capacitor connection point are respectively connected to the input port P1 and the input port P2, the capacitor connection point being connected to the output port P4, and in which a first switch provided between the input port P1 and the output port P3, and a second switch provided between the input port P2 and the output port P3 are alternately turned on through switching;

(F2) a front stage circuit including a plurality of units each of which is obtained by interposing a capacitor on a line directly connected to the output port P3 in the front stage circuit of (F1), the input ports P1 and P2 of the plurality of units being connected in series to each other, the output ports P3 and P4 of the plurality of units being connected in parallel to each other;

(F3) a front stage circuit in which both ends of a series unit composed of a pair of inductors connected in series to each other via an inductor connection point are respectively connected to the output port P3 and the output port P4, the inductor connection point being connected to the input port P2, and in which a first switch provided between the input port P1 and the output port P3, and a second switch provided between the input port P1 and the output port P4 are alternately turned on through switching;

(F4) a front stage circuit including a plurality of units each of which is obtained by interposing an inductor on a line directly connected to the input port P1 in the front stage circuit of (F3), the input ports P1 and P2 of the plurality of units being connected in parallel to each other, the output ports P3 and P4 of the plurality of units being connected in series to each other; and (F5) a front stage circuit configured to be a full-bridge circuit with four switches so as to receive input through the input ports P1 and P2 and perform output through the output ports P3 and P4.

As the rear stage circuit, one of the following (R1) to (R5) can be selected:

(R1) a rear stage circuit in which both ends of a series unit composed of a pair of inductors connected in series to each other via an inductor connection point are respectively connected to the input port P5 and the input port P6, the inductor connection point being connected to the output port P8, and in which a first switch provided between the input port P5 and the output port P7, and a second switch provided between the input port P6 and the output port P7 are alternately turned on through switching;

(R2) a rear stage circuit including a plurality of units each of which is obtained by interposing an inductor on a line directly connected to the output port P7 in the rear stage circuit of (R1), the input ports P5 and P6 of the plurality of units being connected in series to each other, the output ports P7 and P8 of the plurality of units being connected in parallel to each other;

(R3) a rear stage circuit in which both ends of a series unit composed of a pair of capacitors connected in series to each other via a capacitor connection point are respectively connected to the output port P7 and the output port P8, the capacitor connection point being connected to the input port P6, and in which a first switch provided between the input port P5 and the output port P7, and a second switch provided between the input port P5 and the output port P8 are alternately turned on through switching;

(R4) a rear stage circuit including a plurality of units each of which is obtained by interposing a capacitor on a line directly connected to the input port P5 in the rear stage circuit of (R3), the input ports P5 and P6 of the plurality of units being connected in parallel to each other, the output ports P7 and P8 of the plurality of units being connected in series to each other; and (R5) a rear stage circuit configured to be a full-bridge circuit with four switches so as to receive input through the input ports P5 and P6 and perform output through the output ports P7 and P8.

One of the front stage circuits (F1) to (F5) and one of the rear stage circuits (R1) to (R5) are combined, excluding a combination that the front stage circuit is (F5) and the rear stage circuit is (R5).

Another aspect of the present invention is a transformer provided between a power supply and a load, the transformer including a front stage circuit and a rear stage circuit each having a function of performing switching so as to alternately invert a polarity of output relative to input. The transformer further includes: a series unit provided in at least one of the front stage circuit and the rear stage circuit, the series unit being composed of a pair of reactance elements connected in series to each other via a connection point; and a switch device configured to, with both ends of the series unit serving as a first port, cause a part between one end of the series unit and the connection point, and a part between the other end of the series unit and the connection point, to serve as a second port alternately through switching while inverting a polarity, and execute one of power transmission from the first port to the second port, and power transmission from the second port to the first port.

It is noted that a reactance element is an inductor having an inductive reactance or a capacitor having a capacitive reactance.

In the case of limiting the power supply to a DC power supply, still another configuration is conceivable. That is, the present inventions is a transformer provided between a DC power supply and a load, the transformer including: a front stage circuit having input ports P1 and P2 on a front end side connected to the power supply, and output ports P3 and P4 on a rear end side; and a rear stage circuit having output ports P7 and P8 on a rear end side connected to the load, and input ports P5 and P6 on a front end side.

As the front stage circuit, one of the following (F1) to (F5) can be selected:

(F1) a front stage circuit in which both ends of a series unit composed of a pair of capacitors connected in series to each other via a capacitor connection point are respectively connected to the input port P1 and the input port P2, the capacitor connection point being connected to the output port P4, and in which a first switch provided between the input port P1 and the output port P3, and a second switch provided between the input port P2 and the output port P3 are alternately turned on through switching;

(F2) a front stage circuit including a plurality of units each of which is obtained by interposing a capacitor on a line directly connected to the output port P3 in the front stage circuit of (F1), the input ports P1 and P2 of the plurality of units being connected in series to each other, the output ports P3 and P4 of the plurality of units being connected in parallel to each other;

(F3) a front stage circuit in which both ends of a series unit composed of a pair of inductors connected in series to each other via an inductor connection point are respectively connected to the output port P3 and the output port P4, the inductor connection point being connected to the input port P2, and in which a first switch provided between the input port P1 and the output port P3, and a second switch provided between the input port P1 and the output port P4 are alternately turned on through switching;

(F4) a front stage circuit including a plurality of units each of which is obtained by interposing an inductor on a line directly connected to the input port P1 in the front stage circuit of (F3), the input ports P1 and P2 of the plurality of units being connected in parallel to each other, the output ports P3 and P4 of the plurality of units being connected in series to each other; and (F5) a front stage circuit configured to be a full-bridge circuit with four switches so as to receive input through the input ports P1 and P2 and perform output through the output ports P3 and P4.

As the rear stage circuit, one of the following (R1) to (R5) can be selected:

(R1) a rear stage circuit in which both ends of a series unit composed of a pair of inductors connected in series to each other via an inductor connection point are respectively connected to the input port P5 and the input port P6, the inductor connection point being connected to the output port P8, and in which a first diode provided between the input port P5 and the output port P7, and a second diode provided between the input port P6 and the output port P7 alternately become conductive in accordance with a polarity of input voltage;

(R2) a rear stage circuit including a plurality of units each of which is obtained by interposing an inductor on a line directly connected to the output port P7 in the rear stage circuit of (R1), the input ports P5 and P6 of the plurality of units being connected in series to each other, the output ports P7 and P8 of the plurality of units being connected in parallel to each other;

(R3) a rear stage circuit in which both ends of a series unit composed of a pair of capacitors connected in series to each other via a capacitor connection point are respectively connected to the output port P7 and the output port P8, the capacitor connection point being connected to the input port P6, and in which a first diode provided between the input port P5 and the output port P7, and a second diode provided between the input port P5 and the output port P8 alternately become conductive in accordance with a polarity of input voltage;

(R4) a rear stage circuit including a plurality of units each of which is obtained by interposing a capacitor on a line directly connected to the input port P5 in the rear stage circuit of (R3), the input ports P5 and P6 of the plurality of units being connected in parallel to each other, the output ports P7 and P8 of the plurality of units being connected in series to each other; and (R5) a rear stage circuit configured to be a full-bridge circuit with four diodes so as to receive input through the input ports P5 and P6 and perform output through the output ports P7 and P8.

One of the front stage circuits (F1) to (F5) and one of the rear stage circuits (R1) to (R5) are combined, excluding a combination that the front stage circuit is (F5) and the rear stage circuit is (R5).

Advantageous Effects of Invention

Using the transformer of the present invention as a power transformer makes it unnecessary to use a conventional transformer including a coil, an iron core, and the like. Therefore, it becomes possible to realize drastic size reduction and weight reduction of a transformer, and thereby realize cost reduction.

DESCRIPTION OF EMBODIMENTS

Summary of Embodiments

Figure 1:
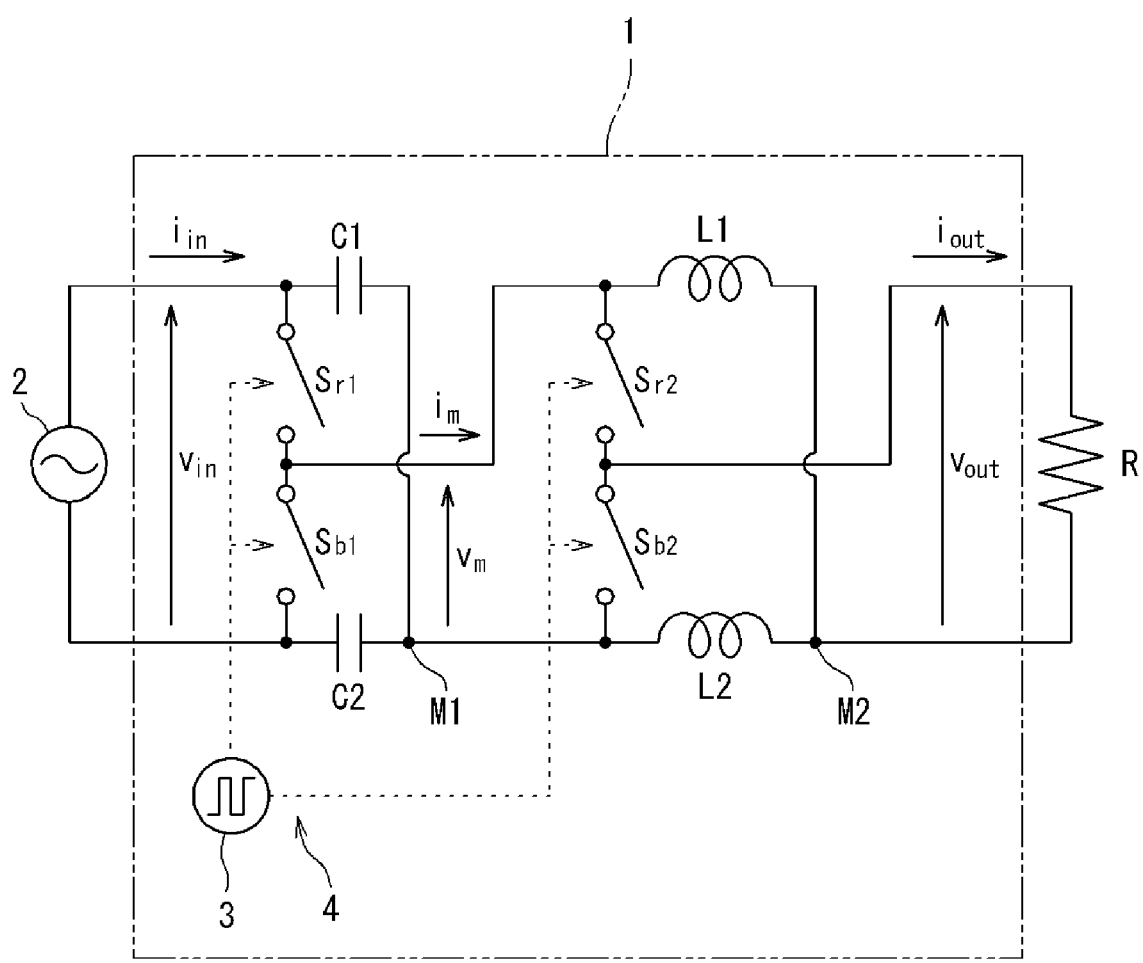
FIG. 1 is a circuit diagram showing a transformer according to the first embodiment.

Summary of the embodiments of the present invention includes at least the following.

(1) A transformer is provided between a power supply and a load, and includes: a front stage circuit having input ports P1 and P2 on a front end side connected to the power supply, and output ports P3 and P4 on a rear end side; and a rear stage circuit having output ports P7 and P8 on a rear end side connected to the load, and input ports P5 and P6 on a front end side.

As the front stage circuit, one of the following (F1) to (F5) can be selected:

(F1) a front stage circuit in which both ends of a series unit composed of a pair of capacitors connected in series to each other via a capacitor connection point are respectively connected to the input port P1 and the input port P2, the capacitor connection point being connected to the output port P4, and in which a first switch provided between the input port P1 and the output port P3, and a second switch provided between the input port P2 and the output port P3 are alternately turned on through switching;

(F2) a front stage circuit including a plurality of units each of which is obtained by interposing a capacitor on a line directly connected to the output port P3 in the front stage circuit of (F1), the input ports P1 and P2 of the plurality of units being connected in series to each other, the output ports P3 and P4 of the plurality of units being connected in parallel to each other;

(F3) a front stage circuit in which both ends of a series unit composed of a pair of inductors connected in series to each other via an inductor connection point are respectively connected to the output port P3 and the output port P4, the inductor connection point being connected to the input port P2, and in which a first switch provided between the input port P1 and the output port P3, and a second switch provided between the input port P1 and the output port P4 are alternately turned on through switching;

(F4) a front stage circuit including a plurality of units each of which is obtained by interposing an inductor on a line directly connected to the input port P1 in the front stage circuit of (F3), the input ports P1 and P2 of the plurality of units being connected in parallel to each other, the output ports P3 and P4 of the plurality of units being connected in series to each other; and (F5) a front stage circuit configured to be a full-bridge circuit with four switches so as to receive input through the input ports P1 and P2 and perform output through the output ports P3 and P4.

As the rear stage circuit, one of the following (R1) to (R5) can be selected:

(R1) a rear stage circuit in which both ends of a series unit composed of a pair of inductors connected in series to each other via an inductor connection point are respectively connected to the input port P5 and the input port P6, the inductor connection point being connected to the output port P8, and in which a first switch provided between the input port P5 and the output port P7, and a second switch provided between the input port P6 and the output port P7 are alternately turned on through switching;

(R2) a rear stage circuit including a plurality of units each of which is obtained by interposing an inductor on a line directly connected to the output port P7 in the rear stage circuit of (R1), the input ports P5 and P6 of the plurality of units being connected in series to each other, the output ports P7 and P8 of the plurality of units being connected in parallel to each other;

(R3) a rear stage circuit in which both ends of a series unit composed of a pair of capacitors connected in series to each other via a capacitor connection point are respectively connected to the output port P7 and the output port P8, the capacitor connection point being connected to the input port P6, and in which a first switch provided between the input port P5 and the output port P7, and a second switch provided between the input port P5 and the output port P8 are alternately turned on through switching;

(R4) a rear stage circuit including a plurality of units each of which is obtained by interposing a capacitor on a line directly connected to the input port P5 in the rear stage circuit of (R3), the input ports P5 and P6 of the plurality of units being connected in parallel to each other, the output ports P7 and P8 of the plurality of units being connected in series to each other; and (R5) a rear stage circuit configured to be a full-bridge circuit with four switches so as to receive input through the input ports P5 and P6 and perform output through the output ports P7 and P8.

One of the front stage circuits (F1) to (F5) and one of the rear stage circuits (R1) to (R5) are combined, excluding a combination that the front stage circuit is (F5) and the rear stage circuit is (R5).

In the transformer configured as described in the above (1), transformation can be performed using the circuit configuration and switching. Using such a transformer as a power transformer makes it unnecessary to use a conventional transformer including a coil, an iron core, etc. Therefore, drastic size reduction and weight reduction of a transformer can be realized, and as a result, cost reduction can be realized. In addition, problems of parasitic capacitance and occurrence of magnetic field leakage, which arise in a high-frequency transformer, are also solved, and thus a transformer with low loss can be realized.

(2) In the case of using different expression, a transformer is provided between a power supply and a load, and includes a front stage circuit and a rear stage circuit each having a function of performing switching so as to alternately invert a polarity of output relative to input. The transformer further includes: a series unit provided in at least one of the front stage circuit and the rear stage circuit, the series unit being composed of a pair of reactance elements connected in series to each other via a connection point; and a switch device configured to, with both ends of the series unit serving as a first port, cause a part between one end of the series unit and the connection point, and a part between the other end of the series unit and the connection point, to serve as a second port alternately through switching while inverting a polarity, and execute one of power transmission from the first port to the second port, and power transmission from the second port to the first port.

The transformer configured as described in the above (2) can perform transformation, using a circuit configuration including a pair of reactance elements, and switching. Using such a transformer as a power transformer makes it unnecessary to use a conventional transformer including a coil, an iron core, etc. Therefore, drastic size reduction and weight reduction of a transformer can be realized, and as a result, cost reduction can be realized. In addition, problems of parasitic capacitance and occurrence of magnetic field leakage, which arise in a high-frequency transformer, are also solved, and thus a transformer with low loss can be realized.

(3) In the transformer of (1) or (2), preferably, the series unit is a series unit of a pair of inductors, and $2\pi f_o L \ll R \ll 2\pi f_s L$ is satisfied, where $f_o$ is a frequency of the power supply, fs is a switching frequency, L is an inductance value of any of the inductors, and R is a resistance value of the load.

In this case, more stable transformation operation with less distortion can be obtained. Preferably, a difference represented by the inequality sign is, for example, one-digit difference or greater, or more preferably, two-digit difference or greater.

(4) In the transformer of (1) or (2), preferably, the series unit is a series unit of a pair of capacitors, and $1/(2\pi fsC) \ll R \ll 1/(2\pi f_o C)$ is satisfied, where $f_o$ is a frequency of the power supply, fs is a switching frequency, C is a capacitance value of any of the capacitors, and R is a resistance value of the load.

In this case, more stable transformation operation with less distortion can be obtained. Preferably, a difference represented by the inequality sign is, for example, one-digit difference or greater, or more preferably, two-digit difference or greater.

(5) In the transformer of (1) or (2), a capacitor may be interposed on an output line that is not linked to the connection point of the series unit.

In this case, when the device has failed or when earth fault or short-circuit has occurred on a line, excessive current can be prevented from flowing from the power supply to the load.

(6) In the transformer of any one of (1) to (5), a distributed constant circuit may be interposed between the front stage circuit and the rear stage circuit, and in the case where a frequency of output of the front stage circuit is f and a wavelength at the frequency f is $\lambda$, the distributed constant circuit may include a first converter with a length of $\lambda/4$, and a second converter with a length of $\lambda/4$ provided between an end of the first converter and the rear stage circuit.

In this case, the interposed distributed constant circuit has a transformation function. Therefore, owing to combination with the transformation function of the distributed constant circuit, it is possible to realize a transformer that allows the voltage transformation ratio to be designed over a wide range.

(7) In the transformer of any one of (1) to (5), a two-terminal pair circuit may be interposed between the front stage circuit and the rear stage circuit, the two-terminal pair circuit being composed of n-number of reactance elements that are mutually connected, where n is a natural number equal to or greater than 4, and with respect to any value of the resistance value R of the load, an input impedance $Z_{in}$ of the two-terminal pair circuit may have a real number component of k·R, where k is a constant, and an imaginary number component of 0.

In this case, the interposed two-terminal pair circuit has a transformation function. Therefore, owing to combination with the transformation function of the two-terminal pair circuit, it is possible to realize a transformer that allows the voltage transformation ratio to be designed over a wide range.

(8) A plurality of the transformers of (1) or (2) may be connected in cascade.

In this case, a great voltage transformation ratio can be realized.

(9) In the transformer of any one of (1) to (7), a capacitance and an inductance of a cable may be used as a capacitor, an inductor, or a reactance element.

In this case, the cable allows voltage withstanding performance to be easily obtained and the cost thereof is low.

(10) Another transformer is provided between a DC power supply and a load, and includes: a front stage circuit having input ports P1 and P2 on a front end side connected to the power supply, and output ports P3 and P4 on a rear end side; and a rear stage circuit having output ports P7 and P8 on a rear end side connected to the load, and input ports P5 and P6 on a front end side.

As the front stage circuit, one of the following (F1) to (F5) can be selected:

(F1) a front stage circuit in which both ends of a series unit composed of a pair of capacitors connected in series to each other via a capacitor connection point are respectively connected to the input port P1 and the input port P2, the capacitor connection point being connected to the output port P4, and in which a first switch provided between the input port P1 and the output port P3, and a second switch provided between the input port P2 and the output port P3 are alternately turned on through switching;

(F2) a front stage circuit including a plurality of units each of which is obtained by interposing a capacitor on a line directly connected to the output port P3 in the front stage circuit of (F1), the input ports P1 and P2 of the plurality of units being connected in series to each other, the output ports P3 and P4 of the plurality of units being connected in parallel to each other;

(F3) a front stage circuit in which both ends of a series unit composed of a pair of inductors connected in series to each other via an inductor connection point are respectively connected to the output port P3 and the output port P4, the inductor connection point being connected to the input port P2, and in which a first switch provided between the input port P1 and the output port P3, and a second switch provided between the input port P1 and the output port P4 are alternately turned on through switching;

(F4) a front stage circuit including a plurality of units each of which is obtained by interposing an inductor on a line directly connected to the input port P1 in the front stage circuit of (F3), the input ports P1 and P2 of the plurality of units being connected in parallel to each other, the output ports P3 and P4 of the plurality of units being connected in series to each other; and (F5) a front stage circuit configured to be a full-bridge circuit with four switches so as to receive input through the input ports P1 and P2 and perform output through the output ports P3 and P4.

As the rear stage circuit, one of the following (R1) to (R5) can be selected:

(R1) a rear stage circuit in which both ends of a series unit composed of a pair of inductors connected in series to each other via an inductor connection point are respectively connected to the input port P5 and the input port P6, the inductor connection point being connected to the output port P8, and in which a first diode provided between the input port P5 and the output port P7, and a second diode provided between the input port P6 and the output port P7 alternately become conductive in accordance with a polarity of input voltage;

(R2) a rear stage circuit including a plurality of units each of which is obtained by interposing an inductor on a line directly connected to the output port P7 in the rear stage circuit of (R1), the input ports P5 and P6 of the plurality of units being connected in series to each other, the output ports P7 and P8 of the plurality of units being connected in parallel to each other;

(R3) a rear stage circuit in which both ends of a series unit composed of a pair of capacitors connected in series to each other via a capacitor connection point are respectively connected to the output port P7 and the output port P8, the capacitor connection point being connected to the input port P6, and in which a first diode provided between the input port P5 and the output port P7, and a second diode provided between the input port P5 and the output port P8 alternately become conductive in accordance with a polarity of input voltage;

(R4) a rear stage circuit including a plurality of units each of which is obtained by interposing a capacitor on a line directly connected to the input port P5 in the rear stage circuit of (R3), the input ports P5 and P6 of the plurality of units being connected in parallel to each other, the output ports P7 and P8 of the plurality of units being connected in series to each other; and (R5) a rear stage circuit configured to be a full-bridge circuit with four diodes so as to receive input through the input ports P5 and P6 and perform output through the output ports P7 and P8.

One of the front stage circuits (F1) to (F5) and one of the rear stage circuits (R1) to (R5) are combined, excluding a combination that the front stage circuit is (F5) and the rear stage circuit is (R5).

The transformer configured as described in the above (10) can perform transformation, using a circuit configuration and switching. Using such a transformer as a power transformer of DC/DC conversion type makes it unnecessary to use a conventional transformer including a coil, an iron core, etc. Therefore, drastic size reduction and weight reduction of a transformer can be realized, and as a result, cost reduction can be realized. In addition, problems of parasitic capacitance and occurrence of magnetic field leakage, which arise in a high-frequency transformer, are also solved, and thus a transformer with low loss can be realized.

Details of Embodiments

Transformers to be proposed include the following three types, depending on their configurations.

(A) A transformer by a circuit configuration using a reactance element, and switching.

(B) A transformer using a distributed constant circuit.

(C) A transformer using a lumped constant circuit.

As the embodiments of the present invention, (A) will be mainly described, and (B) and (C) will be complementally described.

Transformer by Circuit Configuration Using Reactance Element, and Switching

First Embodiment

FIG. 1 is a circuit diagram showing a transformer 1 according to the first embodiment. In FIG. 1, the transformer 1 is provided between an AC power supply 2 and a load R (R also denotes a resistance value). The transformer 1 includes a pair of capacitors C1 and C2, a pair of inductors L1 and L2, four switches $S_{r1}$, $S_{r2}$, $S_{b1}$, and $S_{b2}$, and a switching control section 3 which performs ON/OFF control of the switches $S_{r1}$, $S_{r2}$, $S_{b1}$, and $S_{b2}$. A switching frequency of the switching control section 3 is, for example, about 1 MHz.

The pair of capacitors C1 and C2 may have the same capacitance value, or may have different capacitance values. The same applies to the inductance values of the pair of inductors L1 and L2.

The switches $S_{r1}$, $S_{r2}$, $S_{b1}$, and $S_{b2}$ and the switching control section 3 form a switch device 4 which switches the state of circuit connection of the transformer 1. The switches $S_{r1}$ and $S_{r2}$ operate in synchronization with each other, and the switches $S_{b1}$ and $S_{b2}$ operate in synchronization with each other. The pair of switches $S_{r1}$ and $S_{r2}$ and the pair of switches $S_{b1}$ and $S_{b2}$ operate so as to be alternately turned on exclusively from each other. The switches $S_{r1}$, $S_{r2}$, $S_{b1}$, and $S_{b2}$ are semiconductor switching elements formed by an SiC element or a GaN element, for example. An SiC element or a GaN element allows faster switching than an Si element, for example. In addition, sufficient withstand voltage (which can be even 6 kV per element, for example) can be obtained without connecting multiple stages of such elements.

In FIG. 1, the pair of capacitors C1 and C2 are connected in series to each other via a connection point M1. The AC power supply 2 is connected between both ends of this series unit. Input voltage $v_{in}$ is applied to the series unit of the pair of capacitors C1 and C2, so that input current $i_{in}$ flows.

The pair of inductors L1 and L2 are connected in series to each other via a connection point M2. Between both ends of this series unit, input voltage $v_{in}$ is applied via the capacitors C1 and C2, so that input current $i_{in}$ flows. When one of the switches $S_{r2}$ and $S_{b2}$ is ON, current flows in the load R. Here, voltage applied to the load R is $v_{out}$, and output current flowing from the transformer 1 to the load R is $i_{out}$.

Figure 2:
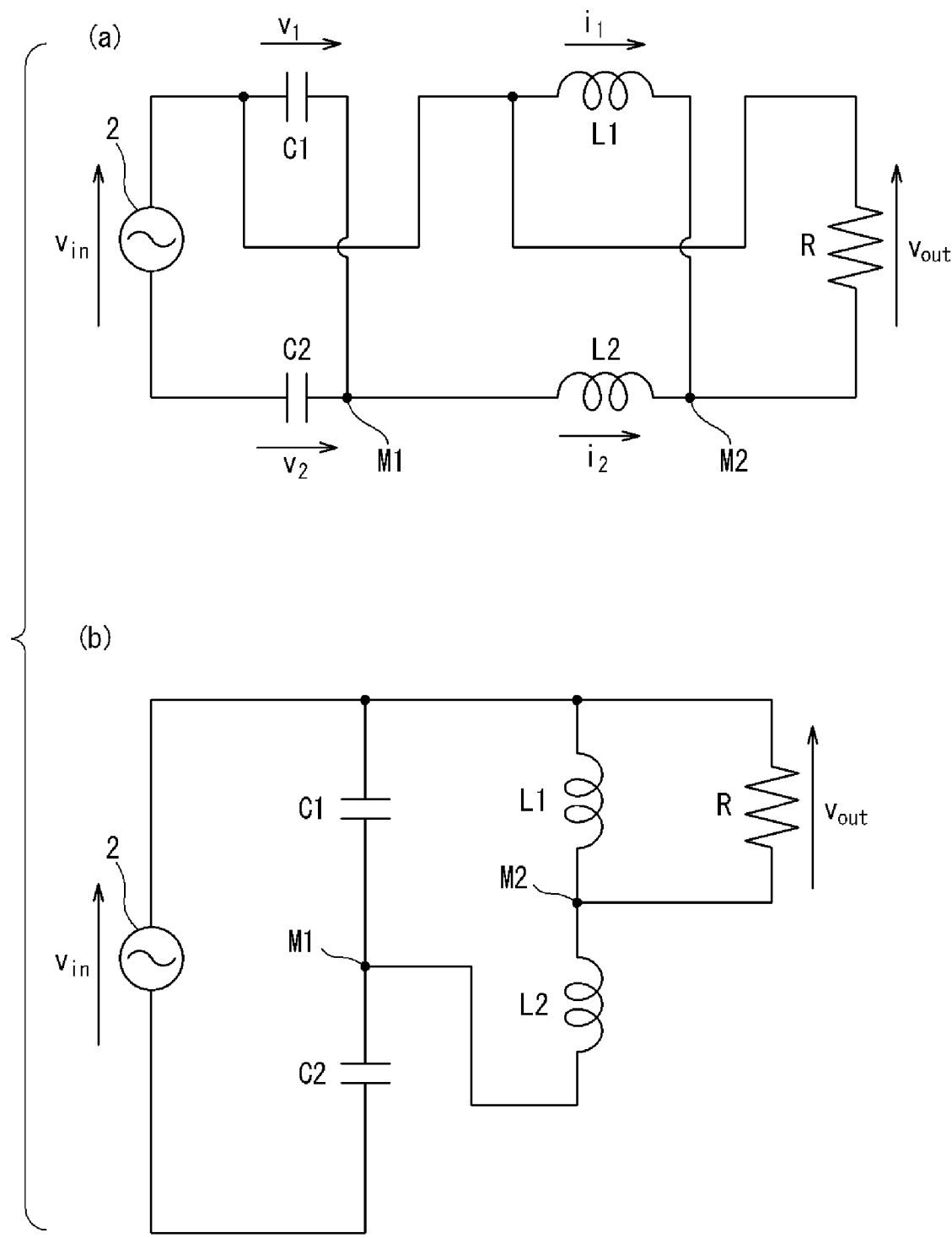
FIG. 2 is a circuit diagram in which (a) shows a substantial connection state when, of four switches in FIG. 1, two switches on the upper side are ON and two switches on the lower side are OFF, and (b) shows, in a step-like shape, the same circuit diagram as in (a).

In FIG. 2, (a) is a circuit diagram showing a substantial connection state when, of the four switches $S_{r1}$, $S_{r2}$, $S_{b1}$, and $S_{b2}$ in FIG. 1, the two switches $S_{r1}$ and $S_{r2}$ on the upper side are ON and the two switches $S_{b1}$ and $S_{b2}$ on the lower side are OFF. In the drawing, the switch device 4 in FIG. 1 is not shown. In FIG. 2, (b) is a circuit diagram showing, in a step-like shape, the same circuit diagram as in (a).

Figure 3:
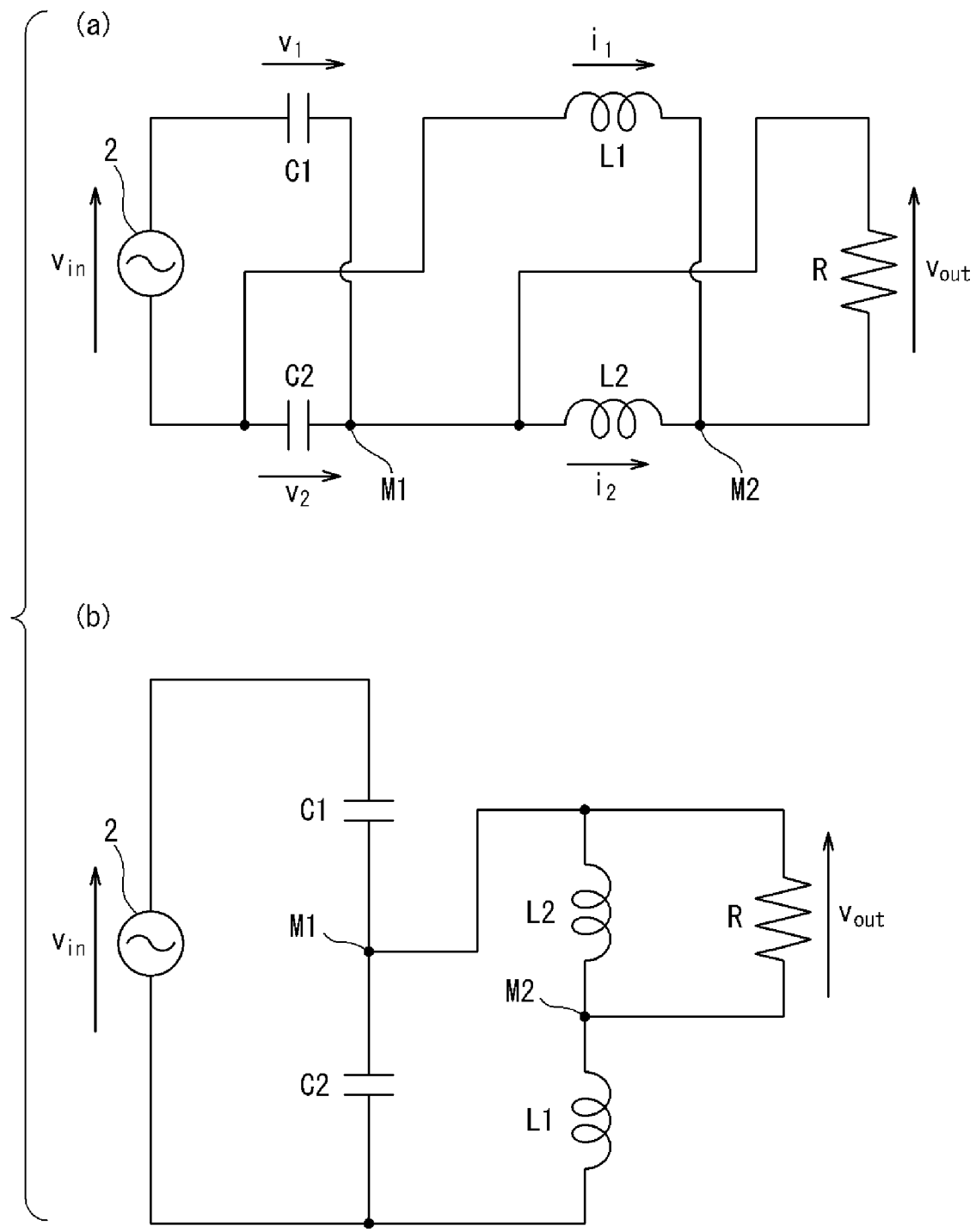
FIG. 3 is a circuit diagram in which (a) shows a substantial connection state when, of the four switches in FIG. 1, the two switches on the lower side are ON and the two switches on the upper side are OFF, and (b) shows, in a step-like shape, the same circuit diagram as in (a).

On the other hand, in FIG. 3, (a) is a circuit diagram showing a substantial connection state when, of the four switches $S_{r1}$, $S_{r2}$, $S_{b1}$, and $S_{b2}$ in FIG. 1, the two switches $S_{b1}$ and $S_{b2}$ on the lower side are ON and the two switches $S_{r1}$ and $S_{r2}$ on the upper side are OFF. In FIG. 3, (b) is a circuit diagram showing, in a step-like shape, the same circuit diagram as in (a).

While the states in FIG. 2 and FIG. 3 are alternately repeated, voltage obtained via the connection point M1 of the series unit of the capacitors C1 and C2 becomes voltage obtained via the connection point M2 of the series unit of the inductors L1 and L2. That is, the circuit configuration is composed of a front stage circuit including the pair of capacitors C1 and C2, and a rear stage circuit including the pair of inductors L1 and L2, and at each stage, the polarity of output relative to input is inverted through switching. The directions of currents of the capacitors C1 and C2 are alternately inverted through switching, and the directions of voltages of the inductors L1 and L2 are alternately inverted through switching.

Here, it can be estimated that the input voltage becomes ¼ when outputted. This will be logically proved below.

In FIG. 2, $v_{in}$ is input voltage from the AC power supply 2, $v_{out}$ is voltage applied to the load R, $v_1$ is voltage applied to the capacitor C1, $v_2$ is voltage applied to the capacitor C2, $i_1$ is current flowing through the inductor L1, and $i_2$ is current flowing through the inductor L2. In this case, the following expressions are satisfied.

For simplifying calculation, it will be assumed that the capacitors C1 and C2 have the same capacitance value C, and the inductors L1 and L2 have the same inductance value L.

$$-v_{in} = v_1 - v_2$$

$$-\frac{v_{out}}{R} = i_1 + i_2$$

$$C\frac{d}{dt}(v_1 + v_2) = -i_2$$

$$L\frac{d}{dt}(i_1 - i_2) = -v_1$$

-continued $$v_{out} = L\frac{d}{dt}i_1$$

The above expressions are deformed into expressions of $v_1$, $i_1$, and $i_2$, as follows.

$$L\frac{d}{dt}i_1 = -R(i_1 + i_2)$$

$$L\frac{d}{dt}i_2 = v_1 - R(i_1 + i_2)$$

$$2C\frac{d}{dt}v_1 = -i_2 - C\frac{d}{dt}v_{in}$$

Here, if $Ri_1 = v_3$ and $Ri_2 = v_4$ are set, the following equation 1 is obtained.

$$\frac{d}{dt}v_3 = -\frac{R}{L}(v_3 + v_4) \quad \text{(Equation 1)}$$

$$\frac{d}{dt}v_4 = \frac{R}{L}(v_1 - v_3 - v_4)$$

$$\frac{d}{dt}v_1 = -\frac{2}{2CR}v_4 - \frac{1}{2}\frac{d}{dt}v_{in}$$

In FIG. 3, as in FIG. 2, $v_{in}$ is input voltage from the AC power supply 2, $v_{out}$ is voltage applied to the load R, $v_1$ is voltage applied to the capacitor C1, $v_2$ is voltage applied to the capacitor C2, $i_1$ is current flowing through the inductor L1, and $i_2$ is current flowing through the inductor L2. In this case, the following expressions are satisfied.

$$-v_{in} = v_1 - v_2$$

$$-\frac{v_{out}}{R} = i_1 + i_2$$

$$C\frac{d}{dt}(v_1 + v_2) = i_1$$

$$L\frac{d}{dt}(i_1 + i_2) = -v_2$$

$$v_{out} = L\frac{d}{dt}i_2$$

The above expressions are deformed into expressions of $v_1$, $i_1$, and $i_2$, as follows.

$$L\frac{d}{dt}i_2 = -R(i_1 + i_2)$$

$$L\frac{d}{dt}i_1 = -v_1 - v_{in} - R(i_1 + i_2)$$

$$2C\frac{d}{dt}v_1 = i_1 - C\frac{d}{dt}v_{in}$$

Here, if $Ri_1 = v_3$ and $Ri_2 = v_4$ are set, the following equation 2 is obtained.

$$\frac{d}{dt}v_4 = -\frac{R}{L}(v_3 + v_4) \quad \text{(Equation 2)}$$

$$\frac{d}{dt}v_3 = -\frac{R}{L}(v_1 + v_3 + v_4 + v_{in})$$

$$\frac{d}{dt}v_1 = \frac{2}{2CR}v_3 - \frac{1}{2}\frac{d}{dt}v_{in}$$

Here, it is difficult to derive an exact solution from the above two states. Therefore, the following conditions are set within a range that is considered to cause no practical problem.

(1) At the switching frequency fs, the impedance (reactance) of L is sufficiently greater than the resistance value R, but at a frequency $f_o$ of input voltage, the impedance (reactance) of L is sufficiently smaller than the resistance value. That is, $2\pi f_o L \ll R \ll 2\pi fsL$ is satisfied. Preferably, a difference represented by the inequality sign is, for example, one-digit difference or greater, or more preferably, two-digit difference or greater. Thus, more stable transformation operation with less distortion can be obtained.

(2) At the switching frequency fs, the impedance (reactance) of C is sufficiently smaller than the resistance value R, but at the frequency $f_o$ of input voltage, the impedance (reactance) of C is sufficiently greater than the resistance value. That is, $1/(2\pi fsC) \ll R \ll 1/(2\pi f_o C)$ is satisfied. Preferably, a difference represented by the inequality sign is, for example, one-digit difference or greater, or more preferably, two-digit difference or greater. Thus, more stable transformation operation with less distortion can be obtained.

(3) In one cycle of switching, input voltage hardly varies.

Therefore, $v_{in}(t+\Delta t) = v_{in}(t)$ ($0 \leq \Delta t \leq 1/fs$)

(4) The system is steady, and returns to almost the same state with a period (1/fs).

Therefore, $v_x(t+(1/fs)) \approx v_x(t)$ ($x=1, 2, 3, 4$) is satisfied.

If the switches $S_{r1}$ and $S_{r2}$ become ON during a period of $0 \leq t \leq (½fs)$ and the switches $S_{b1}$ and $S_{b2}$ become ON during a period of $(½fs) \leq t \leq (1/fs)$, the following equation 3 is obtained by primary approximation of equation 1 around $t=0$. In addition, the following equation 4 is obtained by primary approximation of equation 2 around $t=(½fs)$.

$$v_3\left(\frac{1}{2f_s}\right) \approx v_3(0) - \frac{R}{2f_s L}\{v_3(0) + v_4(0)\} \quad \text{(Equation 3)}$$

$$v_4\left(\frac{1}{2f_s}\right) \approx v_4(0) + \frac{R}{2f_s L}\{v_1(0) - v_3(0) - v_4(0)\}$$

$$v_1\left(\frac{1}{2f_s}\right) \approx v_1(0) - \frac{1}{4f_s CR}v_4(0) - \frac{1}{2}\left\{v_{in}\left(\frac{1}{2f_s}\right) - v_{in}(0)\right\}$$

In the above equation (3), the third term on the right-hand side of the expression at the third stage, i.e., $-(½)\{v_{in}(½fs) - v_{in}(0)\}$ is sufficiently close to zero.

$$v_4\left(\frac{1}{f_s}\right) \approx v_4\left(\frac{1}{2f_s}\right) - \frac{R}{2f_s L}\left\{v_3\left(\frac{1}{2f_s}\right) + v_4\left(\frac{1}{2f_s}\right)\right\} \quad \text{(Equation 4)}$$

$$v_3\left(\frac{1}{f_s}\right) \approx v_3\left(\frac{1}{2f_s}\right) -$$

$$\frac{R}{2f_s L}\left\{v_1\left(\frac{1}{2f_s}\right) + v_3\left(\frac{1}{2f_s}\right) + v_4\left(\frac{1}{2f_s}\right) + v_{in}\left(\frac{1}{2f_s}\right)\right\}$$

$$v_1\left(\frac{1}{f_s}\right) \approx v_1\left(\frac{1}{2f_s}\right) + \frac{1}{4f_s CR}v_3\left(\frac{1}{2f_s}\right) - \frac{1}{2}\left\{v_{in}\left(\frac{1}{f_s}\right) - v_{in}\left(\frac{1}{2f_s}\right)\right\}$$

In the above equation (4), the third term on the right-hand side of the expression at the third stage, i.e., $-(1/2)\{v_{in}(1/fs)-v_{in}(1/2fs)\}$ is sufficiently close to zero.

Here, if $v_1$, $v_3$, and $v_4$ in equations 3 and 4 are each linked, that is, $v_1(0)=v_1(1/fs)$, $v_3(0)=v_3(1/fs)$, and $v_4(0)=v_4(1/fs)$ are used, and in addition, if $\Delta T=1/(2fs)$ is set, the following expressions are obtained.

$$-v_3(0)-v_4(0)\approx v_1(\Delta T)+v_3(\Delta T)+v_4(\Delta T)+v_{in}(\Delta T)$$

$$v_1(0)-v_3(0)-v_4(0)\approx v_3(\Delta T)+v_4(\Delta T)$$

$$v_4(0)\approx v_3(\Delta T)$$

If a sum of the expressions at the first and second stages shown above (just above) is taken, the following expression is obtained.

$$v_{in}=-2\{v_3(0)+v_4(0)+v_3(\Delta T)+v_4(\Delta T)\}+v_1(0)-v_1(\Delta T)$$

Here, from the expression at the third stage in equation 3, $v_1(0)-v_1(\Delta T)=(1/(4fsCR))v_4(0)$ is obtained.

In addition, $-v_{out}=R(i_1+i_2)=v_3+v_4$ is obtained, and this is always satisfied. Therefore, the following conclusive expression is obtained.

$$v_{in}(\Delta T) \approx 4v_{out}(\Delta T) + \frac{1}{4f_sCR}v_4(0)$$

Here, for simplification, it has been assumed that the values C are the same value and the values L are the same value. However, even if these are different values, the same result can be derived through similar expression development.

In the conclusive expression, the second term on the right-hand side of the expression at the lowermost stage is sufficiently smaller than the first term, and thus can be neglected. Therefore, regardless of load variation (variation in the value of R), $v_{in}\approx 4v_{out}$ is satisfied, and output voltage becomes almost ¼ of input voltage. Since no loss occurs except for the load R, output current is about four times as great as input current, and input impedance is sixteen times as great as the resistance value R.

Here, confirming the configuration of the transformer 1 in FIGS. 1 to 3 again, the transformer 1 includes a first series unit (C1, C2), a second series unit (L1, L2), and the switch device 4. The first series unit (C1, C2) is composed of a pair of reactance elements (capacitors C1 and C2) connected in series to each other via the first connection point (M1), and both ends of the first series unit are connected to the AC power supply 2. The second series unit (L1, L2) is composed of a pair of reactance elements (inductors L1 and L2) connected in series to each other via the second connection point (M2).

As shown in (b) of FIG. 2 and (b) of FIG. 3, the switch device 4 alternately establishes a state in which both ends of the second series unit (L1, L2) are connected between one end of the first series unit (C1, C2) and the first connection point (M1), and a state in which both ends of the second series unit (L1, L2) are connected between the other end of the first series unit (C1, C2) and the first connection point (M1), and performs switching so as to invert the polarity of output relative to input. In synchronization therewith, the switch device 4 alternately establishes a state in which the load R is connected between one end of the second series unit (L1, L2) and the second connection point (M2), and a state in which the load R is connected between the other end of the second series unit (L1, L2) and the second connection point (M2), and performs switching so as to invert the polarity of output relative to input.

As a circuit parameter condition, regarding inductance, $2\pi f_o L \ll R \ll 2\pi fsL$ is satisfied. In addition, regarding capacitance, $1/(2\pi fsC)\ll R\ll 1/(2\pi f_o C)$ is satisfied. If this circuit parameter condition is satisfied, it is ensured that the voltage transformation ratio is constant regardless of load variation, and more stable transformation operation with less distortion is obtained. Preferably, a difference represented by the inequality sign is, for example, one-digit difference or greater, or more preferably, two-digit difference or greater (the same applies hereinafter).

Figure 4:
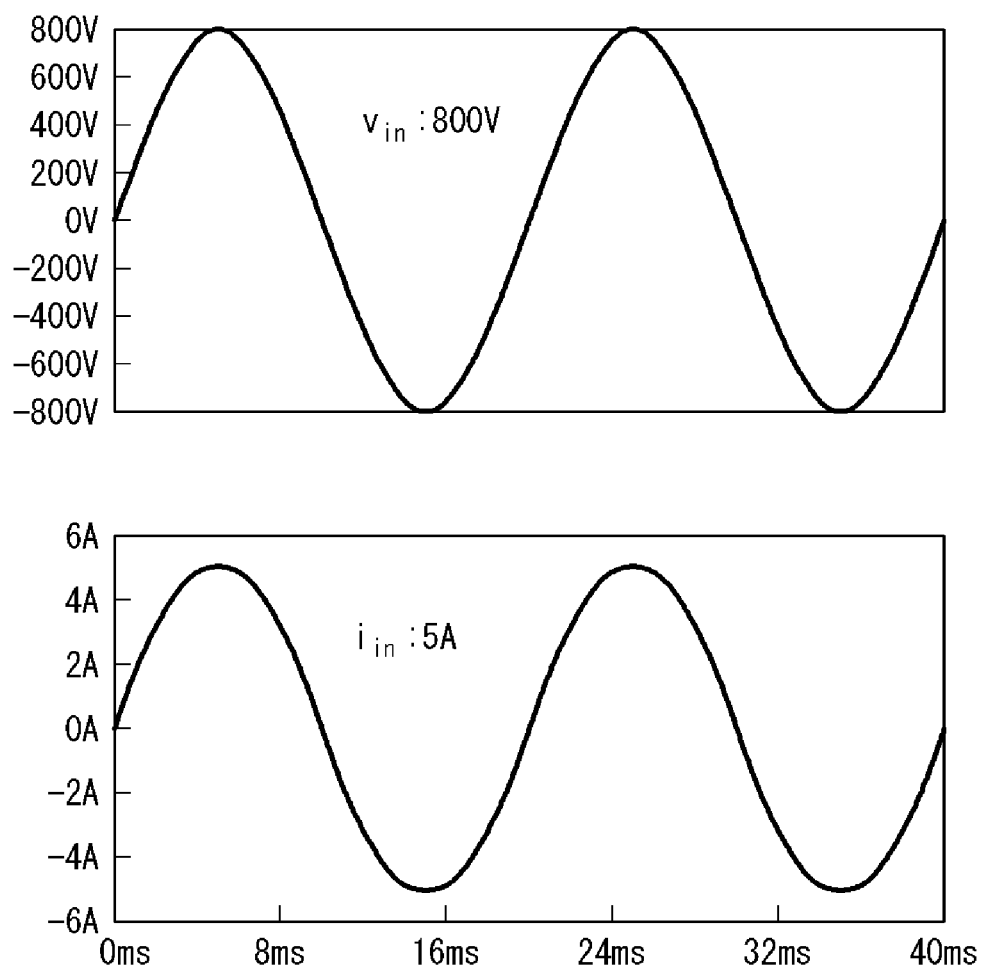
FIG. 4 is waveform diagrams respectively showing input voltage and input current to the transformer.

FIG. 4 is a waveform diagram in which an upper graph shows input voltage to the transformer 1 and a lower graph shows input current to the transformer 1.

Figure 5:
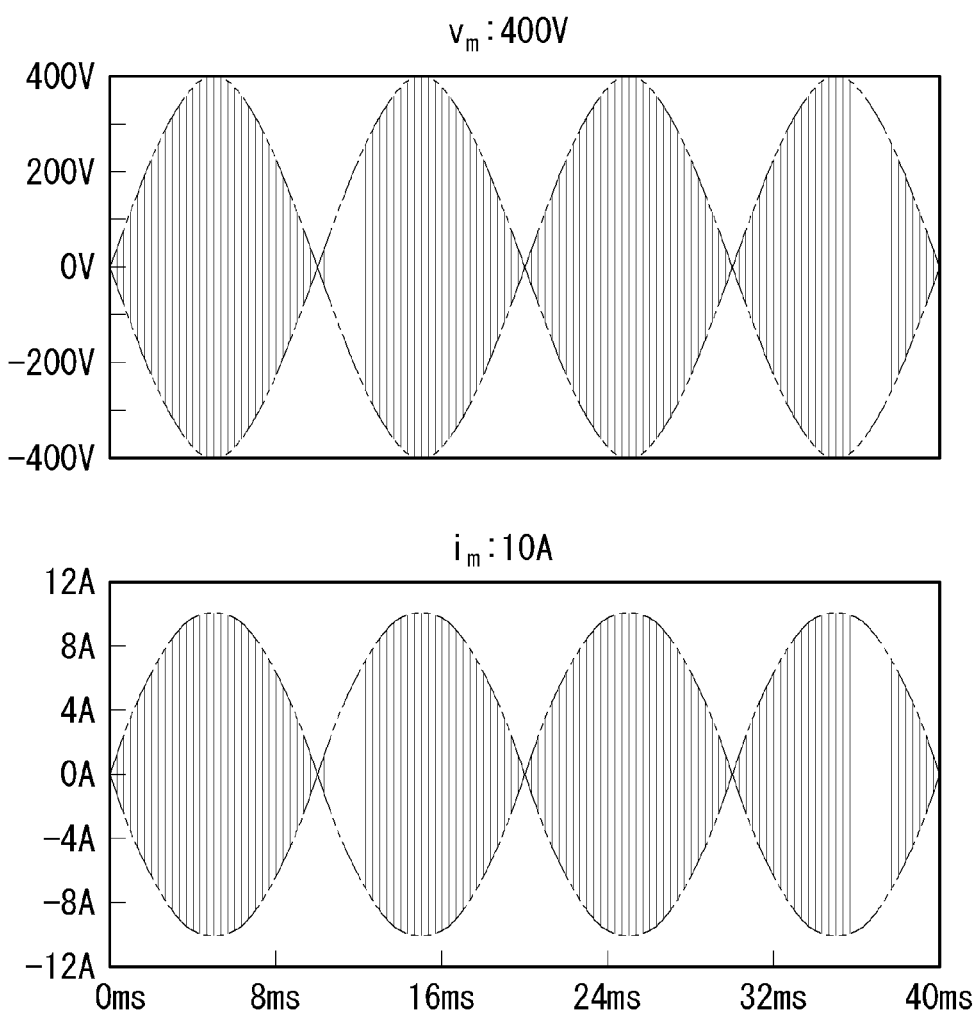
FIG. 5 is waveform diagrams respectively showing voltage and current at an intermediate stage of transformation.

FIG. 5 is a waveform diagram showing voltage $v_m$ and current $i_m$ at an intermediate stage of transformation. Actually, these are composed of pulse trains based on switching, and as a whole, have such waveforms as shown in FIG. 5.

Figure 6:
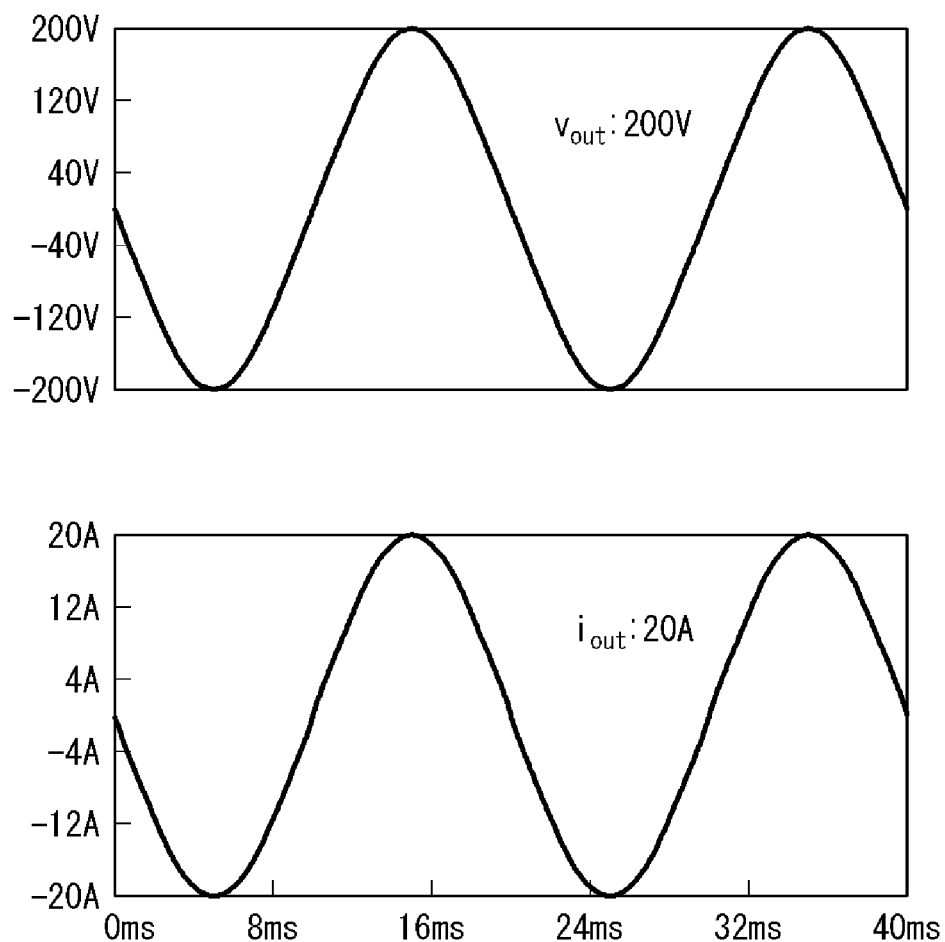
FIG. 6 is waveform diagrams respectively showing output voltage and output current from the transformer.

FIG. 6 is a waveform diagram in which an upper graph shows output voltage from the transformer 1 and a lower graph shows output current from the transformer 1. As is obvious from comparison between FIG. 4 and FIG. 6, voltage is transformed to be ¼, and along with this, current is quadrupled.

Figure 21:
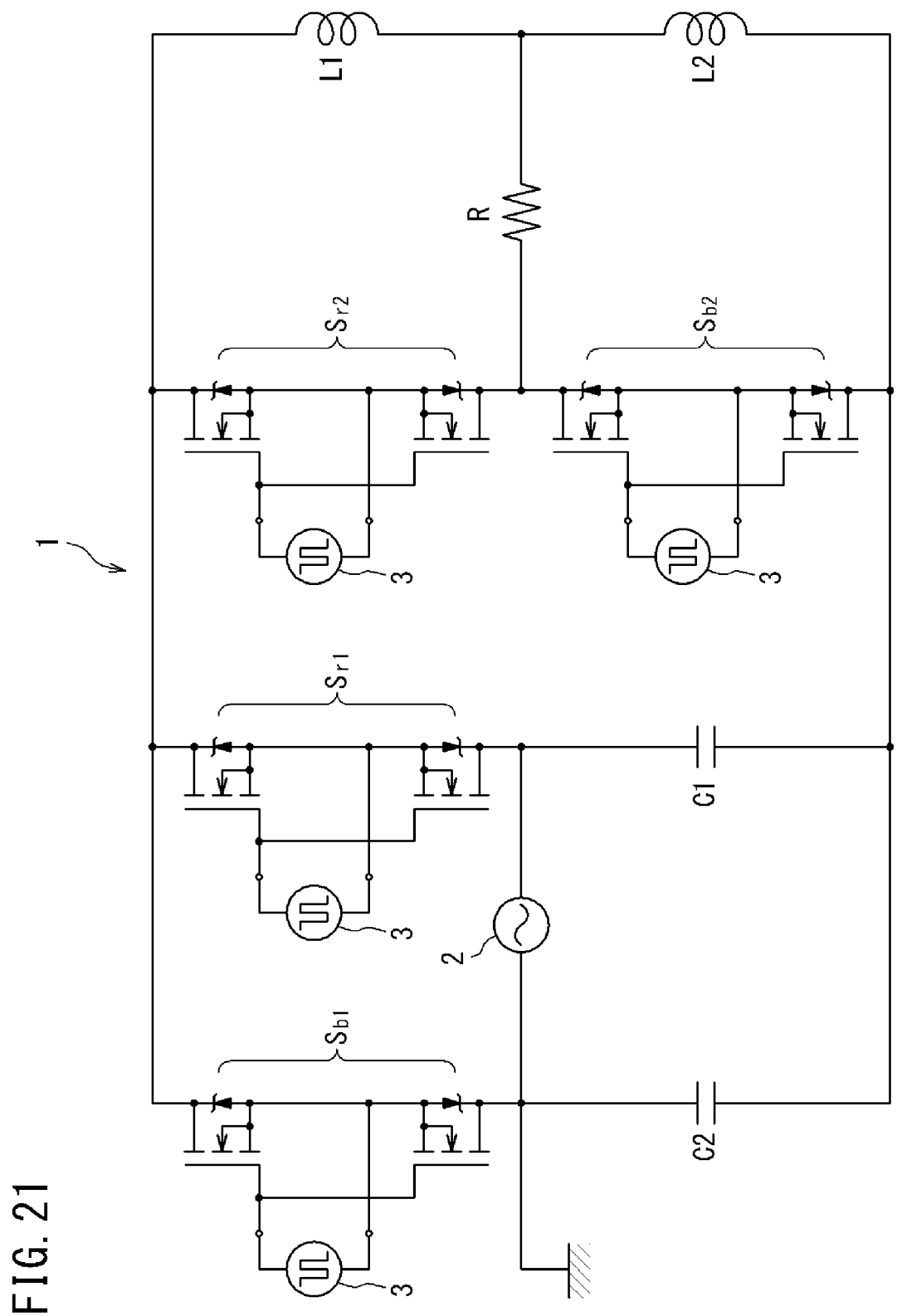
FIG. 21 is an example of an experimental circuit diagram corresponding to FIG. 1.

FIG. 21 is an example of an experimental circuit diagram corresponding to FIG. 1. The reference characters in FIG. 21 correspond to those in FIG. 1. For each of the switches $S_{r1}$, $S_{r2}$, $S_{b1}$, and $S_{b2}$, a pair of semiconductor switching elements are used. The capacitances of the capacitors C1 and C2 are 1 µF. The inductances of the inductors L1 and L2 are 1 mH.

The experiment was performed for both the case where the power supply 2 is a DC power supply and the case where the power supply 2 is an AC power supply at 60 Hz. The experiment was performed while the input voltage (power supply voltage) was changed to 8V, 16V, and 24V. The experiment was performed with the switching frequency set at 100 kHz to 1 MHz.

As a result of the experiment, output voltage at both ends of the load R (100Ω) was 2V when input voltage was 8V, 4V when input voltage was 16V, and 6V when input voltage was 24V. Thus, it was confirmed that the voltage transformation ratio was ¼ in all the cases.

Second Embodiment

Figure 7:
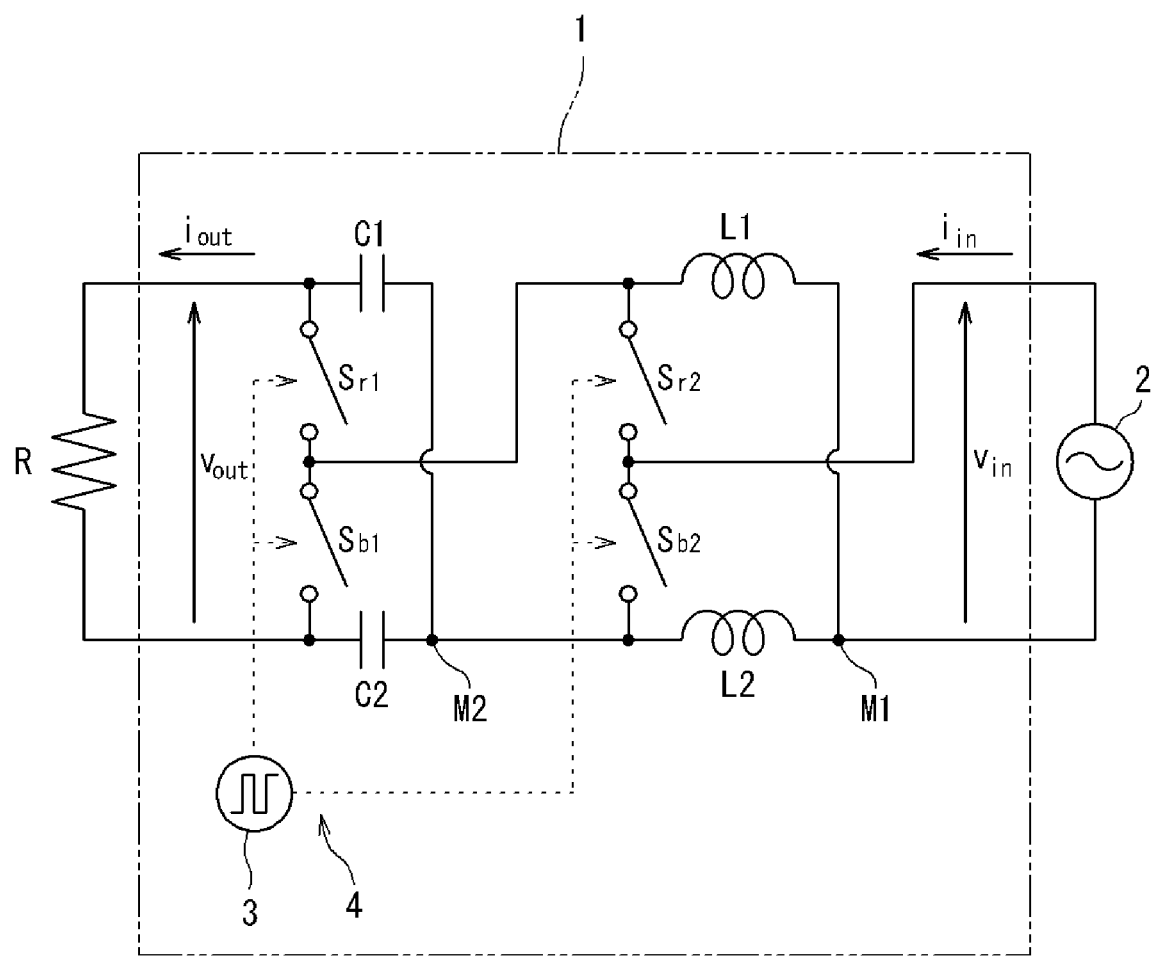
FIG. 7 is a circuit diagram showing a transformer according to the second embodiment.

FIG. 7 is a circuit diagram showing a transformer 1 according to the second embodiment. This transformer 1 is substantially the same as in FIG. 1, but is different from FIG. 1 in that the AC power supply 2 and the load R are replaced with each other. In this case, input and output are reversed, and input voltage is stepped up to be quadrupled. Along with the stepping-up, output current becomes ¼. The circuit parameter condition is the same as in the first embodiment.

Figure 8:
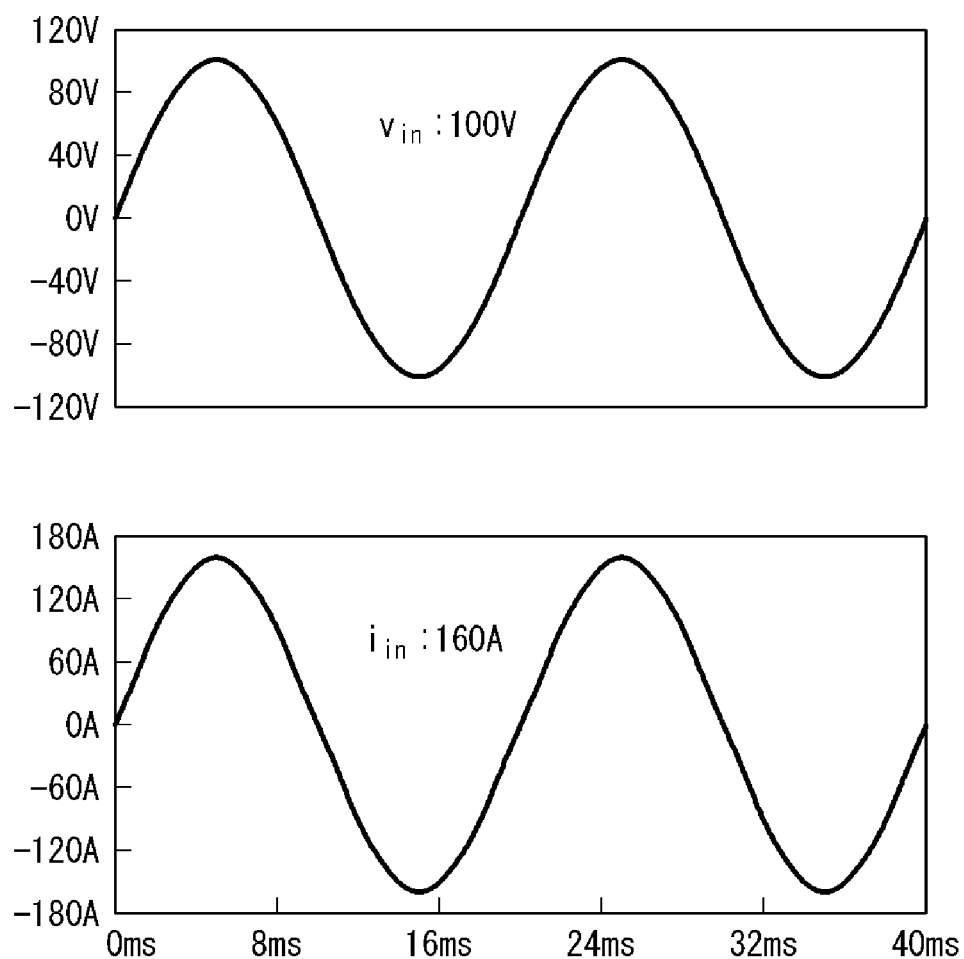
FIG. 8 is waveform diagrams respectively showing input voltage and input current to the transformer shown in FIG. 7.
Figure 9:
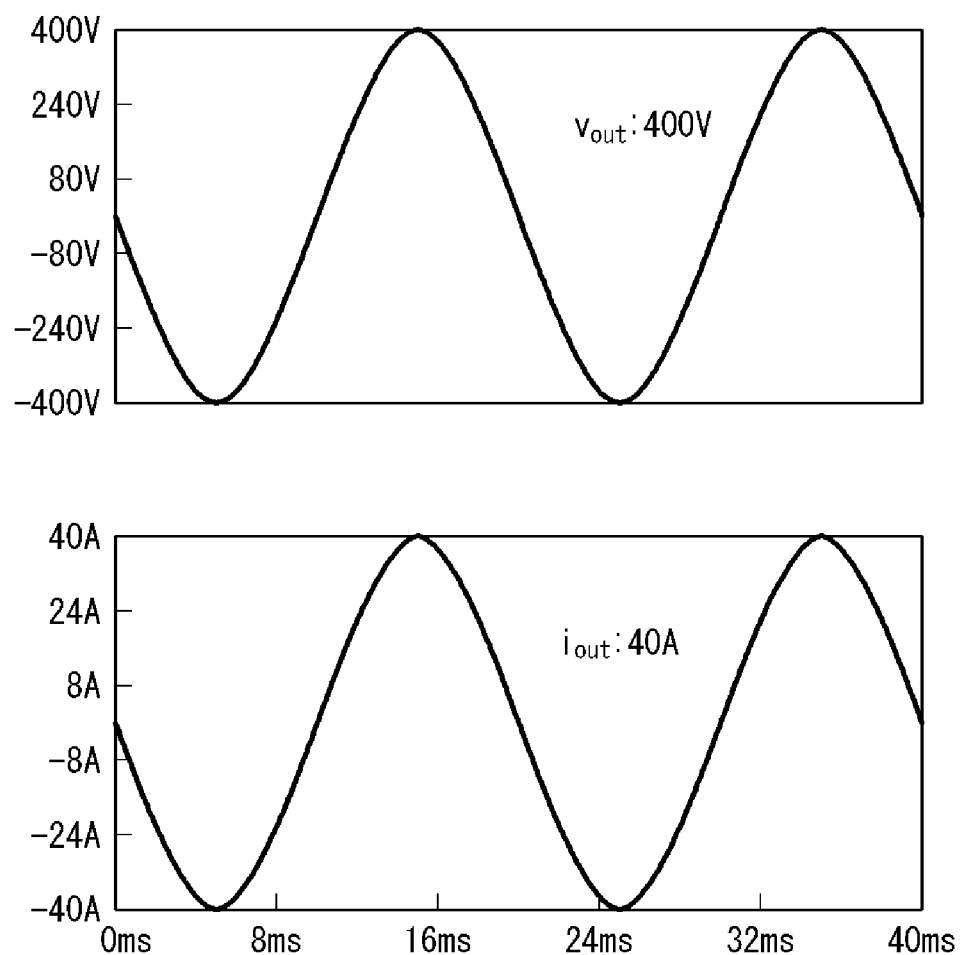
FIG. 9 is waveform diagrams respectively showing output voltage and output current from the transformer shown in FIG. 7.

FIG. 8 is a waveform diagram in which an upper graph shows input voltage to the transformer 1 and a lower graph shows input current to the transformer 1. FIG. 9 is a waveform diagram in which an upper graph shows output voltage from the transformer 1 and a lower graph shows output current from the transformer 1. As is obvious from comparison between FIG. 8 and FIG. 9, voltage is transformed to be quadrupled, and along with this, current becomes ¼.

Thus, the transformer 1 shown in FIG. 1 or FIG. 7 is reversible between input and output.

Third Embodiment

Figure 10:
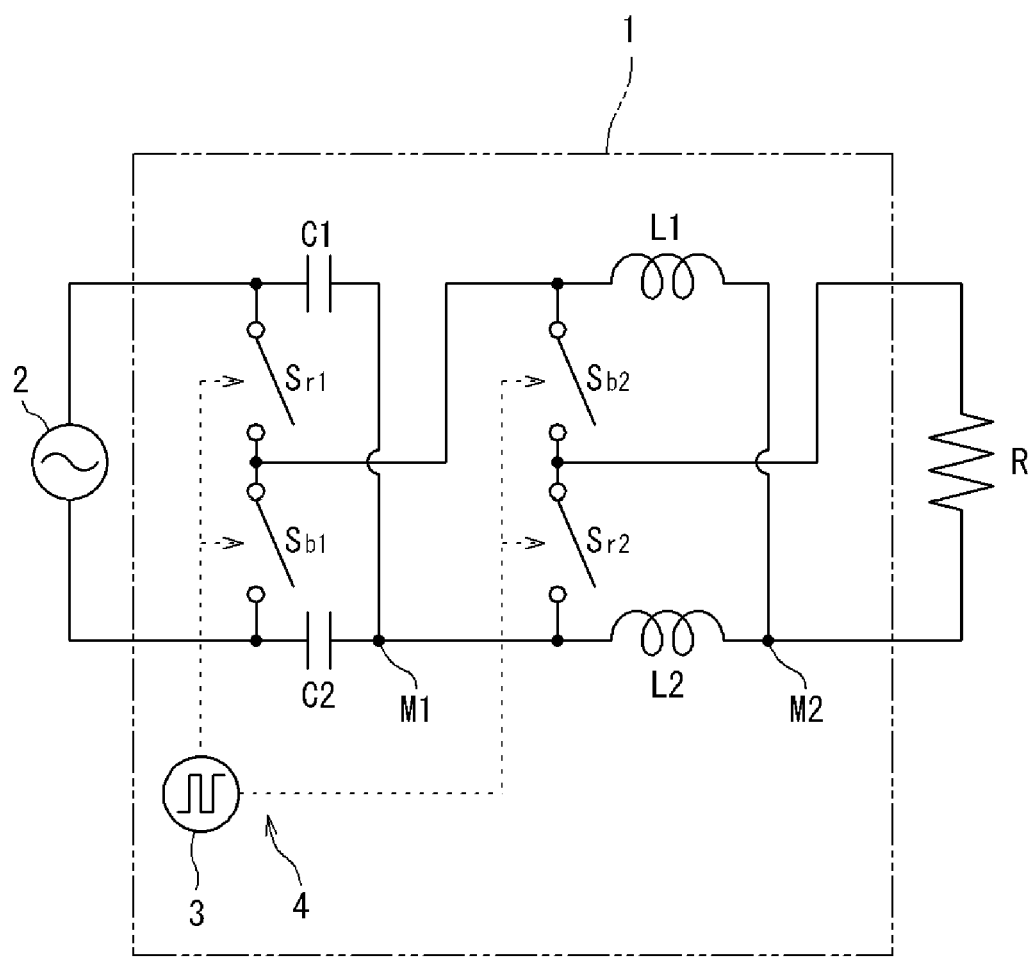
FIG. 10 is a circuit diagram showing a transformer according to the third embodiment.

FIG. 10 is a circuit diagram showing a transformer 1 according to the third embodiment. This transformer 1 is different from FIG. 1 in placement of the switches $S_{r1}$, $S_{r2}$, $S_{b1}$, and $S_{b2}$, but the other configuration is the same as in FIG. 1. That is, in FIG. 10, the switches $S_{b2}$ and $S_{r2}$ on the side of the inductors L1 and L2 are upside down as compared to FIG. 1. As for operation timing, as in the case of FIG. 1, the switches $S_{r1}$ and $S_{r2}$ operate in synchronization with each other, and the switches $S_{b1}$ and $S_{b2}$ operate in synchronization with each other. A pair of the switches $S_{r1}$ and $S_{r2}$ and a pair of the switches $S_{b1}$ and $S_{b2}$ operate so as to be alternately turned on exclusively from each other. The circuit parameter condition is the same as in the first embodiment.

In the circuit in FIG. 10, the switches $S_{b2}$ and $S_{r2}$ on the inductor side perform switching operations in reverse phase as compared to the circuit in FIG. 1.

Such switch placement and operation can reverse the phase of output relative to input, as compared to the case of FIG. 1.

As described above, the transformer 1 shown in FIGS. 1, 7, and 10 inputs voltage to between both ends of the first series unit; outputs voltage alternately from between one end thereof and the connection point and between the other end thereof and the connection point, to between both ends of the second series unit, while inverting the polarity; and outputs voltage alternately from between one end of the second series unit and the connection point and between the other end thereof and the connection point, while inverting the polarity, thereby performing power conversion, or the transformer 1 performs such power conversion with input and output reversed from the above operation. Thus, the transformer 1 can perform transformation. In this case, the voltage transformation ratio is ¼ or 4. Using such a transformer as a power transformer makes it unnecessary to use a conventional commercial-frequency transformer or high-frequency transformer. Therefore, drastic size reduction and weight reduction of a transformer can be realized, and as a result, cost reduction can be realized. In addition, problems of parasitic capacitance and occurrence of magnetic field leakage, which arise in a high-frequency transformer, are also solved, and thus a transformer with low loss can be realized.

In the case where the transformer 1 as described above is considered to be a basic form, the following variations are conceivable from the basic form.

Fourth Embodiment

Figure 11:
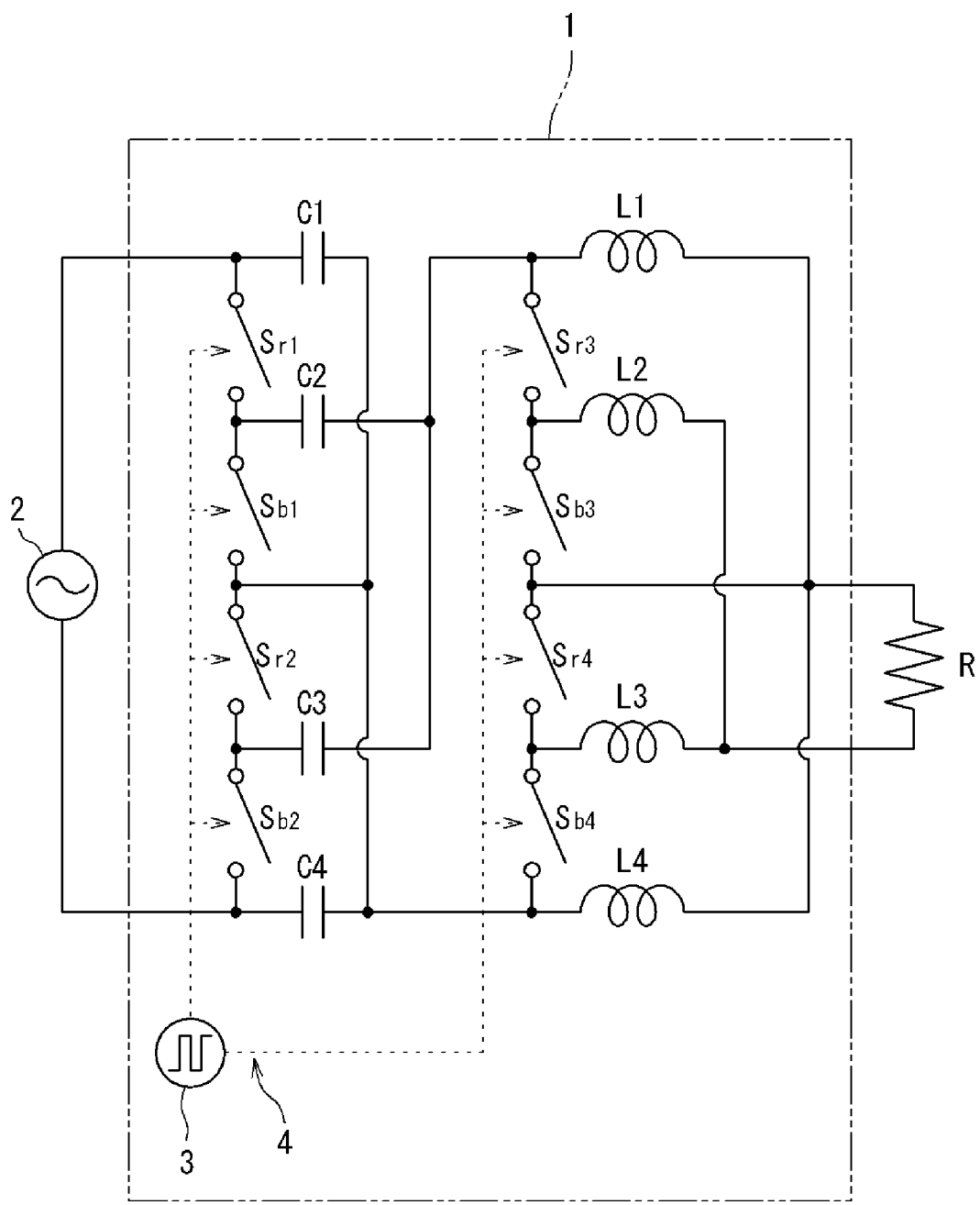
FIG. 11 is a circuit diagram showing a transformer according to the fourth embodiment.

FIG. 11 is a circuit diagram showing a transformer 1 according to the fourth embodiment. The transformer 1 includes a front stage circuit including four capacitors C1, C2, C3, and C4 and four switches $S_{r1}$, $S_{b1}$, $S_{r2}$, and $S_{b2}$, and a rear stage circuit including four inductors L1, L2, L3, and L4 and four switches $S_{r3}$, $S_{b3}$, $S_{r4}$, and $S_{b4}$. A switching control section 3 is provided for performing ON/OFF control of the switches $S_{r1}$, $S_{r2}$, $S_{r3}$, $S_{r4}$, $S_{b1}$, $S_{b2}$, $S_{b3}$, and $S_{b4}$. The circuit parameter condition is the same as in the first embodiment.

The eight switches $S_{r1}$, $S_{r2}$, $S_{r3}$, $S_{r4}$, $S_{b1}$, $S_{b2}$, $S_{b3}$, and $S_{b4}$ and the switching control section 3 form the switch device 4 which switches the circuit connection state of the transformer 1. The switches $S_{r1}$, $S_{r2}$, $S_{r3}$, and $S_{r4}$ operate in synchronization with each other, and the switches $S_{b1}$, $S_{b2}$, $S_{b3}$, and $S_{b4}$ operate in synchronization with each other. The four switches $S_{r1}$, $S_{r2}$, $S_{r3}$, and $S_{r4}$ and the other four switches $S_{b1}$, $S_{b2}$, $S_{b3}$, and $S_{b4}$ operate so as to be alternately turned on exclusively from each other.

The basic concept of the circuit in FIG. 11 is the same as that of the circuit in FIG. 1, but in the circuit in FIG. 11, the front stage circuit using capacitors has a two-stage configuration, and the rear stage circuit using inductors also has a two-stage configuration, in order to obtain a greater voltage transformation ratio.

Here, if the number of stages in the front stage circuit is $N_F$ and the number of stages in the rear stage circuit is $N_R$, the voltage transformation ratio is $(1/(2N_F))\times(1/(2N_R))$. Therefore, the voltage transformation ratio of the transformer 1 in FIG. 11 is $(1/(2\cdot2))\times(1/(2\cdot2))=1/16$.

The circuit parameter condition is $2\pi f_o L<<R<<2\pi fsL$, and $1/(2\pi fsC)<<R<<1/(2\pi f_o C)$, as in the case of FIG. 1.

As in FIG. 7, the circuit configuration in FIG. 11 is also reversible, and step-up operation can also be performed by replacing the AC power supply 2 and the load R with each other. In this case, the voltage transformation ratio is 16 (times).

Fifth Embodiment

Figure 12:
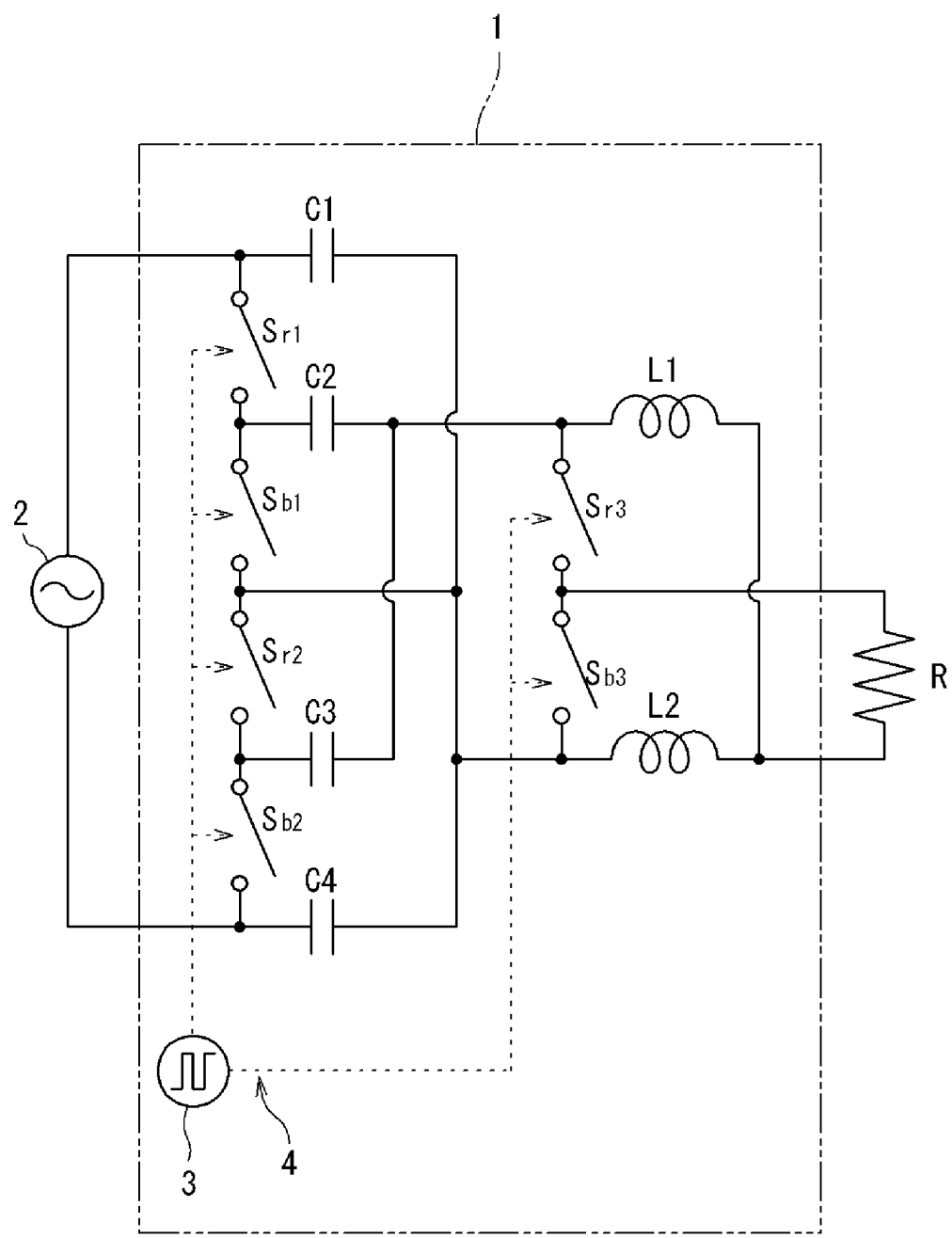
FIG. 12 is a circuit diagram showing a transformer according to the fifth embodiment.

FIG. 12 is a circuit diagram showing a transformer 1 according to the fifth embodiment. The transformer 1 includes a front stage circuit including four capacitors C1, C2, C3, and C4 and four switches $S_{r1}$, $S_{b1}$, $S_{r2}$, and $S_{b2}$, and a rear stage circuit including two inductors L1 and L2 and two switches $S_{r3}$ and $S_{b3}$. A switching control section 3 is provided for performing ON/OFF control of the switches $S_{r1}$, $S_{r2}$, $S_{r3}$, $S_{b1}$, $S_{b2}$, and $S_{b3}$. The circuit parameter condition is the same as in the first embodiment.

The six switches $S_{r1}$, $S_{r2}$, $S_{r3}$, $S_{b1}$, $S_{b2}$, and $S_{b3}$ and the switching control section 3 form the switch device 4 which switches the circuit connection state of the transformer 1. The switches $S_{r1}$, $S_{r2}$, and $S_{r3}$ operate in synchronization with each other, and the switches $S_{b1}$, $S_{b2}$, and $S_{b3}$ operate in synchronization with each other. The three switches $S_{r1}$, $S_{r2}$, and $S_{r3}$ and the other three switches $S_{b1}$, $S_{b2}$, and $S_{b3}$ operate so as to be alternately turned on exclusively from each other.

Here, the voltage transformation ratio of the transformer 1 in FIG. 12, i.e., $(1/(2N_F))\times(1/(2N_R))$ becomes $(1/(2\cdot2))\times(1/(2\cdot1))=1/8$.

The circuit parameter condition is $2\pi f_o L<<R<<2\pi fsL$, and $1/(2\pi fsC)<<R<<1/(2\pi f_o C)$, as in the case of FIG. 1.

As in FIG. 7, the circuit configuration in FIG. 12 is also reversible, and step-up operation can also be performed by replacing the AC power supply 2 and the load R with each other. In this case, the voltage transformation ratio is 8 (times).

Sixth Embodiment

Figure 13:
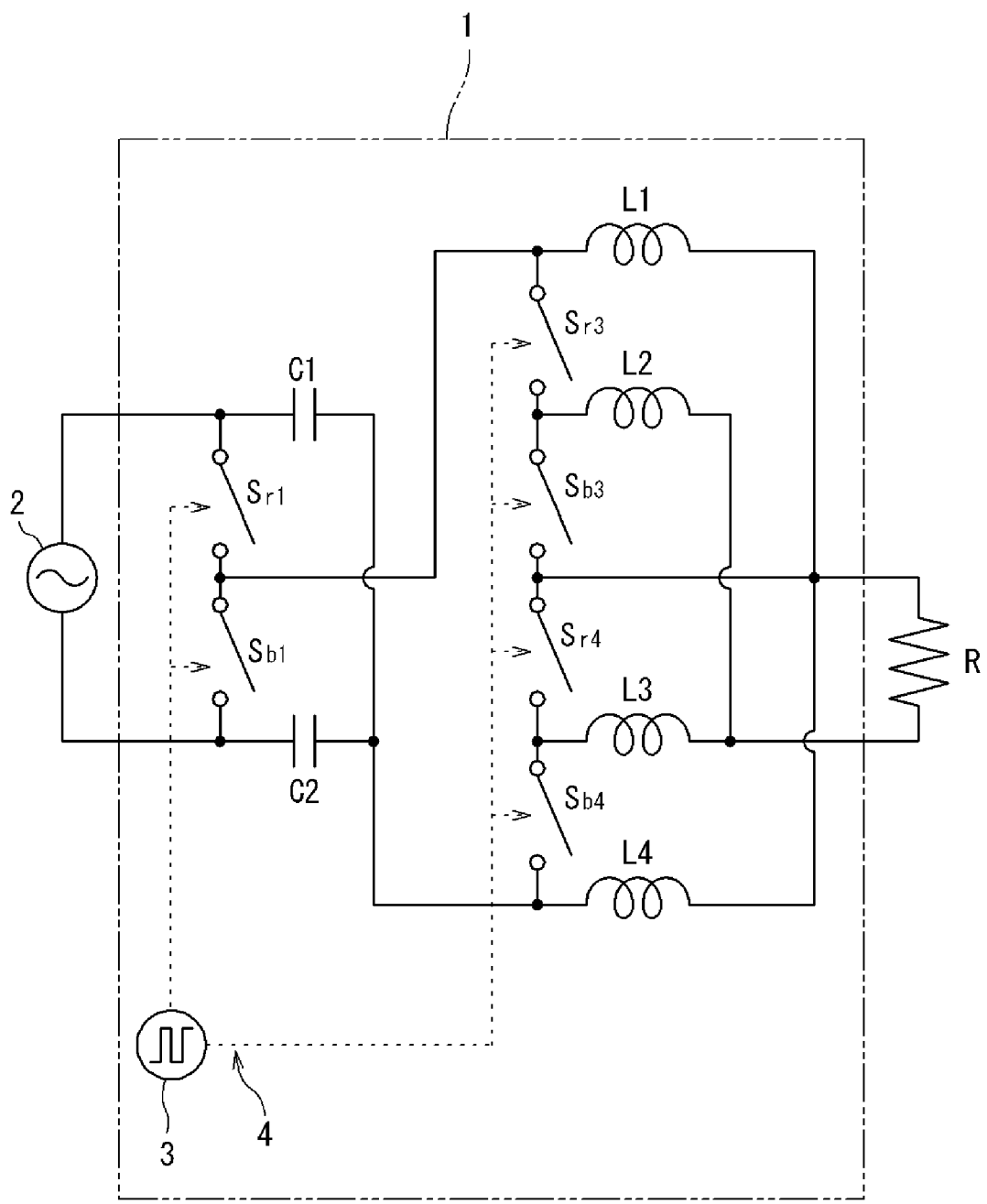
FIG. 13 is a circuit diagram showing a transformer according to the sixth embodiment.

FIG. 13 is a circuit diagram showing a transformer 1 according to the sixth embodiment. The transformer 1 includes a front stage circuit including two capacitors C1 and C2 and two switches $S_{r1}$ and $S_{b1}$, and a rear stage circuit including four inductors L1, L2, L3, and L4 and four switches $S_{r3}$, $S_{b3}$, $S_{r4}$, and $S_{b4}$. A switching control section 3 is provided for performing ON/OFF control of the switches $S_{r1}$, $S_{r3}$, $S_{r4}$, $S_{b1}$, $S_{b3}$, and $S_{b4}$. The circuit parameter condition is the same as in the first embodiment.

The six switches $S_{r1}$, $S_{r3}$, $S_{r4}$, $S_{b1}$, $S_{b3}$, and $S_{b4}$ and the switching control section 3 form the switch device 4 which switches the circuit connection state of the transformer 1. The switches $S_{r1}$, $S_{r3}$, and $S_{r4}$ operate in synchronization with each other, and the switches $S_{b1}$, $S_{b3}$, and $S_{b4}$ operate in synchronization with each other. The three switches $S_{r1}$, $S_{r3}$, and $S_{r4}$ and the other three switches $S_{b1}$, $S_{b3}$, and $S_{b4}$ operate so as to be alternately turned on exclusively from each other.

Here, the voltage transformation ratio of the transformer 1 in FIG. 13, i.e., $(1/(2N_F))\times(1/(2N_R))$ becomes $(1/(2\cdot1))\times(1/(2\cdot2))=\frac{1}{8}$.

The circuit parameter condition is $2\pi f_o L \ll R \ll 2\pi fsL$, and $1/(2\pi fsC) \ll R \ll 1/(2\pi f_o C)$, as in the case of FIG. 1.

As in FIG. 7, the circuit configuration in FIG. 13 is also reversible, and step-up operation can also be performed by replacing the AC power supply 2 and the load R with each other. In this case, the voltage transformation ratio is 8 (times).

Seventh Embodiment

Figure 14:
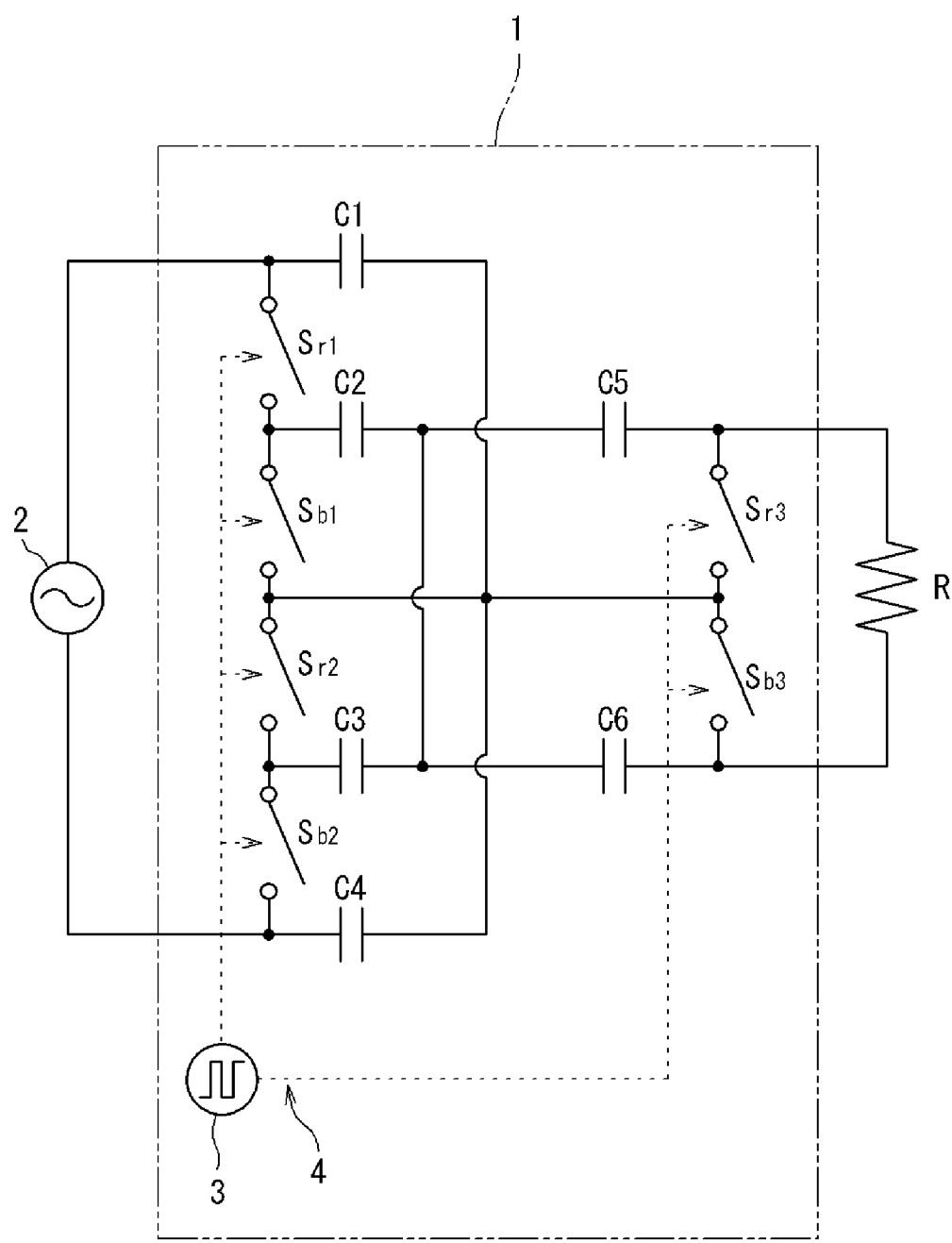
FIG. 14 is a circuit diagram showing a transformer according to the seventh embodiment.

FIG. 14 is a circuit diagram showing a transformer 1 according to the seventh embodiment. The transformer 1 includes a front stage circuit including four capacitors C1, C2, C3, and C4 and four switches $S_{r1}$, $S_{b1}$, $S_{r2}$, and $S_{b2}$, and a rear stage circuit including two capacitors C5 and C6 and two switches $S_{r3}$ and $S_{b3}$. A switching control section 3 is provided for performing ON/OFF control of the switches $S_{r1}$, $S_{r2}$, $S_{r3}$, $S_{b1}$, $S_{b2}$, and $S_{b3}$. The circuit parameter condition is the same as in the first embodiment.

The six switches $S_{r1}$, $S_{r2}$, $S_{r3}$, $S_{b1}$, $S_{b2}$, and $S_{b3}$ and the switching control section 3 form the switch device 4 which switches the circuit connection state of the transformer 1. The switches $S_{r1}$, $S_{r2}$, and $S_{r3}$ operate in synchronization with each other, and the switches $S_{b1}$, $S_{b2}$, and $S_{b3}$ operate in synchronization with each other. The three switches $S_{r1}$, $S_{r2}$, and $S_{r3}$ and the other three switches $S_{b1}$, $S_{b2}$, and $S_{b3}$ operate so as to be alternately turned on exclusively from each other.

Here, in the transformer 1 in FIG. 14, the front stage circuit performs step-down operation and the rear stage circuit performs step-up operation, and the voltage transformation ratio is $(\frac{1}{4})\times 2 = \frac{1}{2}$.

The circuit parameter condition is $2\pi f_o L \ll R \ll 2\pi fsL$, and $1/(2\pi fsC) \ll R \ll 1/(2\pi f_o C)$, as in the case of FIG. 1.

As in FIG. 7, the circuit configuration in FIG. 14 is also reversible, and step-up operation can also be performed by replacing the AC power supply 2 and the load R with each other. In this case, the voltage transformation ratio is 2 (times).

Eighth Embodiment

Figure 15:
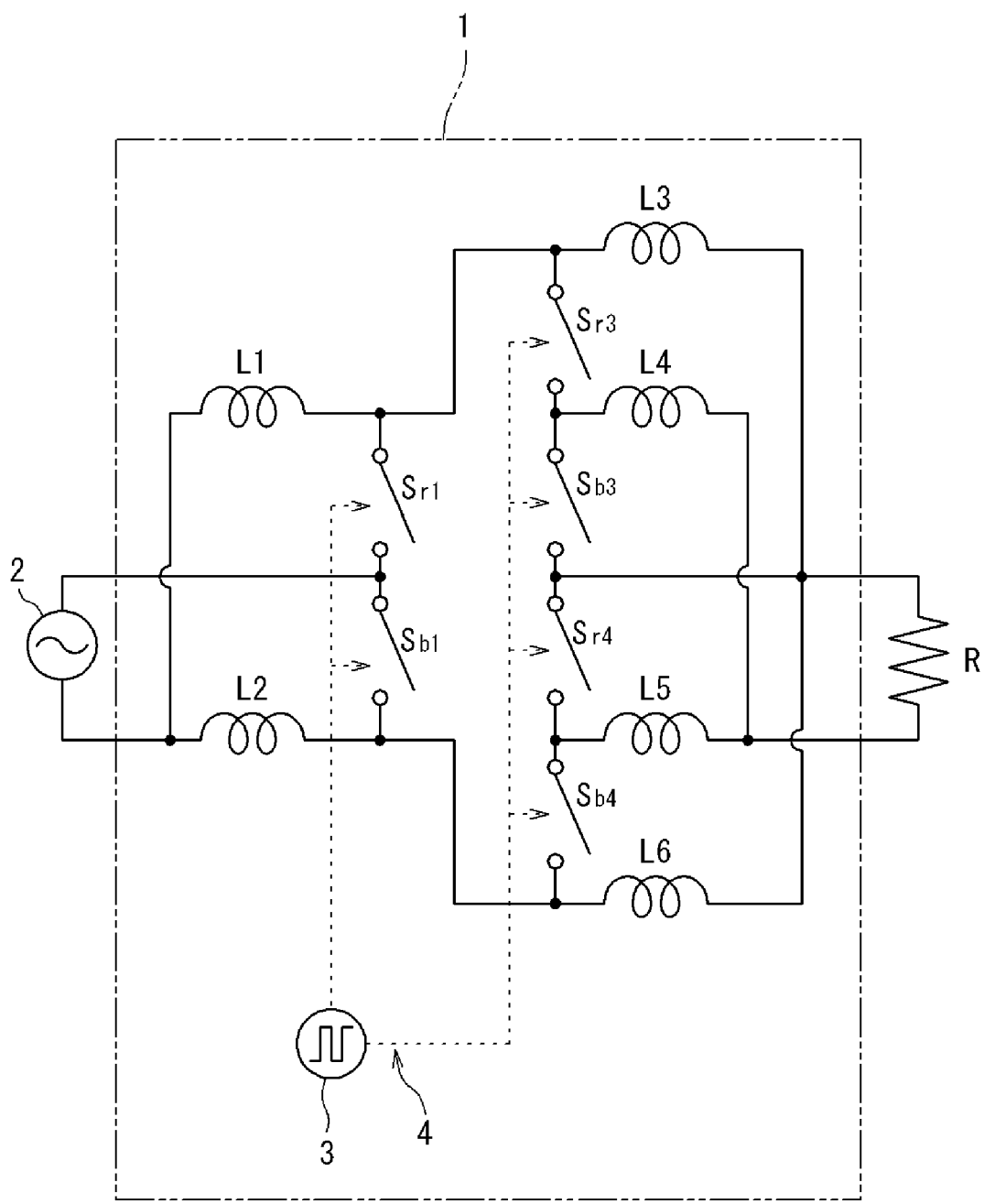
FIG. 15 is a circuit diagram showing a transformer according to the eighth embodiment.

FIG. 15 is a circuit diagram showing a transformer 1 according to the eighth embodiment. The transformer 1 includes a front stage circuit including two inductors L1 and L2 and two switches $S_{r1}$ and $S_{b1}$, and a rear stage circuit including four inductors L3, L4, L5, and L6 and four switches $S_{r3}$, $S_{b3}$, $S_{r4}$, and $S_{b4}$. A switching control section 3 is provided for performing ON/OFF control of the switches $S_{r1}$, $S_{r3}$, $S_{r4}$, $S_{b1}$, $S_{b3}$, and $S_{b4}$. The circuit parameter condition is the same as in the first embodiment.

The six switches $S_{r1}$, $S_{r3}$, $S_{r4}$, $S_{b1}$, $S_{b3}$, and $S_{b4}$ and the switching control section 3 form the switch device 4 which switches the circuit connection state of the transformer 1. The switches $S_{r1}$, $S_{r3}$, and $S_{r4}$ operate in synchronization with each other, and the switches $S_{b1}$, $S_{b3}$, and $S_{b4}$ operate in synchronization with each other. The three switches $S_{r1}$, $S_{r3}$, and $S_{r4}$ and the other three switches $S_{b1}$, $S_{b3}$, and $S_{b4}$ operate so as to be alternately turned on exclusively from each other.

Here, in the transformer 1 in FIG. 15, the front stage circuit performs step-up operation and the rear stage circuit performs step-down operation, and the voltage transformation ratio is $2\times(\frac{1}{4})=\frac{1}{2}$.

The circuit parameter condition is $2\pi f_o L \ll R \ll 2\pi fsL$, and $1/(2\pi fsC) \ll R \ll 1/(2\pi f_o C)$, as in the case of FIG. 1.

As in FIG. 7, the circuit configuration in FIG. 15 is also reversible, and step-up operation can also be performed by replacing the AC power supply 2 and the load R with each other. In this case, the voltage transformation ratio is 2 (times).

Ninth Embodiment

Figure 16:
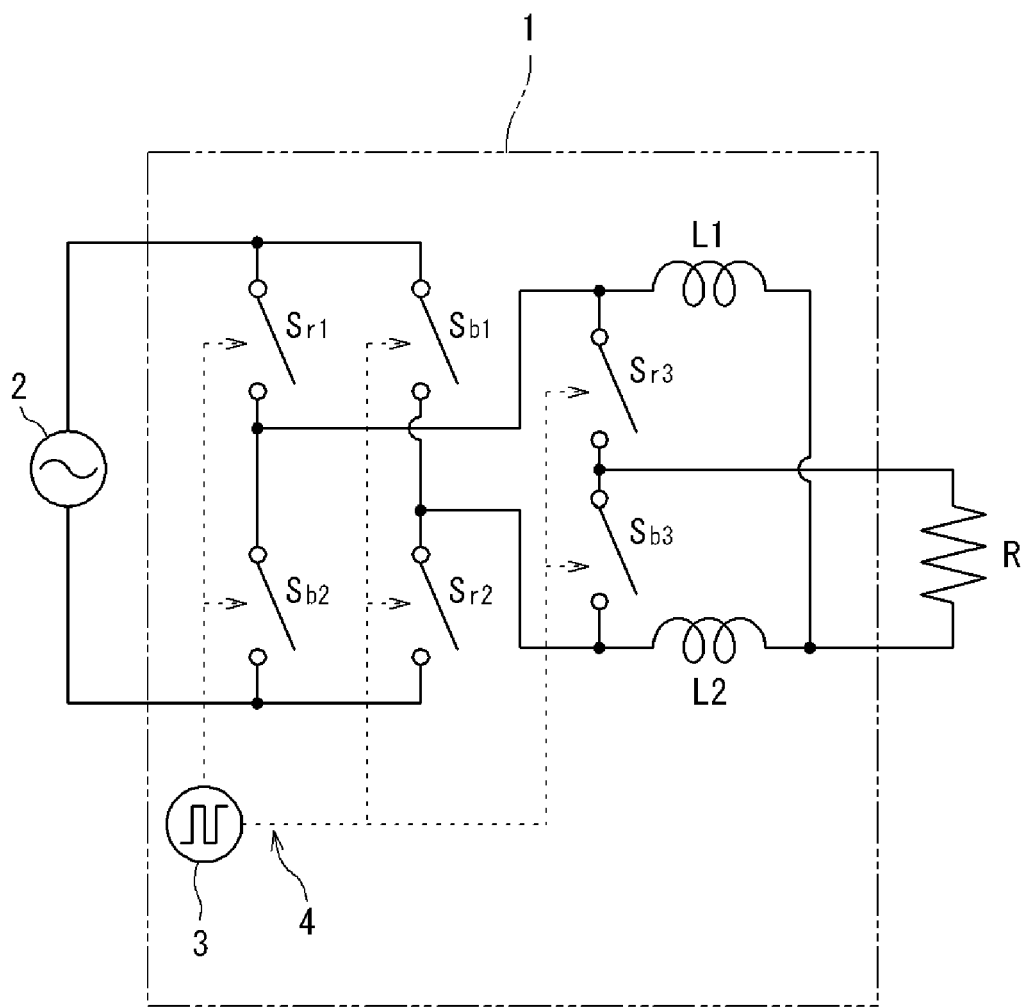
FIG. 16 is a circuit diagram showing a transformer according to the ninth embodiment.

FIG. 16 is a circuit diagram showing a transformer 1 according to the ninth embodiment. In this transformer 1, only a rear stage circuit has reactance elements. The rear stage circuit includes two inductors L1 and L2 and two switches $S_{r3}$ and $S_{b3}$. The front stage circuit is composed of four switches $S_{r1}$, $S_{r2}$, $S_{b1}$, and $S_{b2}$ which form a full-bridge circuit.

A switching control section 3 is provided for performing ON/OFF control of the switches $S_{r1}$, $S_{r2}$, $S_{r3}$, $S_{b1}$, $S_{b2}$, and $S_{b3}$. The six switches $S_{r1}$, $S_{r2}$, $S_{r3}$, $S_{b1}$, $S_{b2}$, and $S_{b3}$ and the switching control section 3 form the switch device 4 which switches the circuit connection state of the transformer 1. The switches $S_{r1}$, $S_{r2}$, and $S_{r3}$ operate in synchronization with each other, and the switches $S_{b1}$, $S_{b2}$, and $S_{b3}$ operate in synchronization with each other. The three switches $S_{r1}$, $S_{r2}$, and $S_{r3}$ and the other three switches $S_{b1}$, $S_{b2}$, and $S_{b3}$ operate so as to be alternately turned on exclusively from each other.

The circuit in FIG. 16 corresponds to a circuit obtained by changing the front stage circuit in the circuit in FIG. 1 to a full-bridge circuit, and the concept of operation of the circuit in FIG. 16 is the same as in the circuit in FIG. 1. The front stage circuit has a function of alternately inverting the polarity of output relative to input through switching, but hardly contributes to transformation.

The voltage transformation ratio of the transformer 1 in FIG. 16 is $\frac{1}{2}$. If the AC power supply 2 and the load R are replaced with each other, the voltage transformation ratio is doubled.

The condition of the circuit parameter L is $2\pi f_o L \ll R \ll 2\pi fsL$, as in the case of FIG. 1.

Tenth Embodiment

Figure 17:
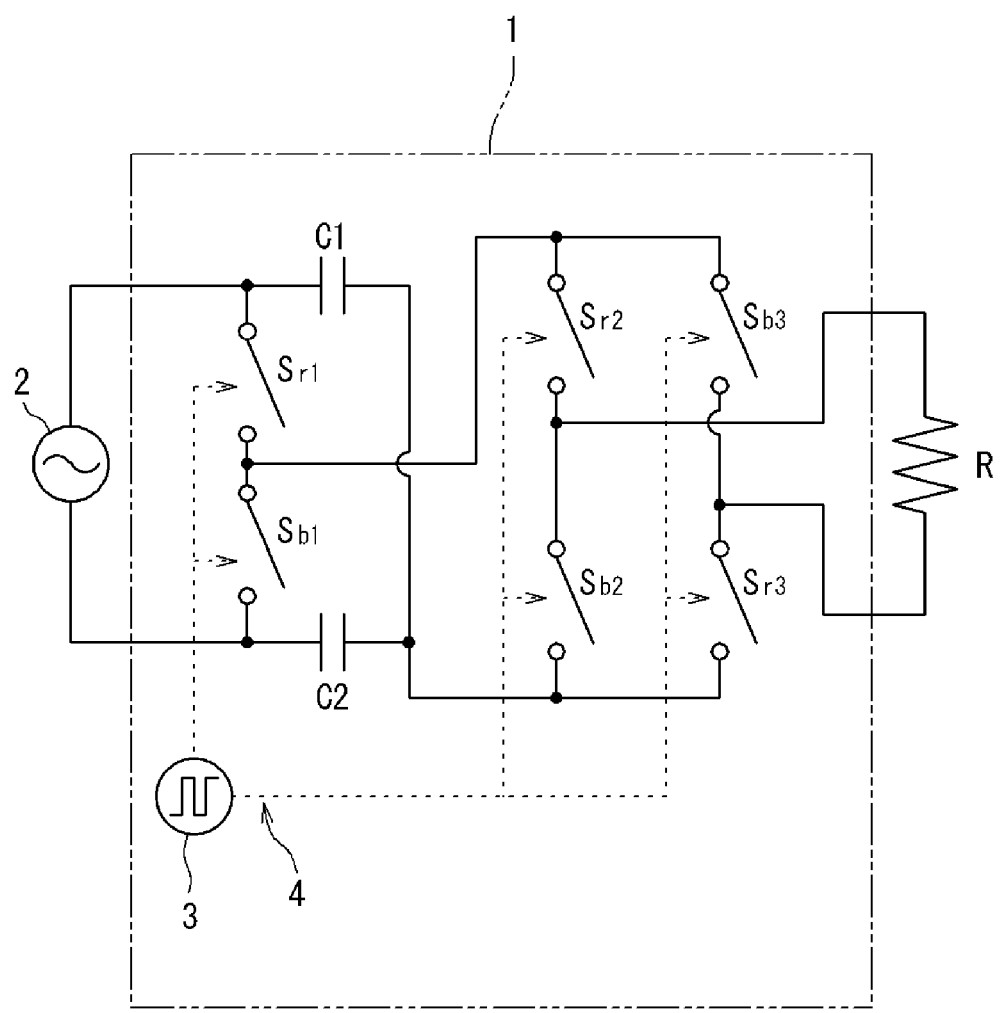
FIG. 17 is a circuit diagram showing a transformer according to the tenth embodiment.

FIG. 17 is a circuit diagram showing a transformer 1 according to the tenth embodiment. In this transformer 1, only a front stage circuit has reactance elements. The front stage circuit includes two capacitors C1 and C2 and two switches $S_{r1}$ and $S_{b1}$. The rear stage circuit is composed of four switches $S_{r2}$, $S_{r3}$, $S_{b2}$, and $S_{b3}$ which form a full-bridge circuit.

A switching control section 3 is provided for performing ON/OFF control of the switches $S_{r1}$, $S_{r2}$, $S_{r3}$, $S_{b1}$, $S_{b2}$, and $S_{b3}$. The six switches $S_{r1}$, $S_{r2}$, $S_{r3}$, $S_{b1}$, $S_{b2}$, and $S_{b3}$ and the switching control section 3 form the switch device 4 which switches the circuit connection state of the transformer 1. The switches $S_{r1}$, $S_{r2}$, and $S_{r3}$ operate in synchronization with each other, and the switches $S_{b1}$, $S_{b2}$, and $S_{b3}$ operate in synchronization with each other. The three switches $S_{r1}$, $S_{r2}$, and $S_{r3}$ and the other three switches $S_{b1}$, $S_{b2}$, and $S_{b3}$ operate so as to be alternately turned on exclusively from each other.

The circuit in FIG. 17 corresponds to a circuit obtained by changing the rear stage circuit in the circuit in FIG. 1 to a full-bridge circuit, and the concept of operation of the circuit in FIG. 16 is the same as in the circuit in FIG. 1. The rear stage circuit has a function of alternately inverting the polarity of output relative to input through switching, but hardly contributes to transformation.

The voltage transformation ratio of the transformer 1 in FIG. 17 is ½. If the AC power supply 2 and the load R are replaced with each other, the voltage transformation ratio is doubled.

The condition of the circuit parameter C is $1/(2\pi fsC) \ll R \ll 1/(2\pi f_o C)$, as in the case of FIG. 1.

Eleventh Embodiment

Figure 18:
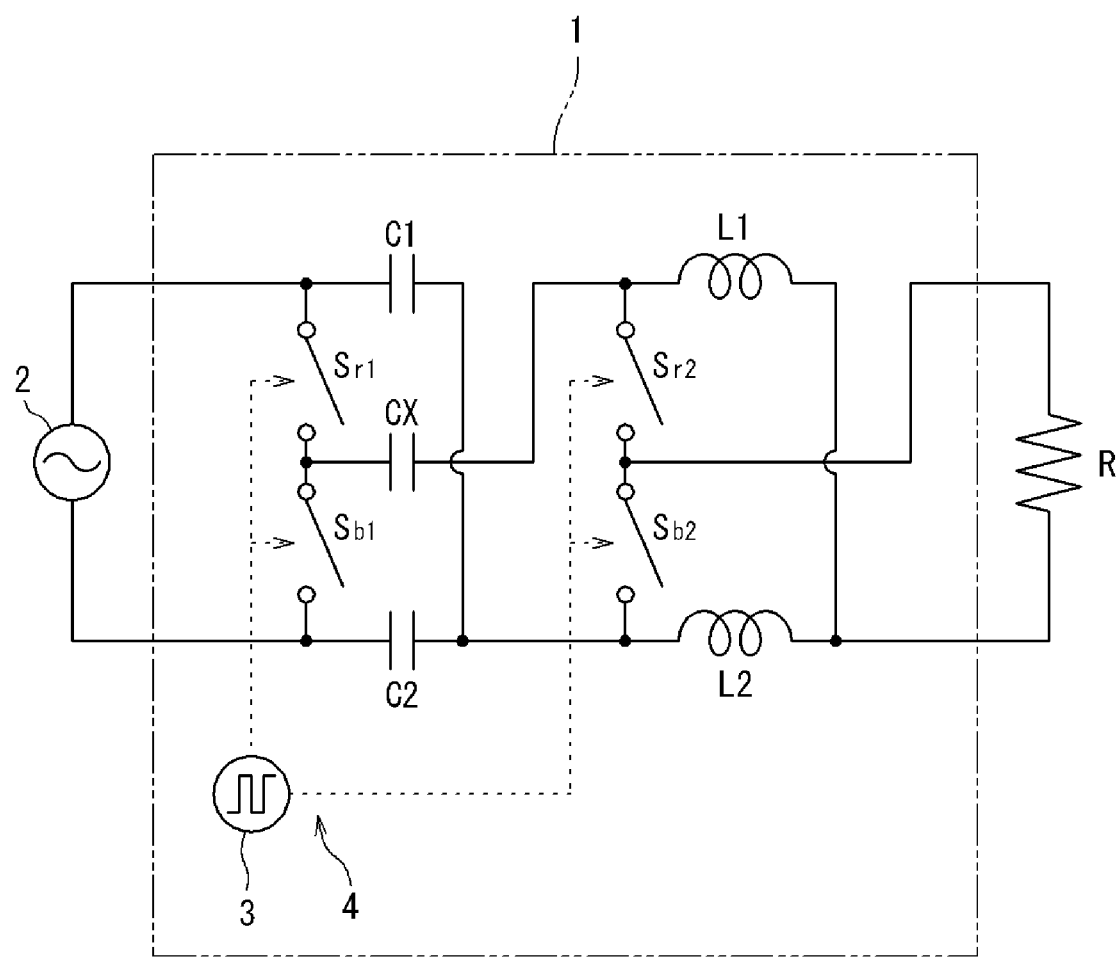
FIG. 18 is a circuit diagram showing a transformer according to the eleventh embodiment.

FIG. 18 is a circuit diagram showing a transformer 1 according to the eleventh embodiment. A difference from FIG. 1 is that a capacitor CX is provided on a power line from a mutual connection point between the switches $S_{r1}$ and $S_{b1}$ to the inductor side. In other words, in the front stage circuit, the capacitor CX is interposed on an output line that is not linked to the connection point of the series unit of the capacitors C1 and C2. In all the embodiments described above and below, providing such a capacitor CX is effective in the following point.

In this case, when the switch device 4 has failed (for example, the switches $S_{r1}$ and $S_{r2}$ or $S_{b1}$ and $S_{b2}$ remain ON) or when earth fault or short-circuit has occurred on a line, excessive current can be prevented from flowing from the AC power supply 2 to the load R. Besides, this configuration is effective for isolating the front stage side and the rear stage side from each other in terms of DC.

The capacitor CX can also be provided in the rear stage circuit in the same manner.

Twelfth Embodiment

Next, an example of a transformer 1 having a multistage configuration to obtain a greater voltage transformation ratio will be described.

Figure 19:
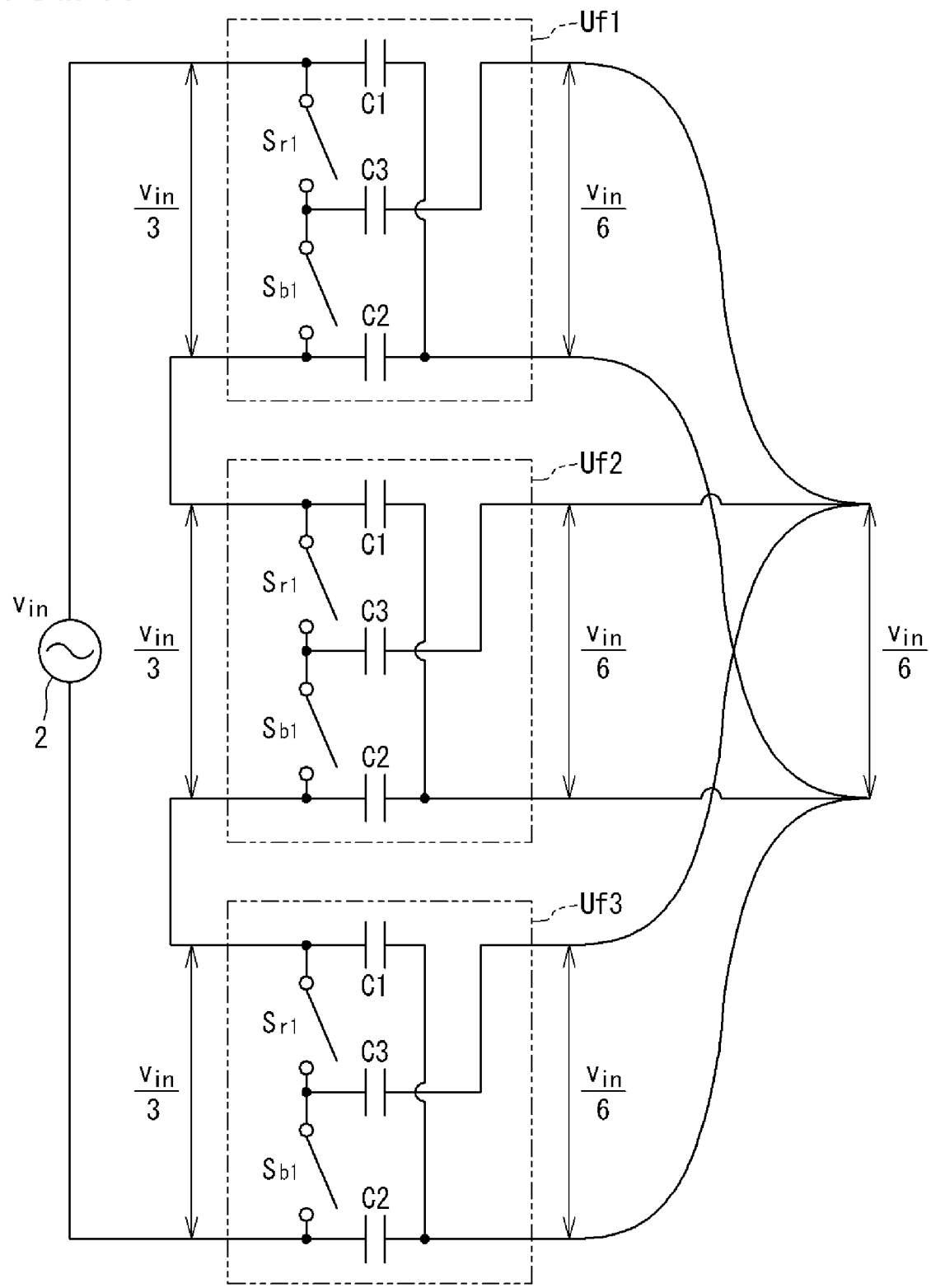
FIG. 19 is a circuit diagram showing front stage circuits of a transformer according to the twelfth embodiment.

FIG. 19 is a circuit diagram showing a front stage circuit of the transformer 1 according to the twelfth embodiment. In this circuit diagram, for example, a circuit obtained by adding a capacitor C3 to the front stage circuit in FIG. 1 is considered to be one unit, and three such units are arranged. The capacitor C3 is interposed on an output line that is not linked to the connection point of the series unit of the capacitors C1 and C2. The switch device 4 in FIG. 1 is not shown but is provided in the same manner.

In FIG. 19, units Uf1, Uf2, and Uf3 are connected in series to each other on the input side, and input voltage is equally divided among the units Uf1, Uf2, and Uf3. On the output side, the units Uf1, Uf2, and Uf3 are connected in parallel with each other, and output voltage of each unit Uf1, Uf2, and Uf3 directly serves as the entire output voltage. That is, if the entire input voltage is $v_{in}$, input voltage to each unit Uf1, Uf2, and Uf3 is $v_{in}/3$. The output voltage has a pulse train waveform (for example, a waveform as shown in FIG. 5) corresponding to ($v_{in}/6$).

Figure 20:
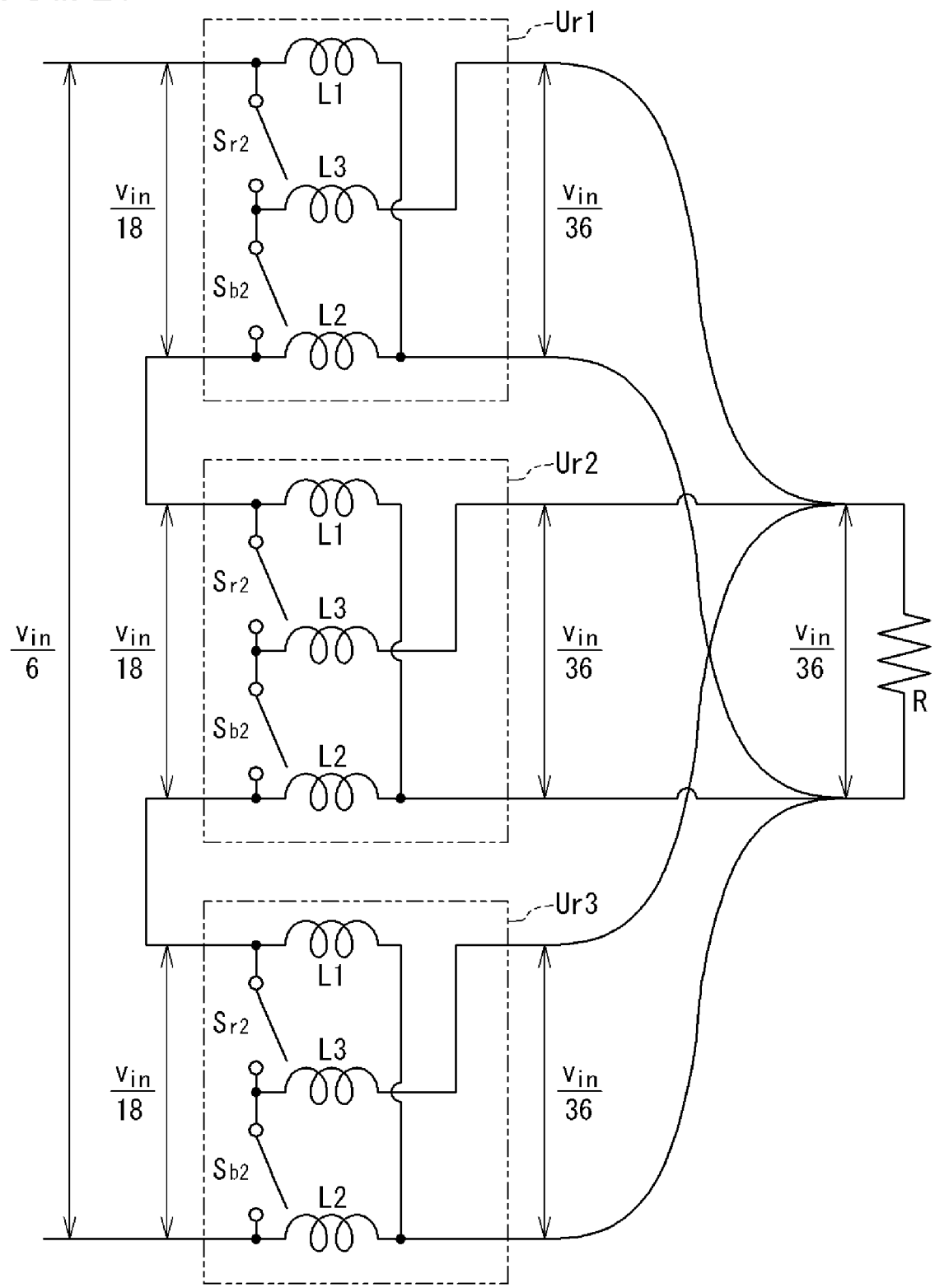
FIG. 20 is a circuit diagram showing rear stage circuits of the transformer according to the twelfth embodiment.

FIG. 20 is a circuit diagram showing a rear stage circuit of the transformer 1 according to the twelfth embodiment. In this circuit diagram, for example, a circuit obtained by adding an inductor L3 to the rear stage circuit in FIG. 1 is considered to be one unit, and three such units are arranged. The inductor L3 is interposed on an output line that is not linked to the connection point of the series unit of the inductors L1 and L2. The switch device 4 in FIG. 1 is not shown but is provided in the same manner.

In FIG. 20, units Ur1, Ur2, and Ur3 are connected in series to each other on the input side, and input voltage is equally divided among the units Ur1, Ur2, and Ur3. On the output side, the units Ur1, Ur2, and Ur3 are connected in parallel with each other, and output voltage of each unit Ur1, Ur2, and Ur3 directly serves as the entire output voltage. That is, if the entire input voltage is $v_{in}/6$, input voltage to each unit Ur1, Ur2, and Ur3 is $v_{in}/18$. The output voltage is $v_{in}/36$.

In FIG. 19 and FIG. 20, for example, the switches ($S_{r1}$ and $S_{r2}$, six switches in total) on the upper side in the respective units of the front stage circuit and the rear stage circuit operate in synchronization with each other, and the switches ($S_{b1}$ and $S_{b2}$, six switches in total) on the lower side in the respective units operate in synchronization with each other. The six switches on the upper side and the six switches on the lower side operate so as to be alternately turned on exclusively from each other.

As for the switching timing, another pattern different from the above may be used. For example, the switches (three switches) on the upper side in the respective units of the front stage circuit (FIG. 19) and the switches (three switches) on the lower side in the respective units of the rear stage circuit (FIG. 20) may operate in synchronization with each other, and the switches (three switches) on the lower side in the respective units of the front stage circuit and the switches (three switches) on the upper side in the respective units of the rear stage circuit may operate in synchronization with each other. Then, the former set of switches (six switches) and the latter set of switches (six switches) may operate so as to be alternately turned on exclusively from each other.

The number of units shown in FIG. 19 and FIG. 20 is merely an example. Both the front stage circuit and the rear stage circuit may have any number of units. For example, in the case where the number of units in the front stage circuit is $N_F$ and the number of units in the rear stage circuit is $N_R$, the voltage transformation ratio of the transformer 1 is $(\frac{1}{2}N_F) \cdot (\frac{1}{2}N_R)$. Thus, various voltage transformation ratios can be easily realized.

The circuit parameter condition is the same as in the first embodiment.

Figure 19A:
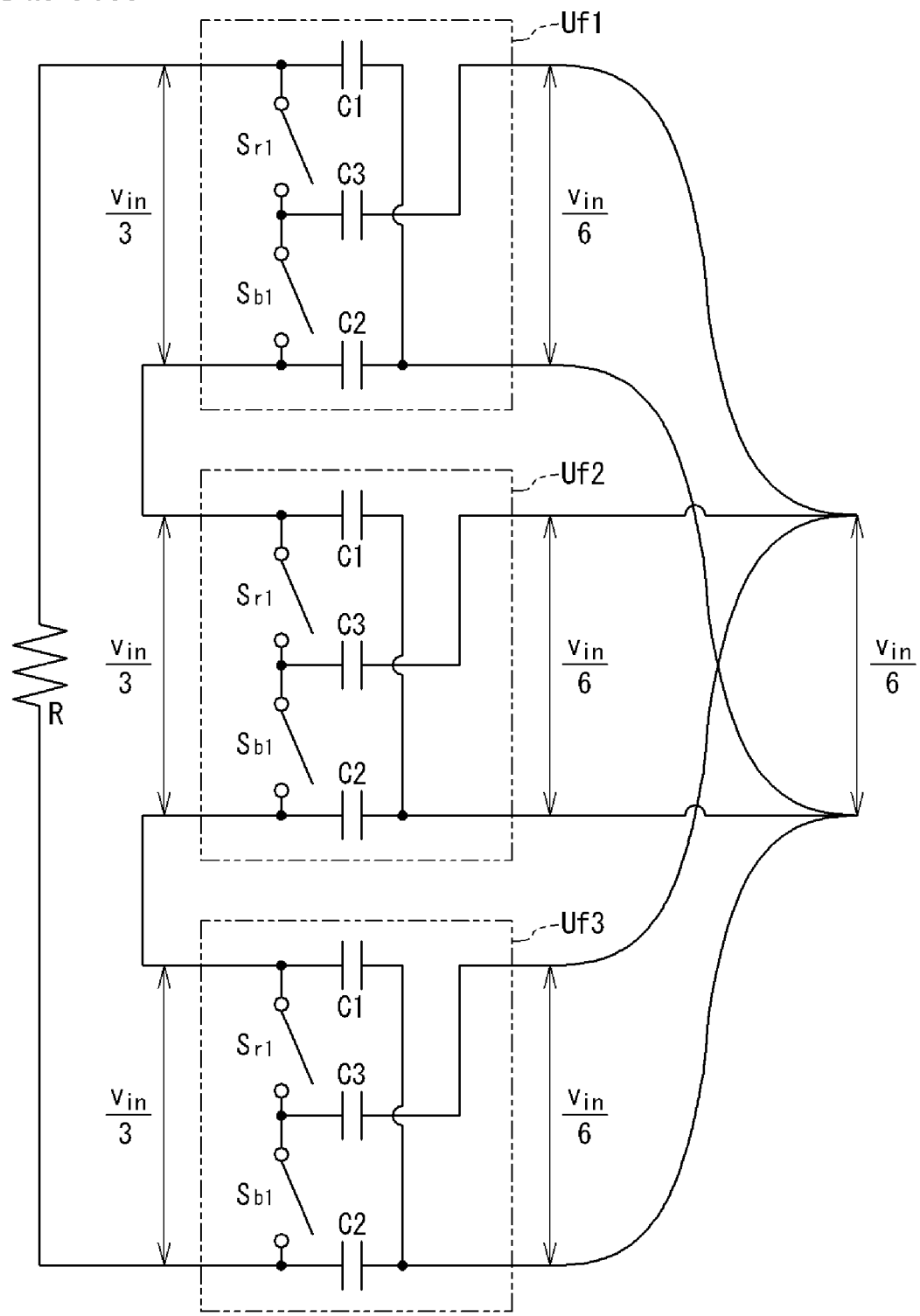
FIG. 19A is a circuit diagram as in FIG. 19, wherein the AC power supply is replaced with a load.
Figure 20A:
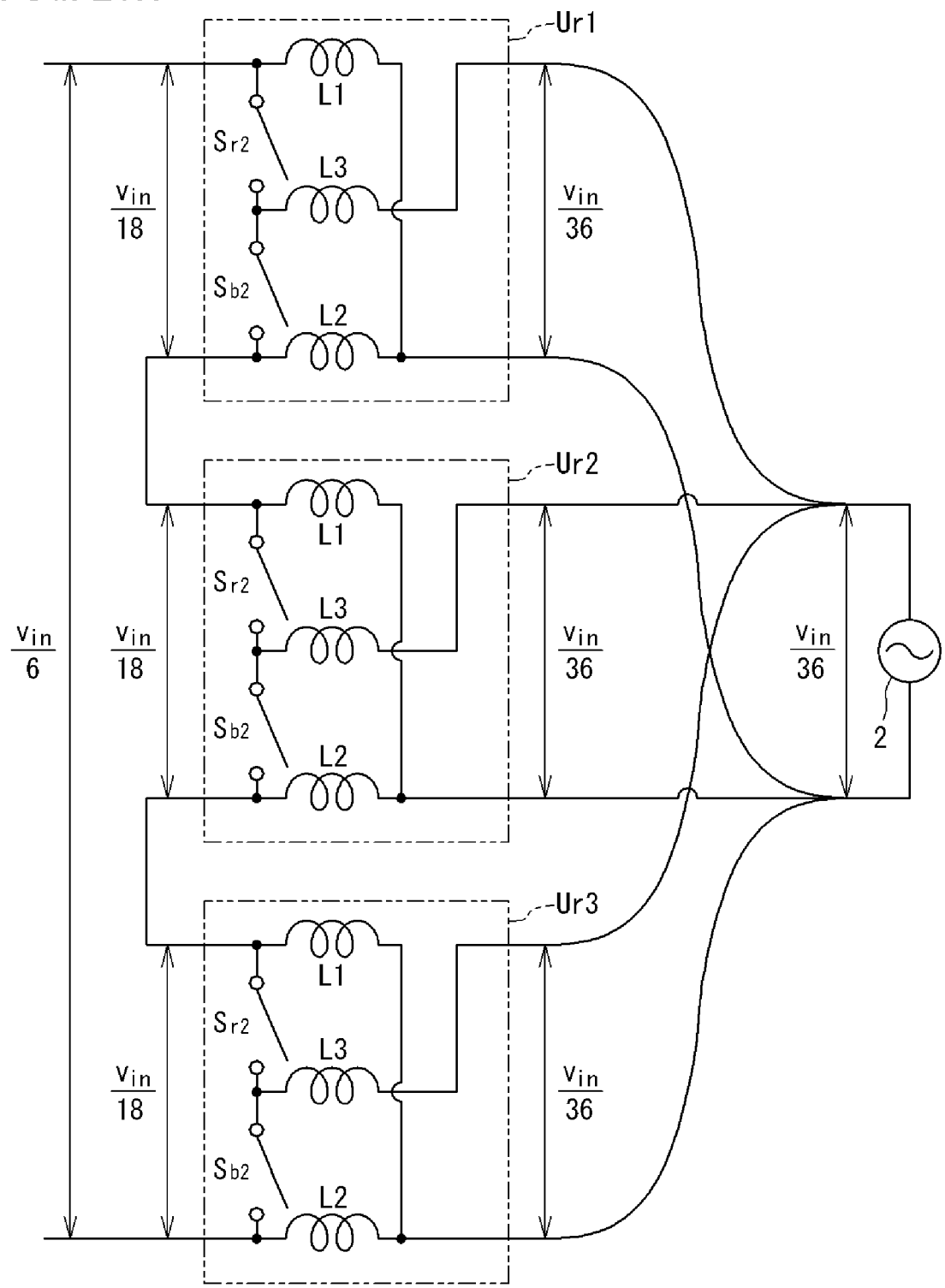
FIG. 20A is a circuit diagram as in FIG. 20, wherein the load is replaced with an AC power supply.

The circuit configuration of the twelfth embodiment is also reversible, and the AC power supply and the load can be replaced with each other, as shown in FIG. 19A and FIG. 20A.

The capacitor C3 in FIG. 19 is provided at the same location as the capacitor CX in FIG. 18. However, the capacitor C3 in FIG. 19 is provided not for the purpose of measure for failure as in the capacitor CX, but as a circuit element needed for multistage connection. That is, the capacitor C3 in FIG. 19 is provided in order to prevent short-circuit between the units and keep a potential difference between the units on the input side. The number thereof can be decreased as long as such short-circuit can be prevented. For example, although, in FIG. 19, the capacitor C3 is provided in each of the three units and thus there are three capacitors C3 in total, the number thereof can be decreased to two.

Figure 45:
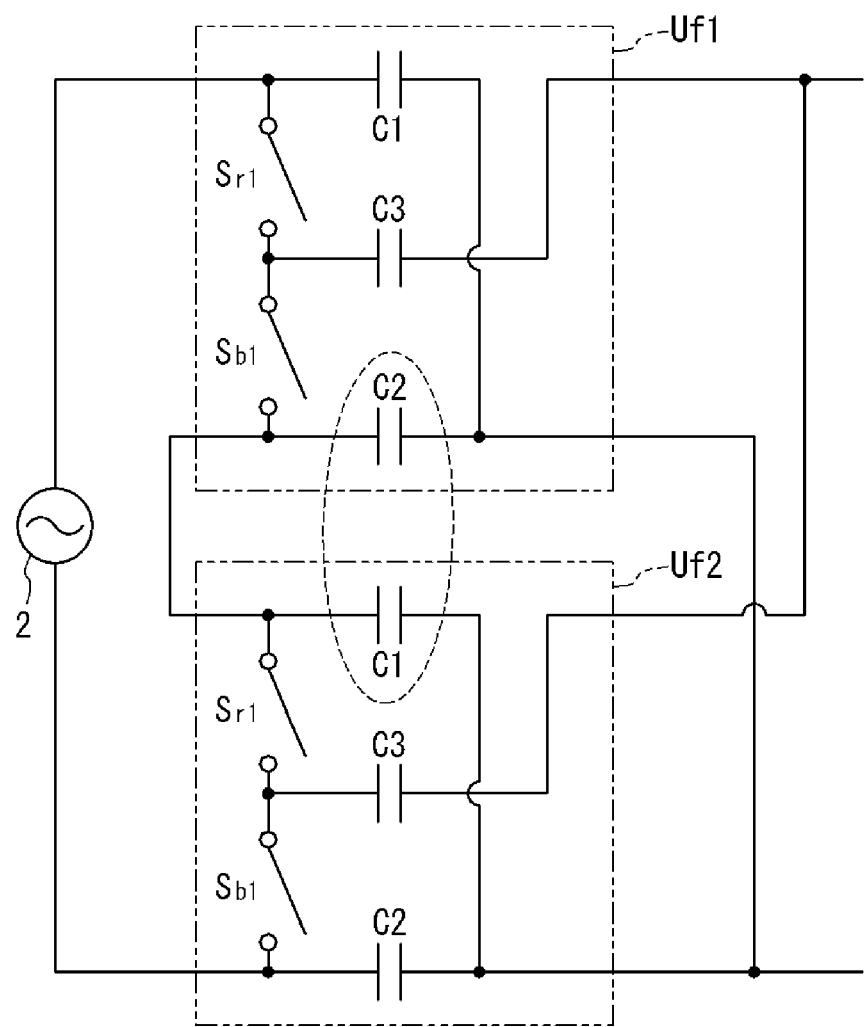
FIG. 45 is a circuit diagram showing only two units of the three units of front stage circuits in FIG. 19.
Figure 46:
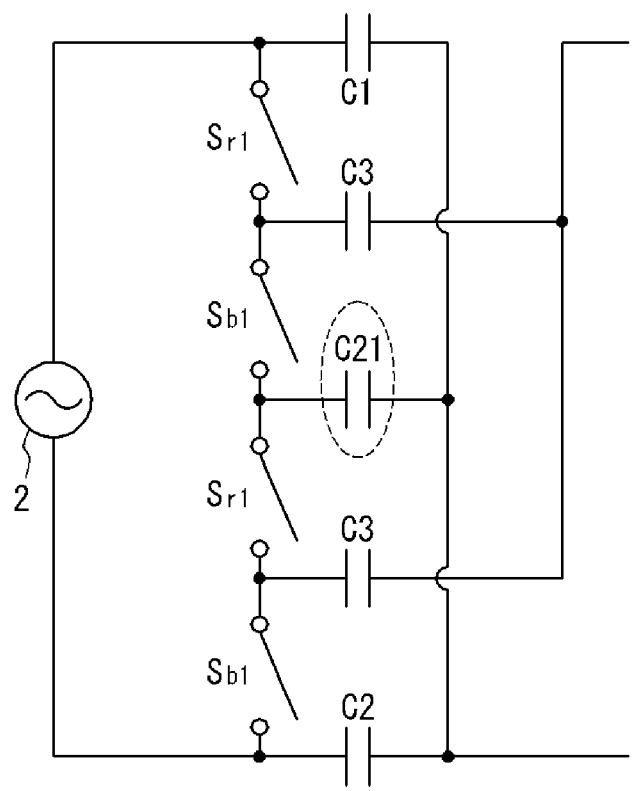
FIG. 46 is a circuit equivalent to FIG. 45.

For example, FIG. 45 is a circuit diagram showing only two units Uf1 and Uf2 of the three units in the front stage circuit in FIG. 19. In FIG. 45, two capacitors C2 and C1 enclosed by an ellipse can also be represented as a single capacitor which is equivalent in terms of electric circuitry. If this single capacitor is denoted by, for example, C21, FIG. 46 is a circuit equivalent to the circuit in FIG. 45. One of the five capacitors in FIG. 46 can be removed as long as short-circuit does not occur due to switching operation. For example, in the case where the one capacitor to be removed is the capacitor C21, if the capacitor C21 is removed (short-circuited), the same circuit as the front stage circuit in FIG. 11 is obtained.

Figure 47:
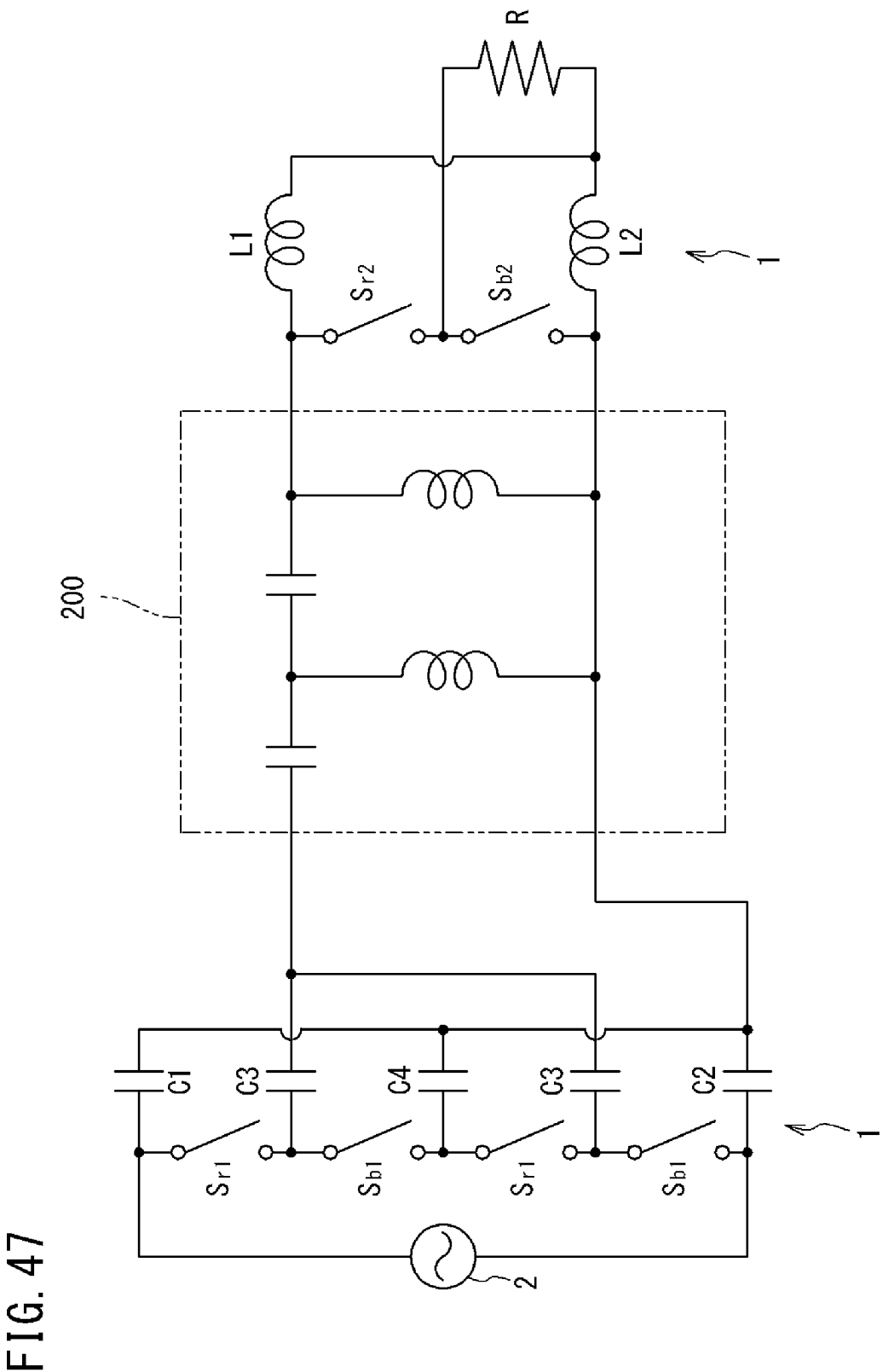
FIG. 47 is a circuit diagram showing a complex transformer in which a transformer with a lumped constant circuit described later is interposed between a front stage circuit and a rear stage circuit of the transformer in FIG. 12.

FIG. 47 is a circuit diagram showing a complex transformer in which a transformer 200 with a lumped constant circuit described later is interposed between the front stage circuit and the rear stage circuit of the transformer 1 in FIG. 12. In this case, owing to a head capacitor in the transformer 200, it is possible to prevent short-circuit from occurring due to switching operation, even if, for example, the capacitors C1 and C3 of the five capacitors in the front stage circuit of the transformer 1 are removed (short-circuited).

Returning to FIG. 20, the inductor L3 in the rear stage circuit is also provided as a circuit element needed for multistage connection. That is, the inductor L3 in FIG. 20 is provided in order to ensure that the units are isolated from each other in terms of high frequency and keep a potential difference between the units on the input side. The number thereof can be decreased as long as the isolation state can be maintained. For example, although, in FIG. 20, the inductor L3 is provided in each of the three units and thus there are three inductors L3 in total, the number thereof can be decreased to two.

Overview of Embodiments

Circuit configurations that can be taken by the transformer 1 will be overviewed based on the above embodiments.

Figure 22:
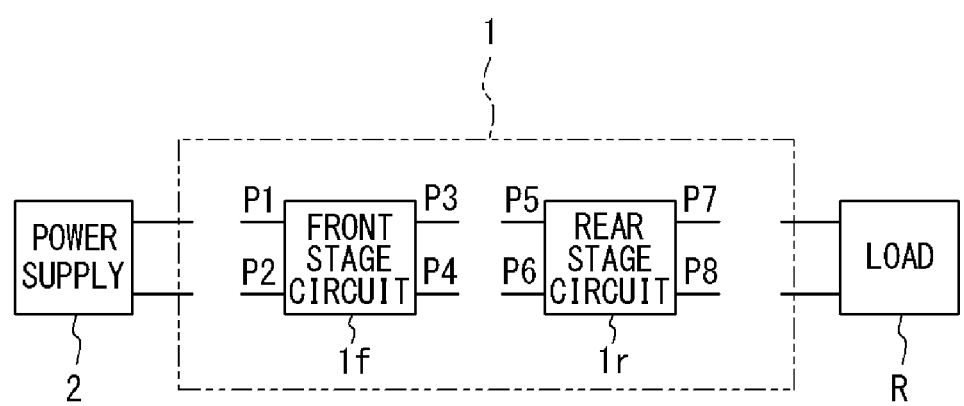
FIG. 22 is a block diagram showing a general schematic diagram of the transformer of each embodiment.

FIG. 22 is a block diagram showing a general schematic configuration of the transformer 1. That is, the transformer 1 is provided between the power supply 2 and the load R, and includes: a front stage circuit 1$f$ having input ports P1 and P2 on a front end side connected to the power supply 2, and output ports P3 and P4 on a rear end side; and a rear stage circuit 1$r$ having output ports P7 and P8 on a rear end side connected to the load R, and input ports P5 and P6 on a front end side.

That is, the transformer 1 is provided between the power supply 2 and the load R, and includes the front stage circuit 1$f$ and the rear stage circuit 1$r$ each having a function of performing switching so as to alternately invert the polarity of output relative to input. In the transformer 1, at least one of the front stage circuit 1$f$ and the rear stage circuit 1$r$ includes a series unit composed of a pair of reactance elements connected in series to each other via a connection point. In the case where both ends of the series unit are used as a first port, the switch device 4 (FIG. 1) included in the transformer 1 causes a part between one end of the series unit and the connection point, and a part between the other end of the series unit and the connection point, to serve as a second port alternately through switching while inverting a polarity, and executes one of power transmission from the first port to the second port, and power transmission from the second port to the first port.

The transformer 1 configured as described above can perform transformation, using a circuit configuration including a pair of reactance elements, and switching. Using such a transformer 1 as a power transformer makes it unnecessary to use a conventional transformer including a coil, an iron core, etc. Therefore, drastic size reduction and weight reduction of a transformer can be realized, and as a result, cost reduction can be realized. In addition, problems of parasitic capacitance and occurrence of magnetic field leakage, which arise in a high-frequency transformer, are also solved, and thus a transformer with low loss can be realized.

Next, variation in circuit configurations will be overviewed.

Figure 23:
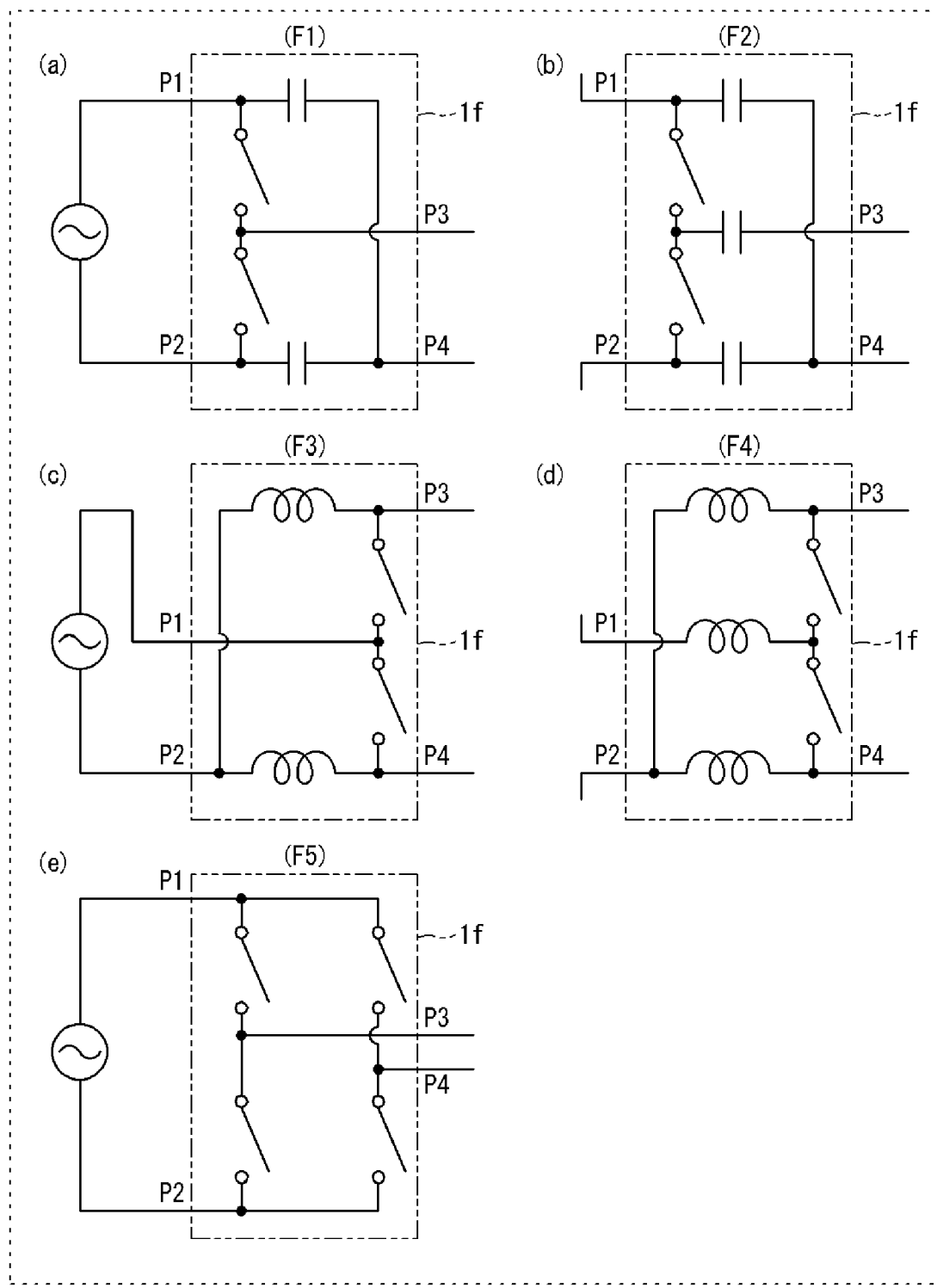
FIG. 23 is a diagram showing basic forms of circuits that can be selected as a front stage circuit of a transformer.

FIG. 23 is a diagram showing basic forms of circuits that can be selected as the front stage circuit 1$f$.

As the front stage circuit of the transformer 1, one of (F1) to (F5) shown below can be selected.

(F1) is a front stage circuit 1$f$ shown in (a) of FIG. 23.

That is, (F1) is a front stage circuit in which both ends of a series unit composed of a pair of capacitors connected in series to each other via a capacitor connection point are respectively connected to the input port P1 and the input port P2, the capacitor connection point being connected to the output port P4, and in which a first switch provided between the input port P1 and the output port P3, and a second switch provided between the input port P2 and the output port P3 are alternately turned on through switching.

(F2) is a front stage circuit having a multistage configuration using a plurality of units each of which is a front stage circuit 1$f$ shown in (b) of FIG. 23. To realize the multistage configuration, a capacitor is needed also on a line directly connected to the output port P3.

That is, (F2) is a front stage circuit including a plurality of units each of which is obtained by interposing a capacitor on a line directly connected to the output port P3 in the front stage circuit of (F1), the input ports P1 and P2 of the plurality of units being connected in series to each other, the output ports P3 and P4 of the plurality of units being connected in parallel to each other.

(F3) is a front stage circuit 1$f$ shown in (c) of FIG. 23.

That is, (F3) is a front stage circuit in which both ends of a series unit composed of a pair of inductors connected in series to each other via an inductor connection point are respectively connected to the output port P3 and the output port P4, the inductor connection point being connected to the input port P2, and in which a first switch provided between the input port P1 and the output port P3, and a second switch provided between the input port P1 and the output port P4 are alternately turned on through switching.

(F4) is a front stage circuit having a multistage configuration using a plurality of units each of which is a front stage circuit 1$f$ shown in (d) of FIG. 23. To realize the multistage configuration, an inductor is needed also on a line directly connected to the input port P1.

That is, (F4) is a front stage circuit including a plurality of units each of which is obtained by interposing an inductor on a line directly connected to the input port P1 in the front stage circuit of (F3), the input ports P1 and P2 of the plurality of units being connected in parallel to each other, the output ports P3 and P4 of the plurality of units being connected in series to each other.

(F5) is a front stage circuit 1$f$ shown in (e) of FIG. 23.

That is, (F5) is a front stage circuit configured to be a full-bridge circuit with four switches so as to receive input through the input ports P1 and P2 and perform output through the output ports P3 and P4.

Figure 24:
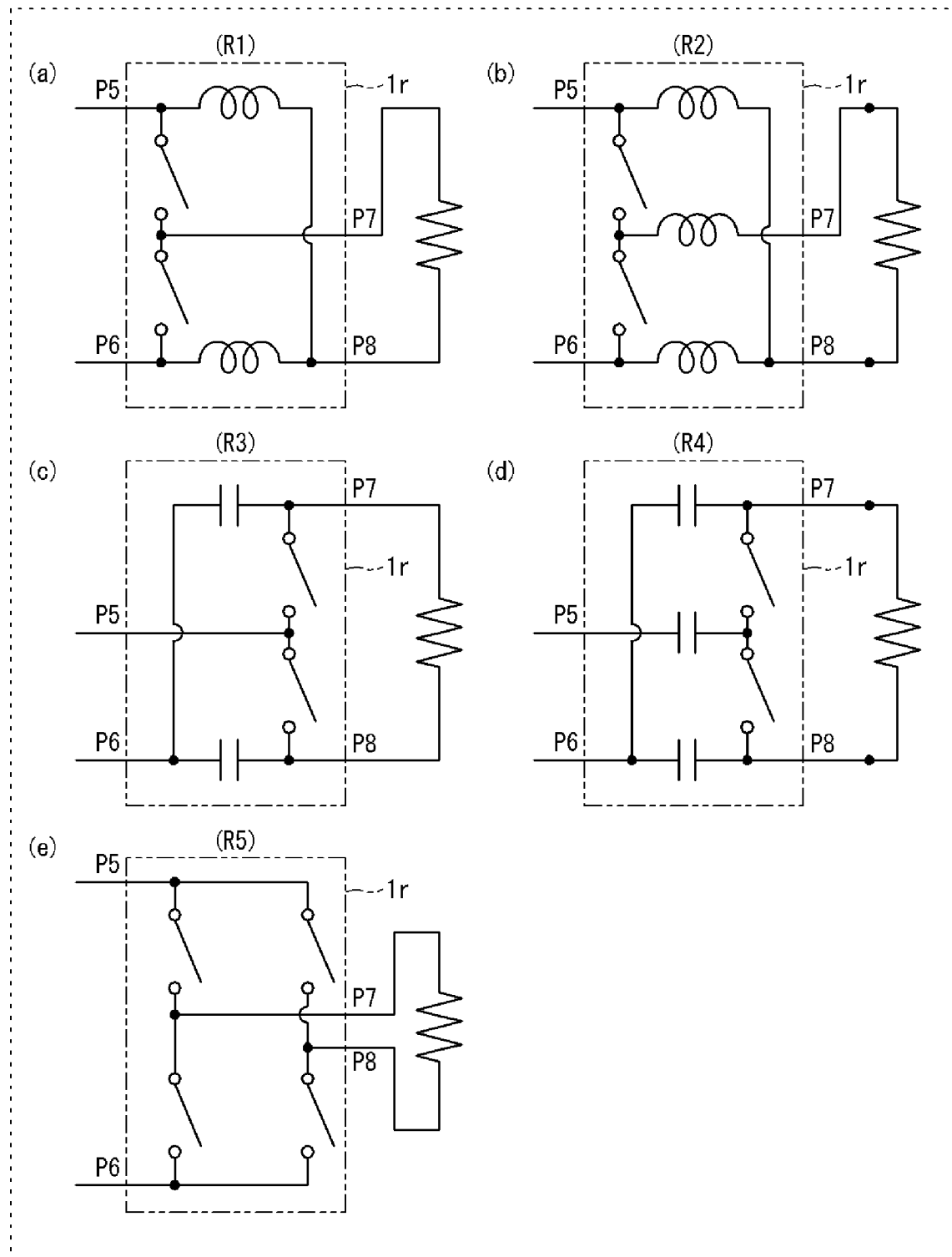
FIG. 24 is a diagram showing basic forms of circuits that can be selected as a rear stage circuit of a transformer.

FIG. 24 is a diagram showing basic forms of circuits that can be selected as the rear stage circuit 1$r$.

As the rear stage circuit of the transformer 1, one of (R1) to (R5) shown below can be selected.

(R1) is a rear stage circuit 1r shown in (a) of FIG. 24.

That is, (R1) is a rear stage circuit in which both ends of a series unit composed of a pair of inductors connected in series to each other via an inductor connection point are respectively connected to the input port P5 and the input port P6, the inductor connection point being connected to the output port P8, and in which a first switch provided between the input port P5 and the output port P7, and a second switch provided between the input port P6 and the output port P7 are alternately turned on through switching.

(R2) is a rear stage circuit having a multistage configuration using a plurality of units each of which is a rear stage circuit 1r shown in (b) of FIG. 24. To realize the multistage configuration, an inductor is needed also on a line directly connected to the output port P7.

That is, (R2) is a rear stage circuit including a plurality of units each of which is obtained by interposing an inductor on a line directly connected to the output port P7 in the rear stage circuit of (R1), the input ports P5 and P6 of the plurality of units being connected in series to each other, the output ports P7 and P8 of the plurality of units being connected in parallel to each other.

(R3) is a rear stage circuit 1r shown in (c) of FIG. 24.

That is, (R3) is a rear stage circuit in which both ends of a series unit composed of a pair of capacitors connected in series to each other via a capacitor connection point are respectively connected to the output port P7 and the output port P8, the capacitor connection point being connected to the input port P6, and in which a first switch provided between the input port P5 and the output port P7, and a second switch provided between the input port P5 and the output port P8 are alternately turned on through switching.

(R4) is a rear stage circuit having a multistage configuration using a plurality of units each of which is a rear stage circuit 1r shown in (d) of FIG. 24. To realize the multistage configuration, a capacitor is needed also on a line directly connected to the input port P5.

That is, (R4) is a rear stage circuit including a plurality of units each of which is obtained by interposing a capacitor on a line directly connected to the input port P5 in the rear stage circuit of (R3), the input ports P5 and P6 of the plurality of units being connected in parallel to each other, the output ports P7 and P8 of the plurality of units being connected in series to each other.

(R5) is a rear stage circuit shown in (e) of FIG. 24.

That is, (R5) is a rear stage circuit configured to be a full-bridge circuit with four switches so as to receive input through the input ports P5 and P6 and perform output through the output ports P7 and P8.

The transformer may include one of the front stage circuits (F1) to (F5) and one of the rear stage circuits (R1) to (R5), excluding a combination that the front stage circuit is (F5) and the rear stage circuit is (R5).

In such a transformer, transformation can be performed using the circuit configuration and switching. Using such a transformer as a power transformer makes it unnecessary to use a conventional transformer including a coil, an iron core, etc. Therefore, drastic size reduction and weight reduction of a transformer can be realized, and as a result, cost reduction can be realized. In addition, problems of parasitic capacitance and occurrence of magnetic field leakage, which arise in a high-frequency transformer, are also solved, and thus a transformer with low loss can be realized.

A relationship between a combination of the front stage circuit and the rear stage circuit in the above transformer, and a voltage transformation ratio thereof is as shown in the following table 1. In the table 1, "C" denotes a circuit using a capacitor, "L" denotes a circuit using an inductor, and "FB" denotes a circuit using a full-bridge circuit.

TABLE 1

| Voltage transformation ratio | | | Rear stage circuit | | | |
|---|---|---|---|---|---|---|
| | | | L | | C | FB |
| | | | R1 | R2 | R3 | R4 | R5 |
| Front stage circuit | C | F1 | $\frac{1}{4}$ | $\frac{1}{4N_R}$ | 1 | $N_R$ | $\frac{1}{2}$ |
| | | F2 | $\frac{1}{4N_F}$ | $\frac{1}{4N_F \cdot N_R}$ | $\frac{1}{N_F}$ | $\frac{N_R}{N_F}$ | $\frac{1}{2N_F}$ |
| | L | F3 | 1 | $\frac{1}{N_R}$ | 4 | $4N_R$ | 2 |
| | | F4 | $N_F$ | $\frac{N_F}{N_R}$ | $4N_F$ | $4N_F \cdot N_R$ | $2N_F$ |
| | FB | F5 | $\frac{1}{2}$ | $\frac{1}{2N_R}$ | 2 | $2N_R$ | |

Thus, various voltage transformation ratios can be easily realized.

A plurality of such transformers including any of the front stage circuits and any of the rear stage circuits may be connected in cascade. In this case, in both step-up operation and step-down operation, a great voltage transformation ratio can be realized.

In the transformers of the above embodiments, a capacitance and an inductance of a cable can also be used as the capacitors and the inductors. The cable has an advantage that voltage withstanding performance can be easily obtained and the cost thereof is low.

In the above embodiments, the power supply is the AC power supply 2. However, the above transformer 1 is also applicable to the case of a DC power supply, and can also be used as a DC/DC converter.

Thirteenth Embodiment

Figure 48:
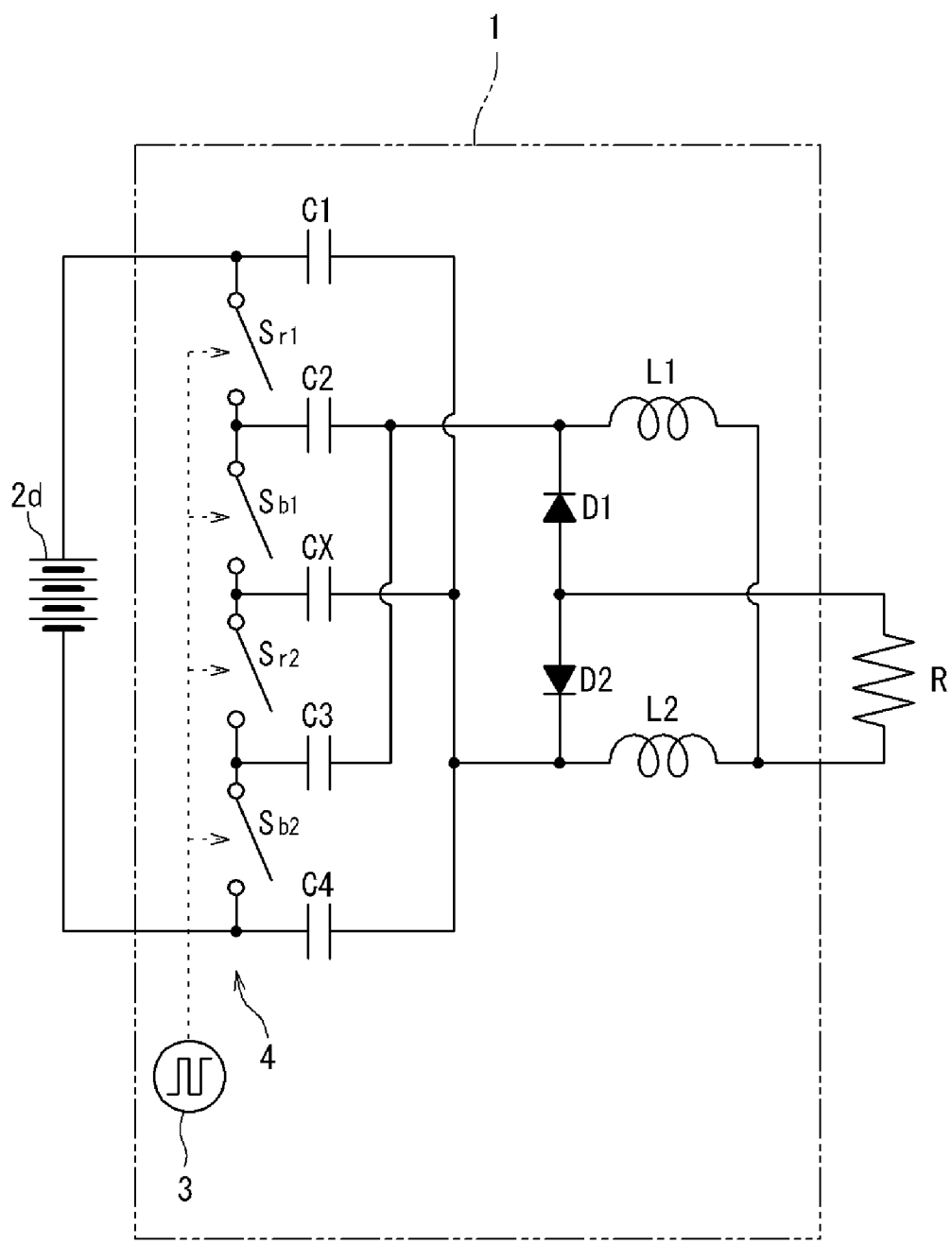
FIG. 48 is a circuit diagram showing a transformer 1 according to the thirteenth embodiment.

Next, an example of a transformer whose power supply is a DC power supply and whose rear stage circuit has a configuration different from those in the above embodiments will be complementally described. FIG. 48 is a circuit diagram showing a transformer 1 according to the thirteenth embodiment. The transformer 1 includes a front stage circuit including five capacitors C1, C2, C3, C4, and CX and four switches $S_{r1}$, $S_{b1}$, $S_{r2}$, and $S_{b2}$, and a rear stage circuit including two inductors L1 and L2 and two diodes D1 and D2. Anodes of the diodes D1 and D2 are connected to each other. Alternatively, cathodes of the diodes D1 and D2 may be connected to each other. A switching control section 3 is provided for performing ON/OFF control of the switches $S_{r1}$, $S_{r2}$, $S_{b1}$, and $S_{b2}$ of the front stage circuit. The circuit parameter condition is the same as in the first embodiment. It is noted that a frequency $f_o$ of the power supply is zero because the power supply is a DC power supply.

Of the above embodiments, for example, FIG. 12 in the fifth embodiment is similar to FIG. 48. As compared to FIG. 12, the power supply is a DC power supply 2d. Besides the four capacitors C1, C2, C3, and C4 involving transformation, the capacitor CX is provided at the center. The capacitor CX is provided for the same reason as for the capacitor CX in FIG. 18 in the eleventh embodiment. In the rear stage circuit, the switches $S_{r3}$ and $S_{b3}$ in FIG. 12 are replaced with the diodes D1 and D2.

The four switches $S_{r1}$, $S_{r2}$, $S_{b1}$, and $S_{b2}$ and the switching control section 3 form the switch device 4 which switches the circuit connection state of the transformer 1. The switches $S_{r1}$ and $S_{r2}$ operate in synchronization with each other, and the switches $S_{b1}$ and $S_{b2}$ operate in synchronization with each other. The two switches $S_{r1}$ and $S_{r2}$ and the other two switches $S_{b1}$ and $S_{b2}$ operate so as to be alternately turned on exclusively from each other.

By output voltage of the front stage circuit, current flows through the series unit of the inductors L1 and L2. In accordance with the polarity of output voltage (input voltage of the rear stage circuit) of the front stage circuit, current flows from the mutual connection point of the series unit of the inductors L1 and L2 through the load R and one of the diodes D1 and D2. Thus, voltage that is ½ of input voltage of the rear stage circuit is outputted to the load R.

That is, the voltage transformation ratio of the transformer 1 in FIG. 48, i.e., $(1/(2N_F))\times(1/(2N_R))$ becomes $(1/(2\cdot2))\times(1/(2\cdot1))=\frac{1}{8}$.

The circuit parameter condition is $2\pi f_o L \ll R \ll 2\pi fsL$, and $1/(2\pi fsC) \ll R \ll 1/(2\pi f_o C)$ as in the case of FIG. 1, but here, $f_o$ is zero.

Thus, in the case where the power supply is a DC power supply, diodes can be used in place of the switches in the rear stage circuit. That is, the diodes can be a kind of switches composing the rear stage circuit. The diodes need not be controlled, and the cost thereof is lower than semiconductor switching elements.

The circuit configuration in FIG. 48 is not reversible, and the DC power supply 2d and the load R cannot be replaced with each other.

Figure 49:
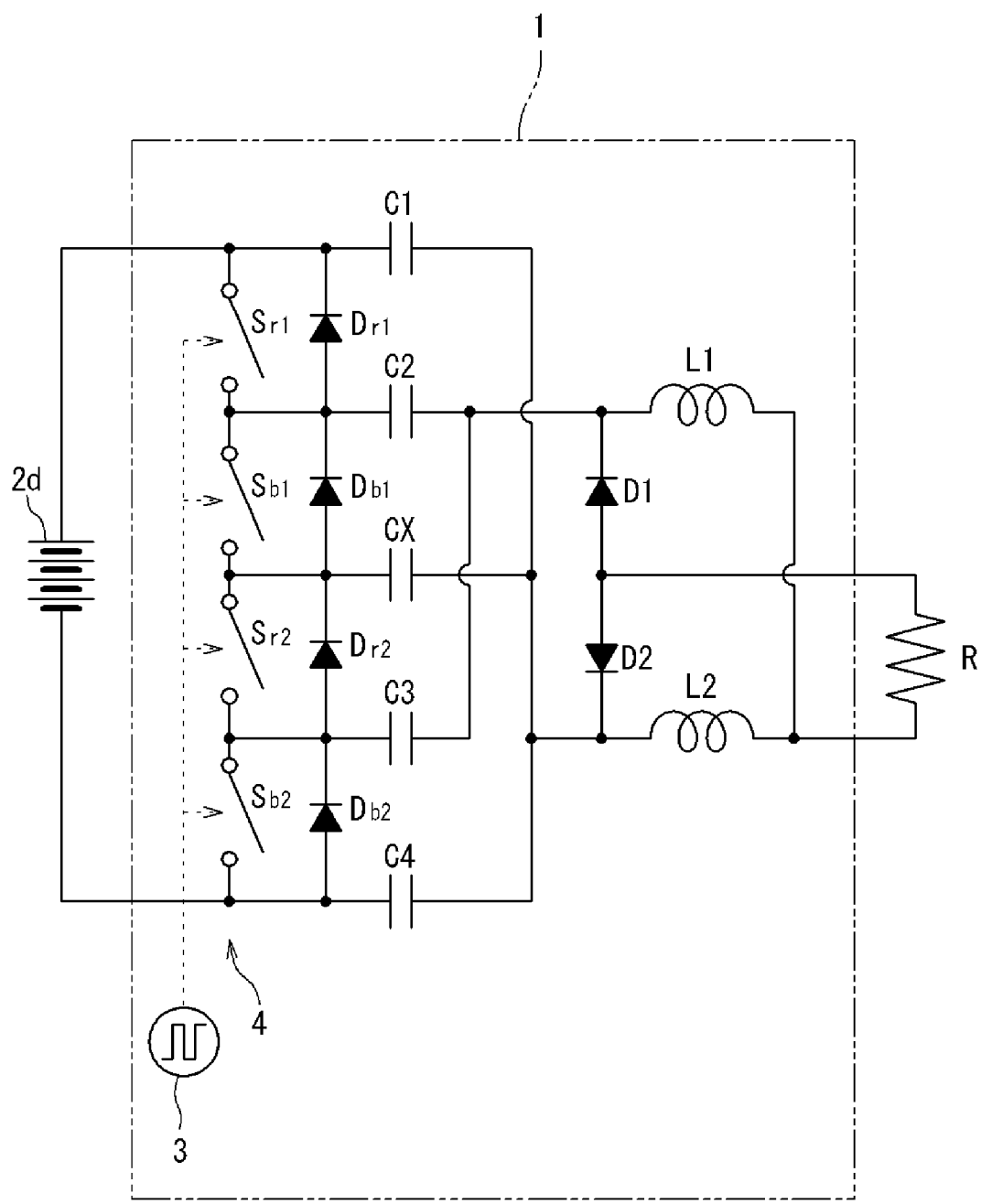
FIG. 49 is a circuit diagram in which freewheel diodes are added in the transformer in FIG. 48.

FIG. 49 is a circuit diagram in which freewheel diodes are added in the transformer 1 in FIG. 48. A difference from FIG. 48 is that freewheel diodes $D_{r1}$, $D_{b1}$, $D_{r2}$, and $D_{b2}$ are connected in parallel with the switches $S_{r1}$, $S_{r2}$, $S_{b1}$, and $S_{b2}$, respectively. The freewheel diodes $D_{r1}$, $D_{b1}$, $D_{r2}$, and $D_{b2}$ are provided such that the cathode sides are on the positive side of the DC power supply 2d. The freewheel diodes $D_{r1}$, $D_{b1}$, $D_{r2}$, and $D_{b2}$ may be diodes intrinsic to the switches $S_{r1}$, $S_{r2}$, $S_{b1}$, and $S_{b2}$, or may be external diodes provided separately from the switches $S_{r1}$, $S_{r2}$, $S_{b1}$, and $S_{b2}$.

Providing such freewheel diodes $D_{r1}$, $D_{b1}$, $D_{r2}$, and $D_{b2}$ may reduce loss, and further, may eventually reduce inductances of the inductors L1 and L2 and thus contribute to downsizing.

<<Overview of Embodiments in Case of DC Power Supply>>

Figure 50:
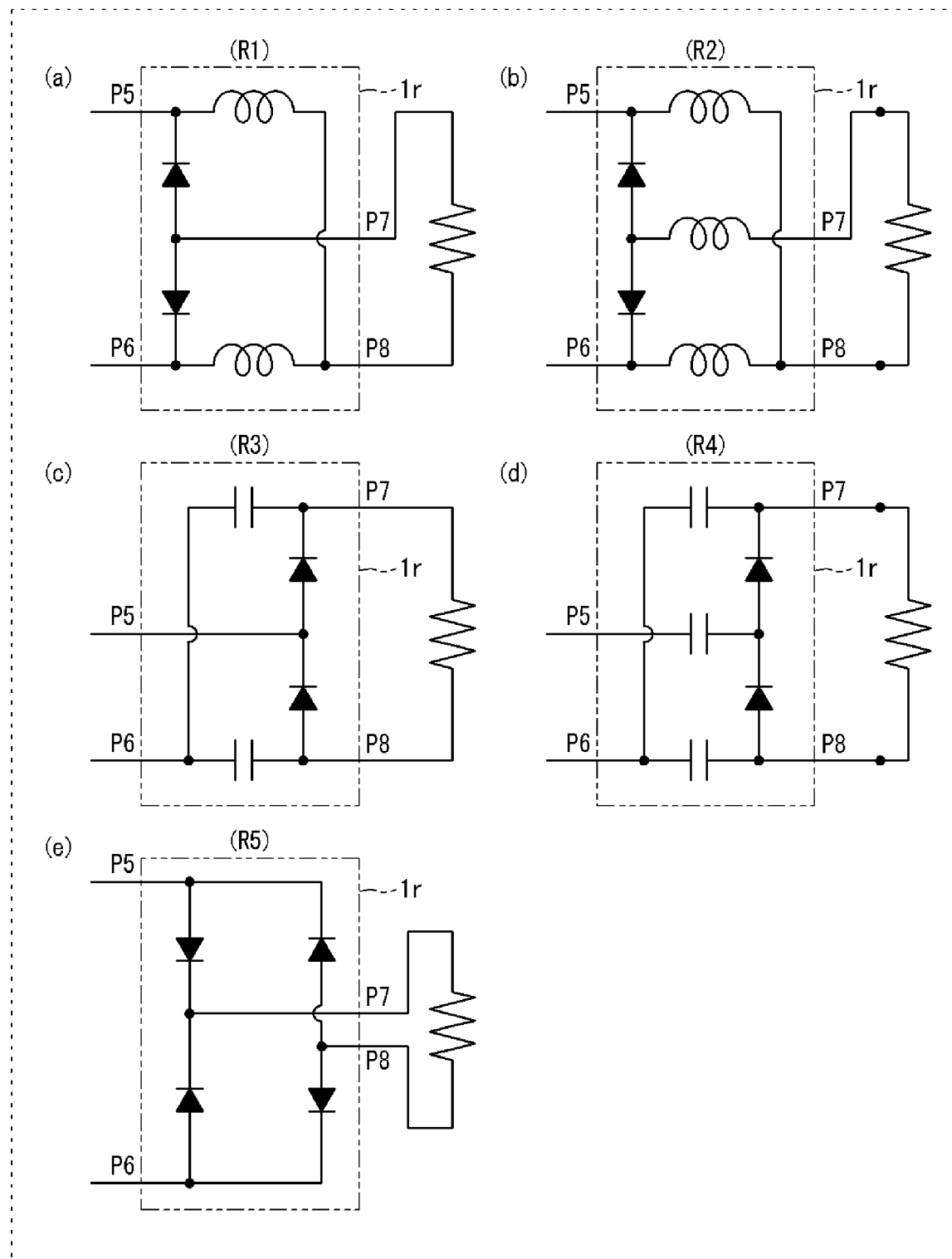
FIG. 50 is a diagram showing basic forms of circuits that can be selected as a rear stage circuit in the case of using diodes.

In association with basic forms of circuits that can be selected as the rear stage circuit 1r shown in FIG. 24, FIG. 50 is a diagram showing basic forms of circuits that can be selected as the rear stage circuit 1r in the case of using diodes.

As the rear stage circuit (using diodes) of the transformer 1 for the DC power supply 2d, one of (R1) to (R5) shown below can be selected.

(R1) is a rear stage circuit 1r shown in (a) of FIG. 50.

That is, (R1) is a rear stage circuit in which both ends of a series unit composed of a pair of inductors connected in series to each other via an inductor connection point are respectively connected to the input port P5 and the input port P6, the inductor connection point being connected to the output port P8, and in which a first diode provided between the input port P5 and the output port P7, and a second diode provided between the input port P6 and the output port P7 alternately become conductive in accordance with the polarity of input voltage.

(R2) is a rear stage circuit having a multistage configuration using a plurality of units each of which is a rear stage circuit 1r shown in (b) of FIG. 50. To realize the multistage configuration, an inductor is needed also on a line directly connected to the output port P7.

That is, (R2) is a rear stage circuit including a plurality of units each of which is obtained by interposing an inductor on a line directly connected to the output port P7 in the rear stage circuit of (R1), the input ports P5 and P6 of the plurality of units being connected in series to each other, the output ports P7 and P8 of the plurality of units being connected in parallel to each other.

(R3) is a rear stage circuit 1r shown in (c) of FIG. 50.

That is, (R3) is a rear stage circuit in which both ends of a series unit composed of a pair of capacitors connected in series to each other via a capacitor connection point are respectively connected to the output port P7 and the output port P8, the capacitor connection point being connected to the input port P6, and in which a first diode provided between the input port P5 and the output port P7, and a second diode provided between the input port P5 and the output port P8 alternately become conductive in accordance with the polarity of input voltage.

(R4) is a rear stage circuit having a multistage configuration using a plurality of units each of which is a rear stage circuit 1r shown in (d) of FIG. 50. To realize the multistage configuration, a capacitor is needed also on a line directly connected to the input port P5.

That is, (R4) is a rear stage circuit including a plurality of units each of which is obtained by interposing a capacitor on a line directly connected to the input port P5 in the rear stage circuit of (R3), the input ports P5 and P6 of the plurality of units being connected in parallel to each other, the output ports P7 and P8 of the plurality of units being connected in series to each other.

(R5) is a rear stage circuit shown in (e) of FIG. 50.

That is, (R5) is a rear stage circuit configured to be a full-bridge circuit with four diodes so as to receive input through the input ports P5 and P6 and perform output through the output ports P7 and P8.

The direction of each diode in (a) to (d) of FIG. 50 may be opposite to that shown in the drawing (the anode and cathode may be reversed).

Thus, in the case where the power supply is a DC power supply, circuit variation at the rear stage increases. Firstly, as in the case of AC power supply, the transformer may include one of the front stage circuits (F1) to (F5) in FIG. 23 and one of the rear stage circuits (R1) to (R5) in FIG. 24, excluding a combination that the front stage circuit is (F5) and the rear stage circuit is (R5).

Secondly, the transformer may include one of the front stage circuits (F1) to (F5) in FIG. 23 and one of the rear stage circuits (R1) to (R5) in FIG. 50, excluding a combination that the front stage circuit is (F5) and the rear stage circuit is (R5).

<<Usage Example of Transformer>>

Figure 51:
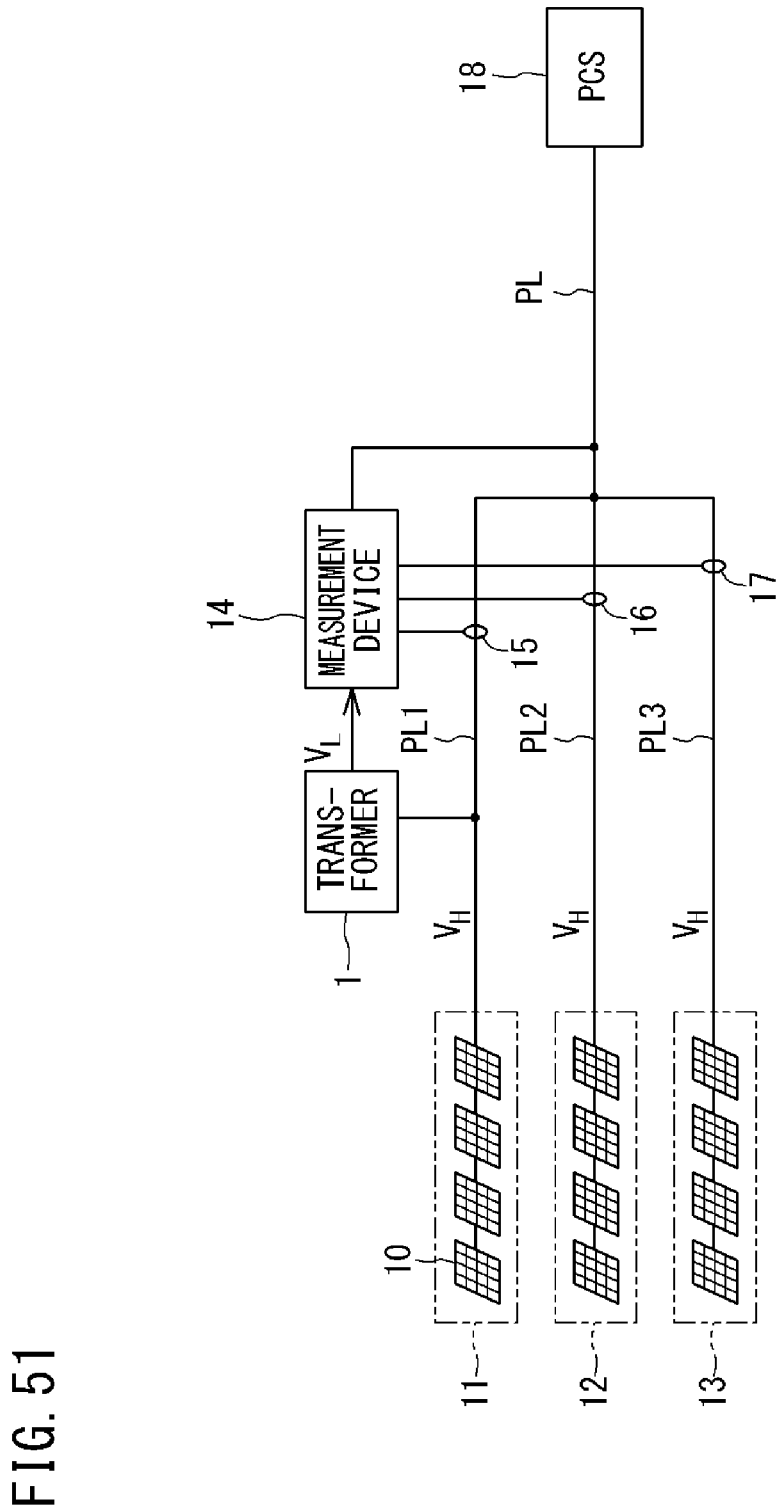
FIG. 51 is a connection diagram showing a usage example of a transformer for a DC power supply.

FIG. 51 is a connection diagram showing a usage example of the transformer 1 for the DC power supply as described above. FIG. 51 shows a usage example of the transformer 1 in a photovoltaic power station, as an example. For example, a predetermined number of photovoltaic panels 10 form one string. Output power lines PL1, PL2, and PL3 of a plurality of strings 11, 12, and 13 are, for example, gathered at a certain point into one power line PL, to transmit power to a power conditioner 18. A measurement device 14 measures currents outputted from the strings 11, 12, and 13 by current sensors 15, 16, and 17, and measures voltage from the power line PL. A measurement signal is transmitted to the power conditioner 18 or a monitoring device (not shown) by means of power line communication or wireless communication.

Here, the measurement device 14 may require a power supply at voltage of about 100V, for example. However, the measurement device 14 is normally located outdoor, and it is troublesome to perform power distribution work for supplying power from another place. On the other hand, voltage $V_H$ transmitted from each string 11 to 13 is as high voltage as, for example, 600V to 1000V, which is excessively high voltage. Therefore, if the voltage $V_H$ is transformed to low voltage $V_L$ of about 100V by the transformer 1, the transformed voltage can be used as a power supply for the measurement device 14.

<Transformer Using Distributed Constant Circuit>

<<Basic Configuration>>

Next, a transformer using a distributed constant circuit, which is different from the above transformer 1, will be described.

Figure 25:
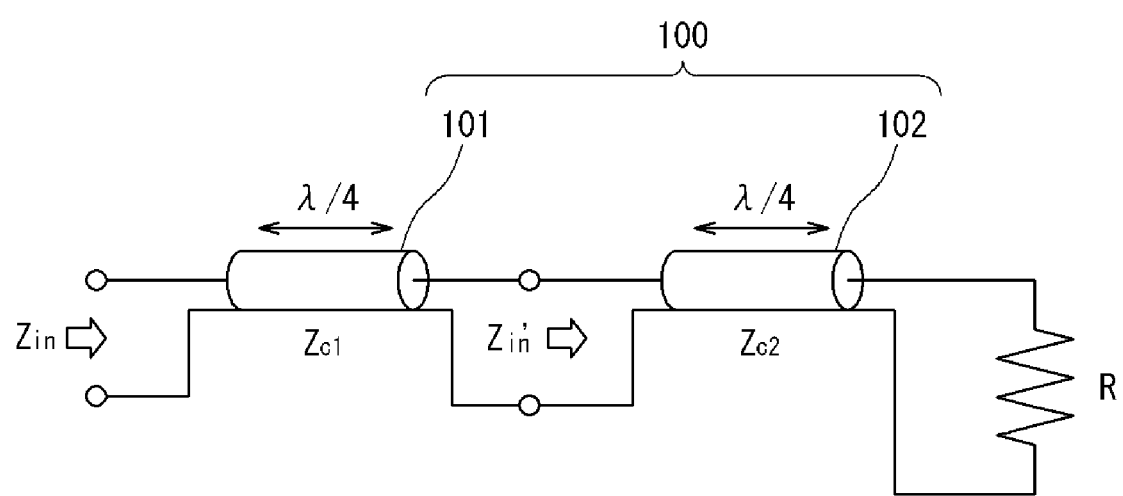
FIG. 25 is a connection diagram showing a transformer using a distributed constant circuit.

FIG. 25 is a connection diagram showing a transformer 100 using a distributed constant circuit. In FIG. 25, the transformer 100 is composed of a first converter 101, and a second converter 102 connected to an end of the first converter 101. As the first converter 101 and the second converter 102, for example, a sheathed single-core cable (CV) can be used. In the case where an inputted frequency from the power supply is f and a wavelength at the frequency f is λ, the first converter 101 at the front stage has a length of λ/4 (λ is wavelength). Also, the second converter 102 at the rear stage, which is connected to the end of the first converter 101, has a length of λ/4 with respect to the inputted frequency f from the power supply.

Here, in the case where the characteristic impedances of the first converter 101 and the second converter 102 are $Z_{c1}$ and $Z_{c2}$, respectively, an input impedance as seen from an input end of the first converter 101 is $Z_{in}$, and an input impedance as seen from an input end of the second converter 102 is $Z_{in}'$, the following is obtained.

$Z_{in}=Z_{c1}^2/Z_{in}'$, $Z_{in}'=Z_{c2}^2/R$

Therefore, $Z_{in}$ is shown as follows.

$$Z_{in} = Z_{c1}^2 / (Z_{c2}^2 / R)$$
$$= (Z_{c1}^2 / Z_{c2}^2) R$$

Since $(Z_{c1}^2/Z_{c2}^2)$ is a constant, this is defined as a constant k.

Then, $Z_{in}=k \cdot R$ is obtained.

In addition, in the case where, regarding the entire transformer 100, the input voltage is $V_{in}$, the input power is $P_{in}$, the output power is $P_{out}$, and the output voltage is $V_{out}$, $P_{in}$ and $P_{out}$ are shown as $P_{in}=V_{in}^2/Z_{in}$, $P_{out}=V_{out}^2/R$. Here, since $P_{in}=P_{out}$ is satisfied, the following relationship is obtained.

$V_{in}^2/Z_{in}=V_{out}^2/R$

This is deformed to $(V_{out}^2/V_{in}^2)=R/Z_{in}=k$

Therefore, $(V_{out}/V_{in})=k^{1/2}$ is obtained.

Thus, a constant voltage transformation ratio $k^{1/2}$ is obtained.

Thus, the input impedance $Z_{in}$ is proportional to the resistance value R of the load, and the voltage transformation ratio is constant regardless of load variation. In other words, regardless of the resistance value of the load, output voltage proportional to input voltage can be obtained. That is, the transformer 100 that transforms input voltage to output voltage with a constant voltage transformation ratio $(1/k)^{1/2}=Z_{c2}/Z_{c1}$ can be obtained. In addition, the voltage transformation ratio can be freely designed by selection of the value of $Z_{c2}/Z_{c1}$.

This transformer is formed by connecting two stages of distributed constant circuits. Therefore, an innovative configuration that does not need a winding, an iron core, and the like as used in a conventional transformer can be obtained, whereby weight reduction of a transformer can be realized, and as a result, cost reduction can be realized. Further, problems of parasitic capacitance and occurrence of magnetic field leakage, which arise in a high-frequency transformer, are also solved, and thus a transformer with low loss can be realized.

Theoretically, the above transformer 100 can be realized even by using a low frequency at a commercial frequency level, but practically, λ/4 becomes very long, and therefore such a frequency is not suitable. However, in the case of 1 MHz, the value of λ/4 is several ten meters, and therefore the above transformer 100 can be realized by being integrated with a power cable of a distribution line. Further, in the case of 10 MHz, the value of λ/4 is several meters, and therefore the realization by a cable is practically easy.

Application Example

Figure 26:
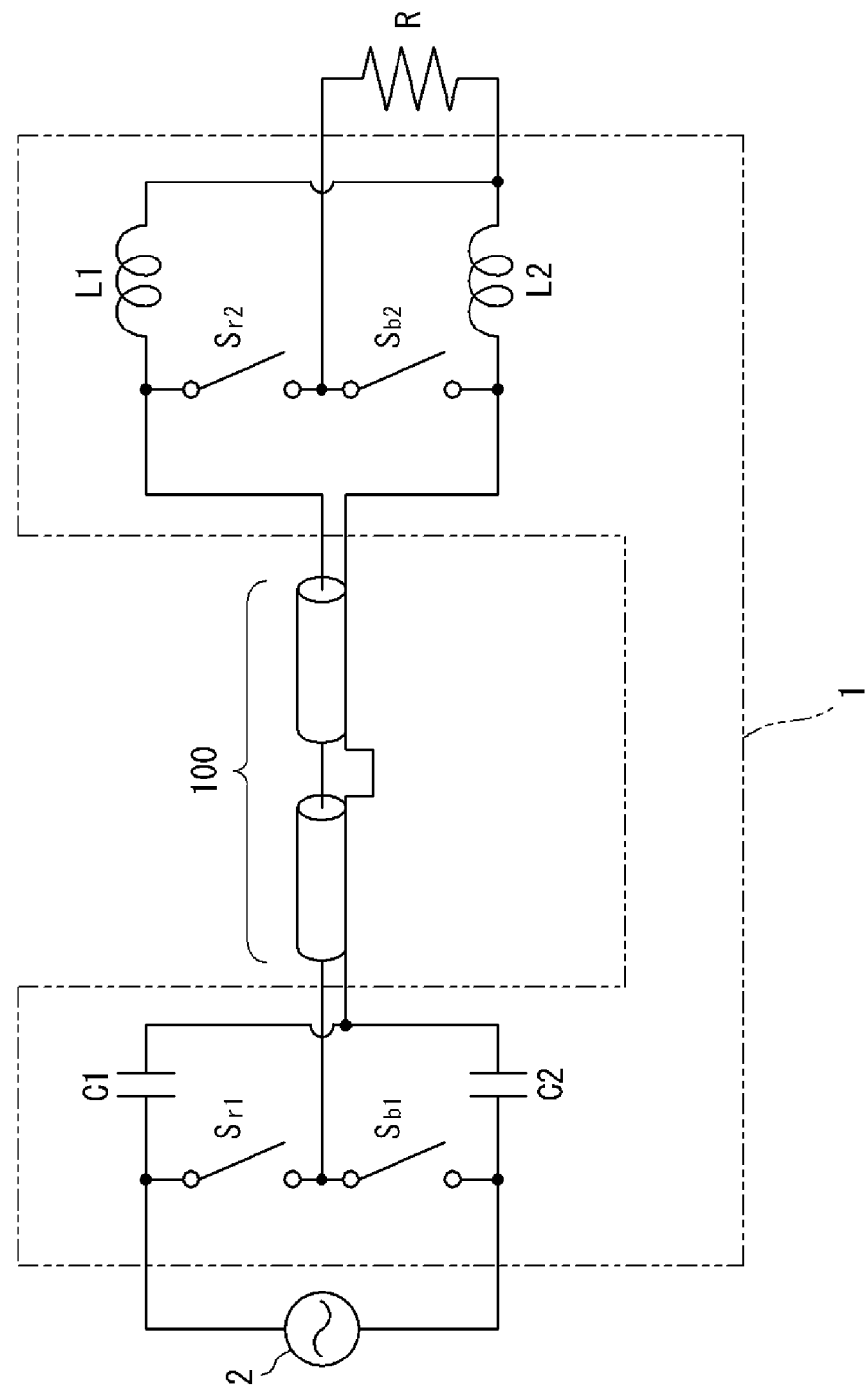
FIG. 26 is a circuit diagram showing a combination of the transformer shown in FIG. 1 and the transformer shown in FIG. 25.

FIG. 26 is a circuit diagram showing a combination of the transformer 1 shown in FIG. 1 and the above transformer 100. In this circuit configuration, the transformer 100 of distributed constant type is interposed between the capacitor stage and the inductor stage in the transformer 1 shown in FIG. 1. In this case, since a frequency between the capacitor stage and the inductor stage in the transformer 1 is a high frequency (e.g., 1 MHz) due to switching, it is possible to utilize the transformer 100 of distributed constant type, using an environment in which switching is performed at such a high frequency. In addition, by thus combining transformation functions of the two kinds of transformers 1 and 100, it is possible to design the voltage transformation ratio in a wide range. The above combination of the transformer 100 with the transformer 1 shown in FIG. 1 is merely an example. The transformer 100 may be combined with any of the transformers 1 described above.

<Transformer Using Lumped Constant Circuit>

Next, a transformer using a lumped constant circuit, which is different from the above transformers 1 and 100, will be described.

Figure 27:
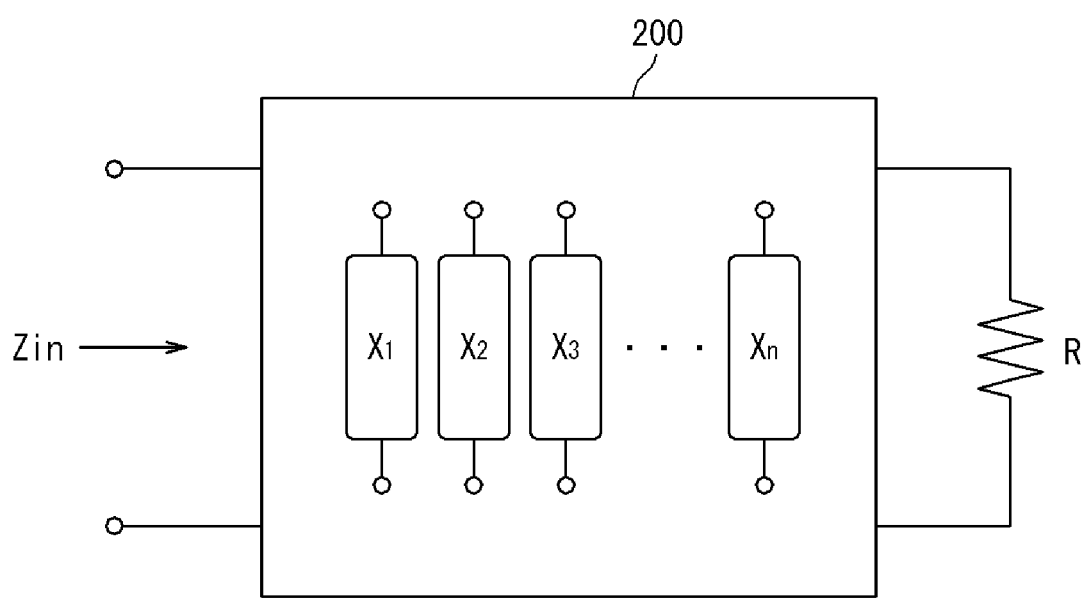
FIG. 27 is a diagram showing a concept of a transformer using a two-terminal pair circuit (four-terminal circuit).

FIG. 27 is a diagram showing a concept of a transformer 200 using a two-terminal pair circuit (four-terminal circuit). For functioning as a transformer, as described above, an input impedance $Z_{in}$ and a load R (resistance value R) need to satisfy the following relationship.

$Z_{in}=k \cdot R$ (k is a constant)

Thus, the input impedance $Z_{in}$ linearly varies with respect to load variation, and the voltage transformation ratio is constant. In addition, the input impedance $Z_{in}$ does not have a reactance component. That is, the input impedance $Z_{in}$ needs to have a real number component of k·R and an imaginary number component of 0. The transformer 200 having such an input impedance $Z_{in}$ is referred to as an LILT (Load-Invariant Linear Transformer).

The transformer 200 as described above can obtain output voltage proportional to input voltage regardless of the resistance value R of the load. That is, the transformer 200 that transforms input voltage to output voltage with a constant voltage transformation ratio $(1/k)^{1/2}$ can be obtained. Using such a transformer 200 as transformers makes it unnecessary to use a conventional commercial-frequency transformer or high-frequency transformer. Therefore, drastic size reduction and weight reduction of a transformer can be realized, and as a result, cost reduction can be realized. Further, problems of parasitic capacitance and occurrence of magnetic field leakage, which arise in a high-frequency transformer, are also solved, and thus a transformer with low loss can be realized.

Although an infinite number of circuit configurations as an LILT are conceivable, it is desirable that an element number n (which is irrelevant to the number n of stages used in FIGS. 1 to 20) of reactance elements is small. The present inventors have performed full search while changing the value of n to 1, 2, 3, 4, . . . , starting from 1, and as a result, have found that the minimum element number n is 4.

Figure 28:
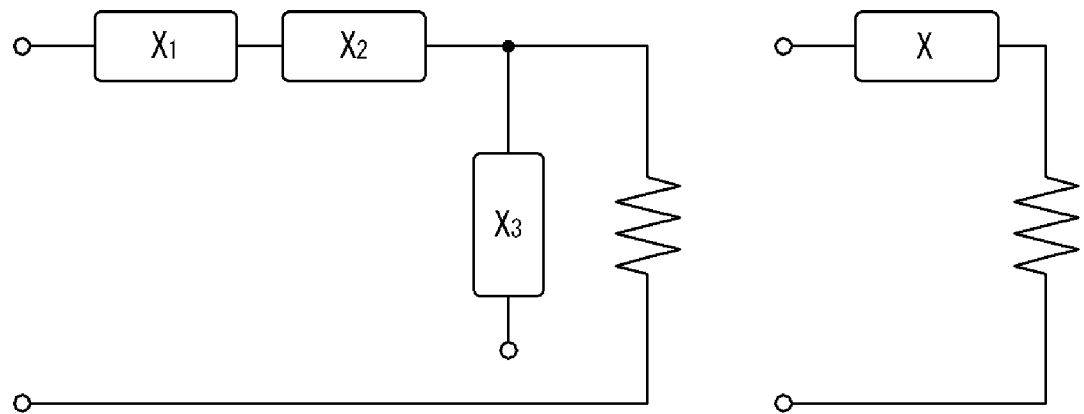
FIG. 28 is a diagram showing a concept of the element number of elements composing a circuit.

FIG. 28 is a diagram showing an example of a concept of the element number n of elements composing a circuit. In FIG. 28, the left circuit apparently includes three elements $X_1$, $X_2$, and $X_3$. However, $X_1$ and $X_2$ which are topologically equivalent to each other are counted as one element, and $X_3$ which has no significance in terms of electric circuit is not counted. Therefore, the left circuit configuration is the same as the right circuit configuration, and the element number n is 1.

Figure 29:
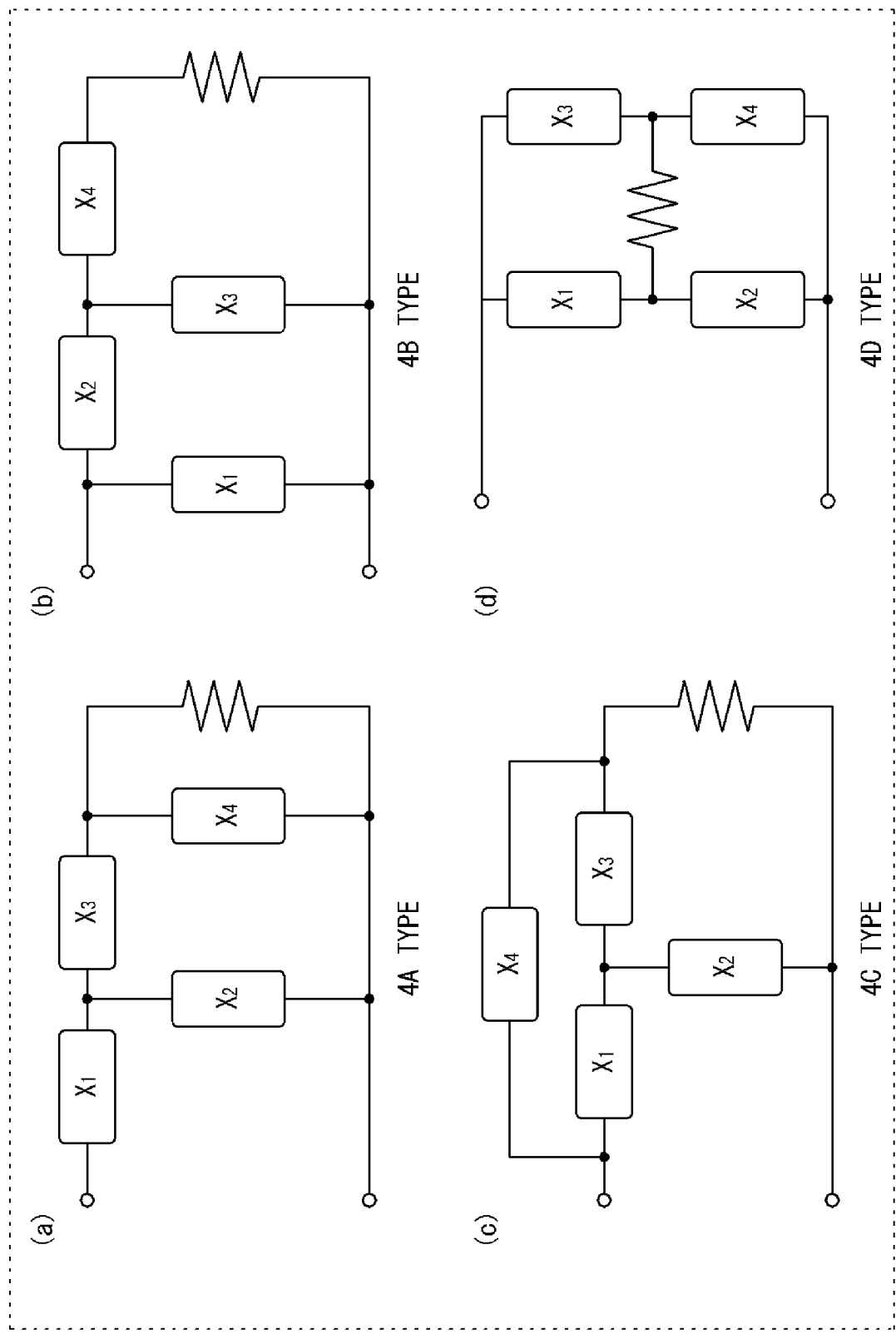
FIG. 29 is a diagram showing four patterns of circuit configurations that can be made by using the minimum element number 4.

FIG. 29 is a diagram showing four patterns of circuit configurations that can be made by using the minimum element number 4, in which circuit configurations of (a), (b), (c), and (d) are referred to as "4A type", "4B type", "4C type", and "4D type", respectively.

<<4A Type>>

Figure 30:
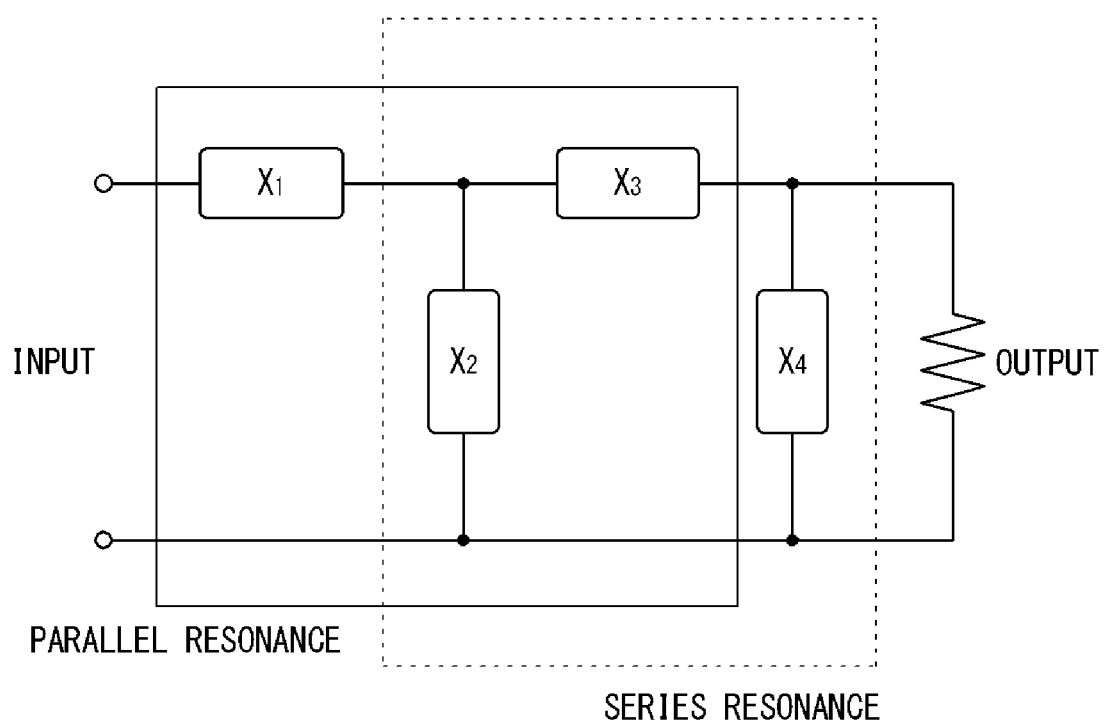
FIG. 30 is a diagram showing a circuit configuration of 4A type.

FIG. 30 is a diagram showing the circuit configuration of 4A type. To describe in words, for example, in the case where reactances of the four reactance elements are $X_1$, $X_2$, $X_3$, and $X_4$, a two-terminal pair circuit is composed of, starting from the input side, $X_1$ present on one line of the two-terminal pair circuit, $X_2$ present between two lines thereof, $X_3$ present on the one line, and $X_4$ present between the two lines. In this case, the input impedance $Z_{in}$ is represented as the upper part of the following expression. In addition, in the case of setting a condition for causing the imaginary number component to be 0 by parallel resonance and series resonance, the input impedance $Z_{in}$ is represented as the lower part.

In the following expression, "j" denotes an imaginary number $(-1)^{1/2}$.

$$Z_{in} = \frac{R\{X_1(X_2 + X_3 + X_4) + X_2(X_3 + X_4) + jX_4(X_1X_2 + X_2X_3 + X_3X_1)}{X_4(X_2 + X_3) - jR(X_2 + X_3 + X_4)}$$

$$= \frac{X_2^2}{X_4^2} R, \left( \frac{1}{X_1} + \frac{1}{X_2} + \frac{1}{X_3} = 0 \wedge X_2 + X_3 + X_4 = 0 \right)$$

That is, when the parameter condition satisfies $(1/X_1)+(1/X_2)+(1/X_3)=0 \wedge X_2+X_3+X_4=0$, in other words, when $(1/X_1)+(1/X_2)+(1/X_3)=0$ and $X_2+X_3+X_4=0$ are satisfied, $Z_{in}=(X_2^2/X_4^2)\cdot R$ is satisfied, and thus output voltage proportional to input voltage is obtained.

Figure 31:
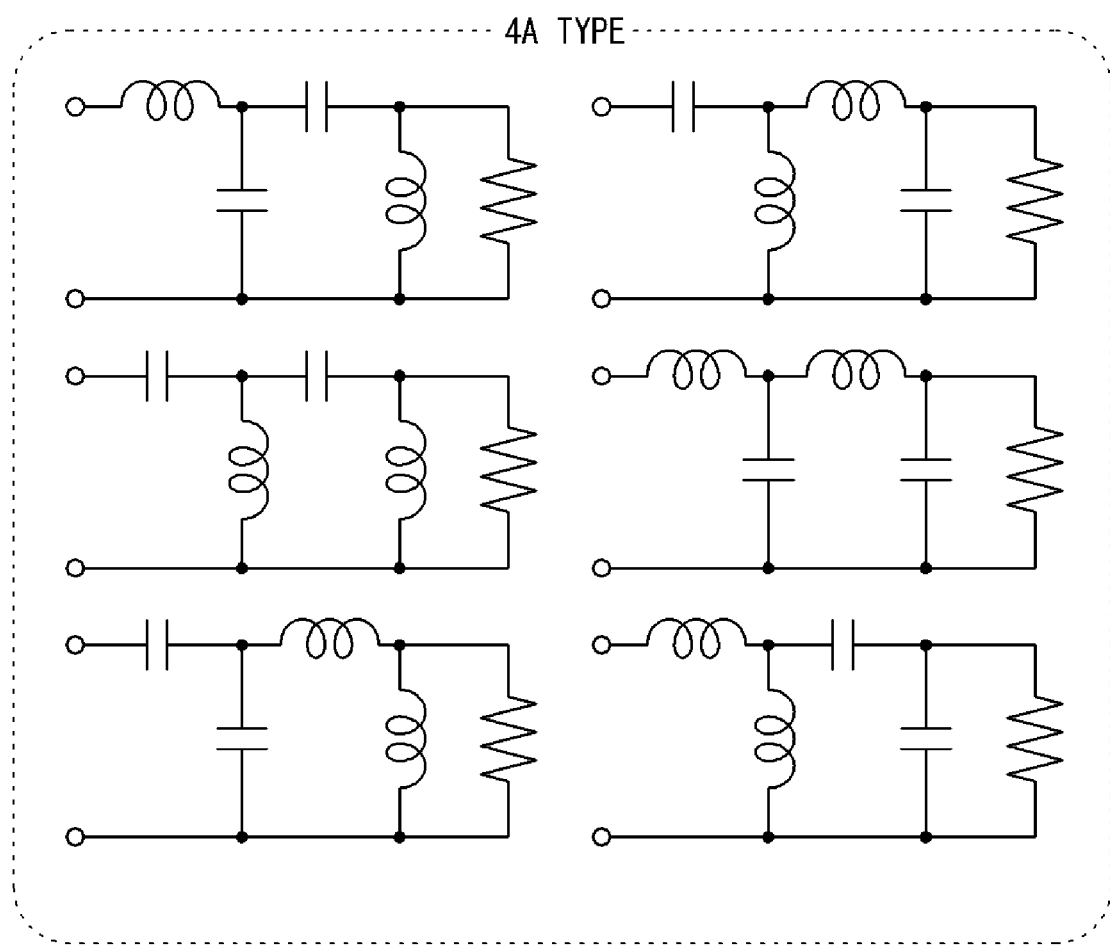
FIG. 31 is a diagram showing six patterns as actual examples of the circuit configuration of 4A type.

FIG. 31 is a diagram showing six patterns as actual examples of the circuit configuration of 4A type.

Figure 32:
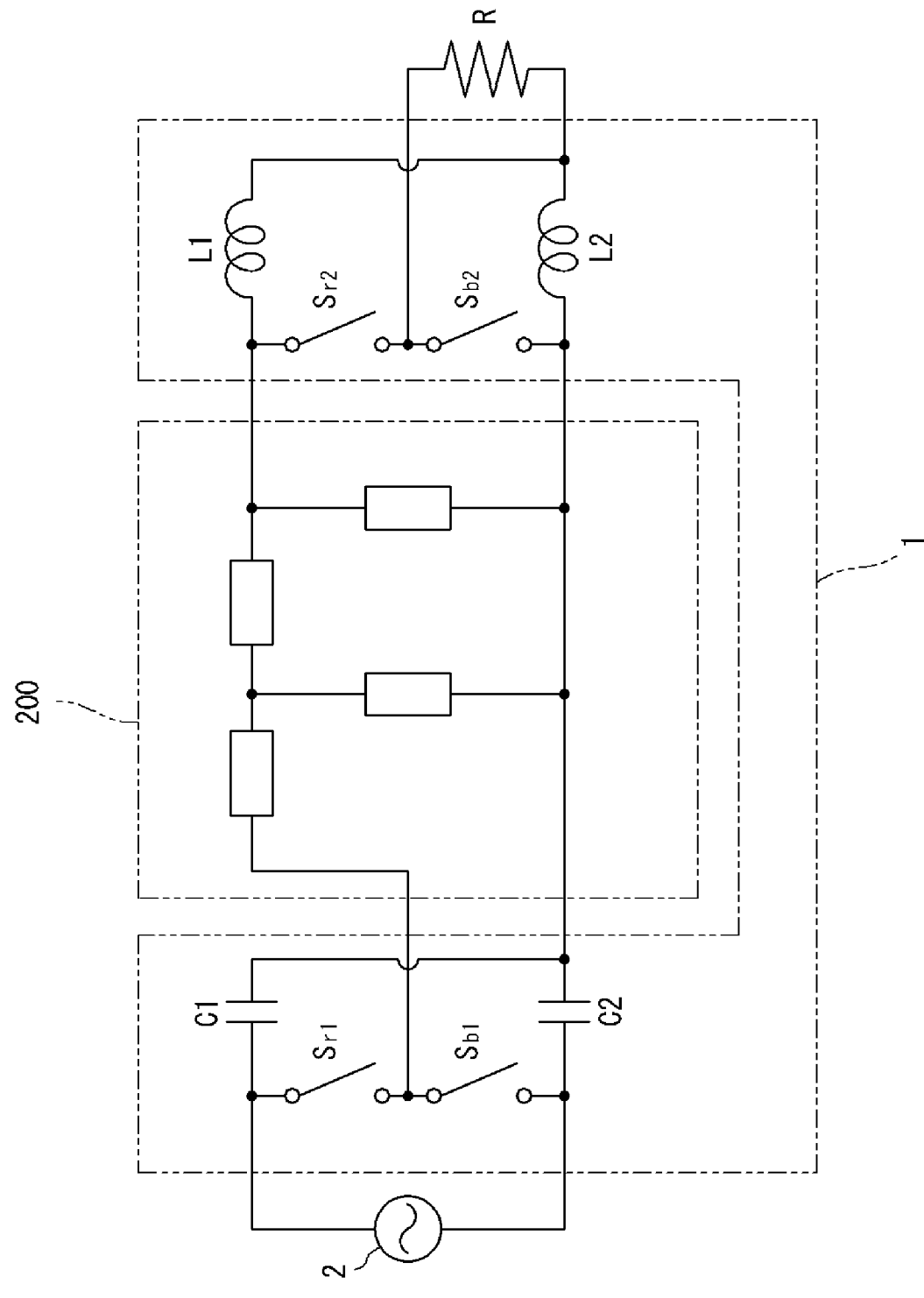
FIG. 32 is a circuit diagram showing a combination of the transformer shown in FIG. 1 and the transformer having the circuit configuration of 4A type.

FIG. 32 is a circuit diagram showing a combination of the transformer 1 shown in FIG. 1 and the transformer 200 having the circuit configuration of 4A type as described above. In FIG. 32, the transformer 200 is interposed between the capacitor stage and the inductor stage in the transformer 1 shown in FIG. 1. By thus combining transformation functions of the two kinds of transformers 1 and 200, it becomes possible to design the voltage transformation ratio in a wide range.

In this case, it is possible to utilize the transformer 200 having a lumped constant circuit, using an environment in which switching is performed at a high frequency of 1 MHz, for example. It is noted that, even if the AC power supply 2 is replaced with a DC power supply, a switching waveform based on switching at the front stage in the transformer 1 is inputted to the transformer 200, and therefore the transformer 200 can be used (hereafter, the same applies).

The above combination of the transformer 200 with the transformer 1 shown in FIG. 1 is merely an example. The transformer 200 may be combined with any of the transformers 1 and 100 described above. This also applies in the following examples.

<<4B Type>>

Figure 33:
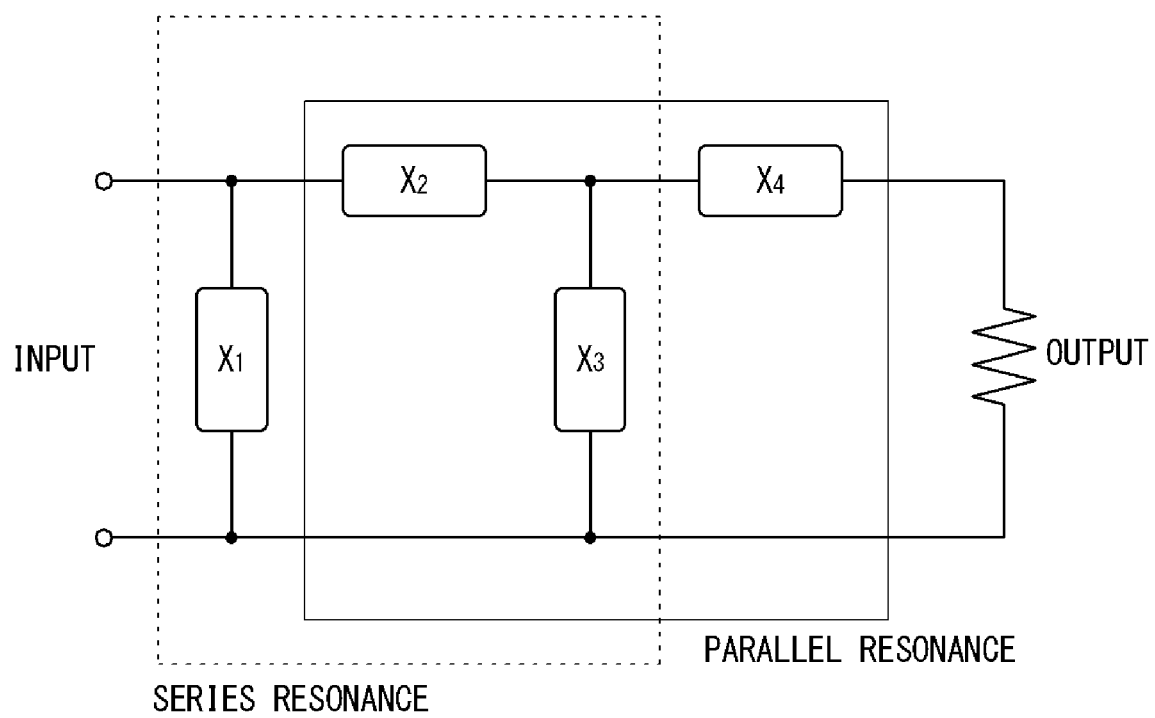
FIG. 33 is a diagram showing a circuit configuration of 4B type.

FIG. 33 is a diagram showing the circuit configuration of 4B type. To describe in words, for example, in the case where reactances of the four reactance elements are $X_1$, $X_2$, $X_3$, and $X_4$, a two-terminal pair circuit is composed of, starting from the input side, $X_1$ present between two lines of the two-terminal pair circuit, $X_2$ present on one line thereof, $X_3$ present between the two lines, and $X_4$ present on the one line. In this case, the input impedance $Z_{in}$ is represented as the upper part of the following expression. In addition, in the case of setting a condition for causing the imaginary number component to be 0 by parallel resonance and series resonance, the input impedance $Z_{in}$ is represented as the lower part.

$$Z_{in} = \frac{RX_1(X_2 + X_3) + jX_1(X_2X_3 + X_3X_4 + X_4X_2)}{X_3(X_1 + X_2) + X_4(X_1 + X_2 + X_3) - jR(X_1 + X_2 + X_3)}$$

$$= \frac{X_1^2}{X_3^2} R, \left( X_1 + X_2 + X_3 = 0 \wedge \frac{1}{X_2} + \frac{1}{X_3} + \frac{1}{X_4} = 0 \right)$$

That is, when the parameter condition satisfies $X_1+X_2+X_3=0 \wedge (1/X_2)+(1/X_3)+(1/X_4)=0$, $Z_{in}=(X_1^2/X_3^2)\cdot R$ is satisfied, and thus output voltage proportional to input voltage is obtained.

Figure 34:
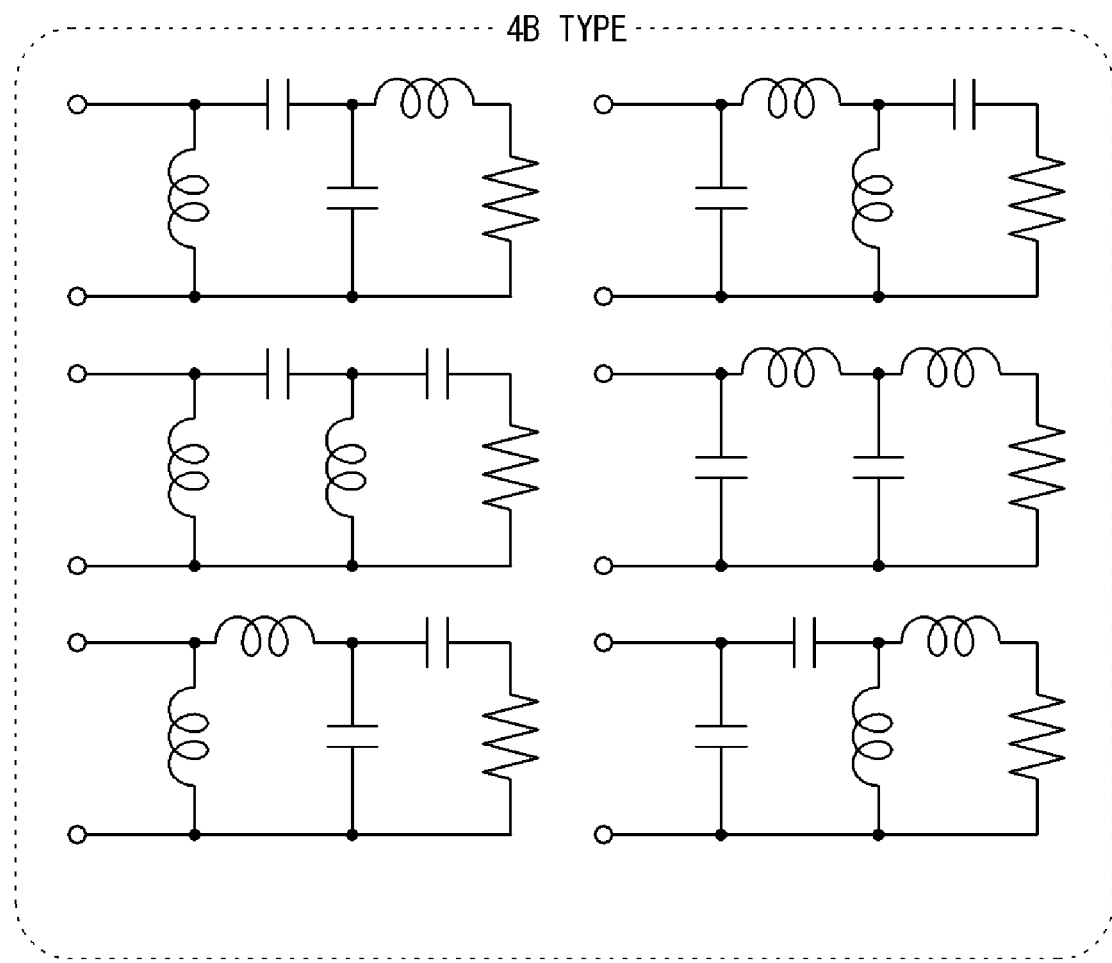
FIG. 34 is a diagram showing six patterns as actual examples of the circuit configuration of 4B type.

FIG. 34 is a diagram showing six patterns as actual examples of the circuit configuration of 4B type.

Figure 35:
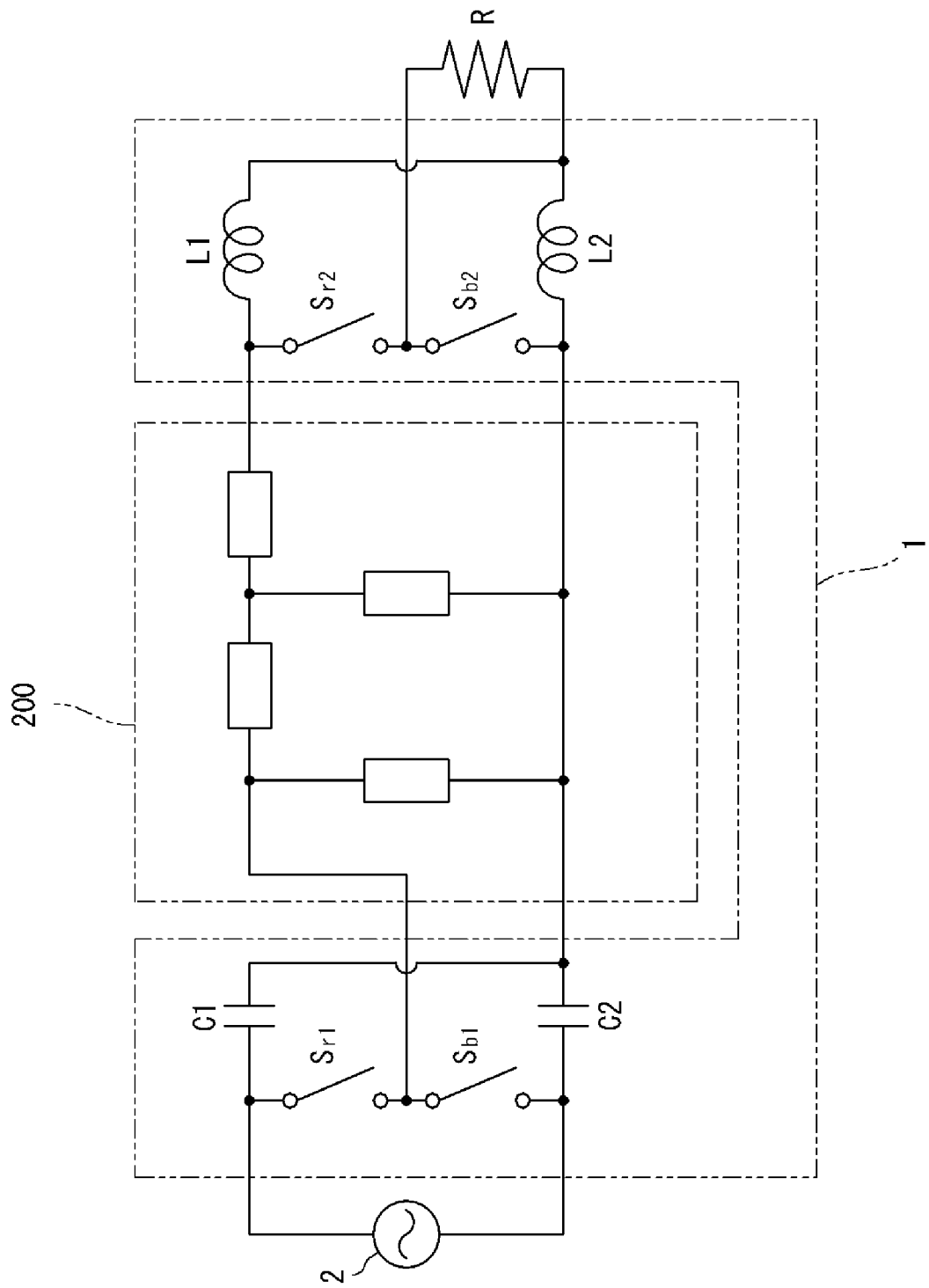
FIG. 35 is a circuit diagram showing a combination of the transformer shown in FIG. 1 and the transformer having the circuit configuration of 4B type.

FIG. 35 is a circuit diagram showing a combination of the transformer 1 shown in FIG. 1 and the transformer 200 having the circuit configuration of 4B type as described above. In FIG. 35, the transformer 200 is interposed between the capacitor stage and the inductor stage in the transformer 1 shown in FIG. 1. By thus combining transformation functions of the two kinds of transformers 1 and 200, it becomes possible to design the voltage transformation ratio in a wide range.

<<4C Type>>

Figure 36:
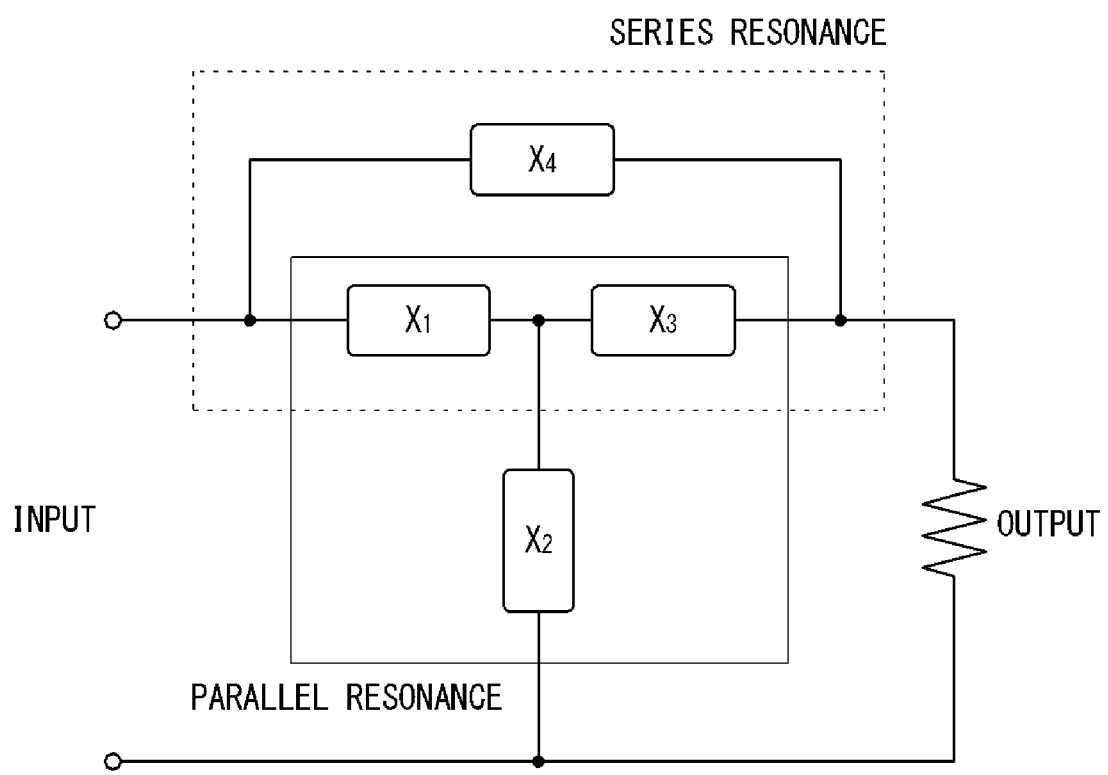
FIG. 36 is a diagram showing a circuit configuration of 4C type.

FIG. 36 is a diagram showing the circuit configuration of 4C type. To describe in words, for example, in the case where reactances of the four reactance elements are $X_1$, $X_2$, $X_3$, and $X_4$, a two-terminal pair circuit is composed of: starting from the input side, a T-shaped circuit formed by $X_1$ present on one line of the two-terminal pair circuit, $X_2$ present between two lines thereof, and $X_3$ present on the one line; and $X_4$ present in parallel with a series unit of $X_1$ and $X_3$. In this case, the input impedance $Z_{in}$ is represented as the upper part of the following expression. In addition, in the case of setting a condition for causing the imaginary number component to be 0 by parallel resonance and series resonance, the input impedance $Z_{in}$ is represented as the lower part.

$$Z_{in} = \frac{-X_4(X_1X_2 + X_2X_3 + X_3X_1) + jR\{X_1(X_3 + X_4) + X_2(X_1 + X_3 + X_4)\}}{R(X_1 + X_3 + X_4) + j\{X_2(X_1 + X_3 + X_4) + X_3(X_1 + X_4)\}}$$

$$= \frac{X_1^2}{X_3^2}R, \left(X_1 + X_3 + X_4 = 0 \wedge \frac{1}{X_1} + \frac{1}{X_2} + \frac{1}{X_3} = 0\right)$$

That is, when the parameter condition satisfies $X_1+X_3+X_4=0 \wedge (1/X_1)+(1/X_2)+(1/X_3)=0$, $Z_{in}=(X_1^2/X_3^2)\cdot R$ is satisfied, and thus output voltage proportional to input voltage is obtained.

Figure 37:
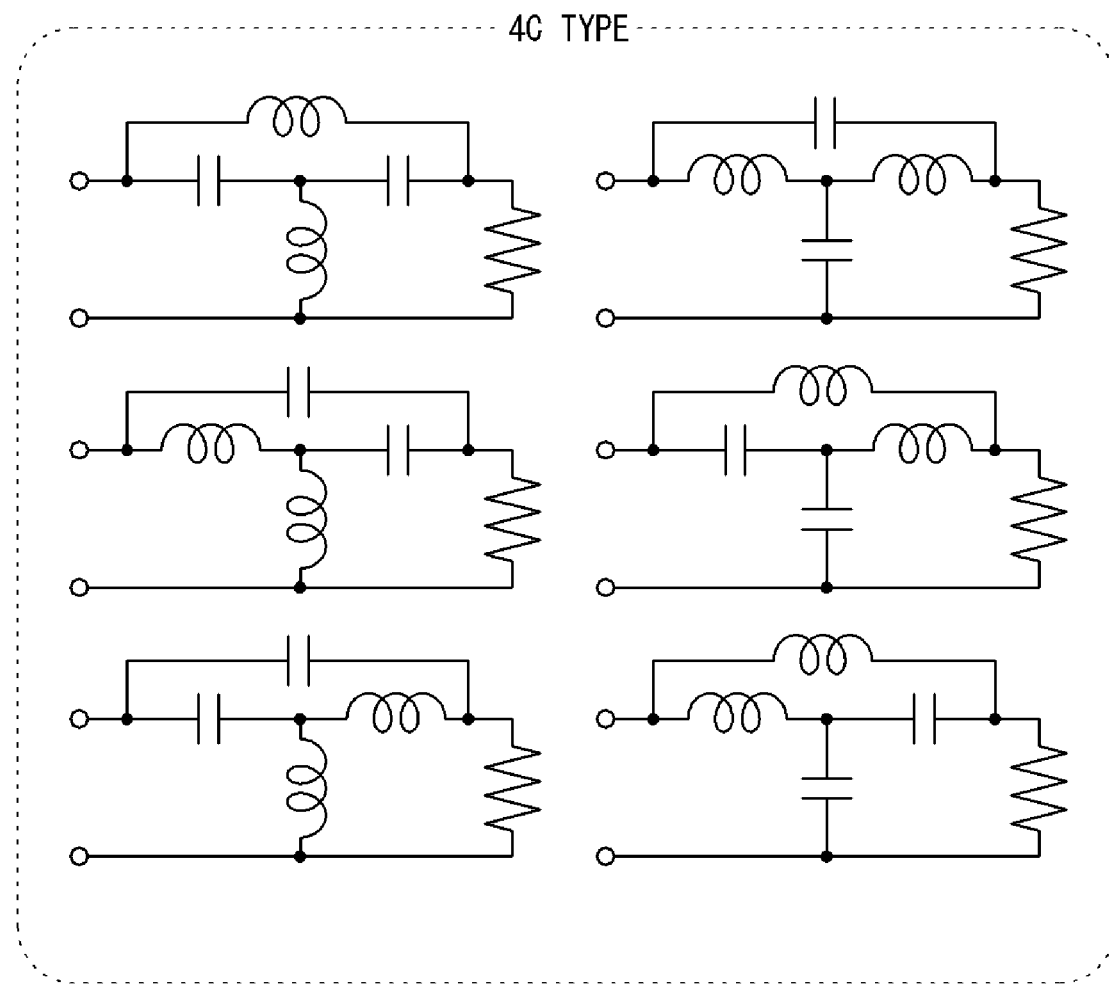
FIG. 37 is a diagram showing six patterns as actual examples of the circuit configuration of 4C type.

FIG. 37 is a diagram showing six patterns as actual examples of the circuit configuration of 4C type.

Figure 38:
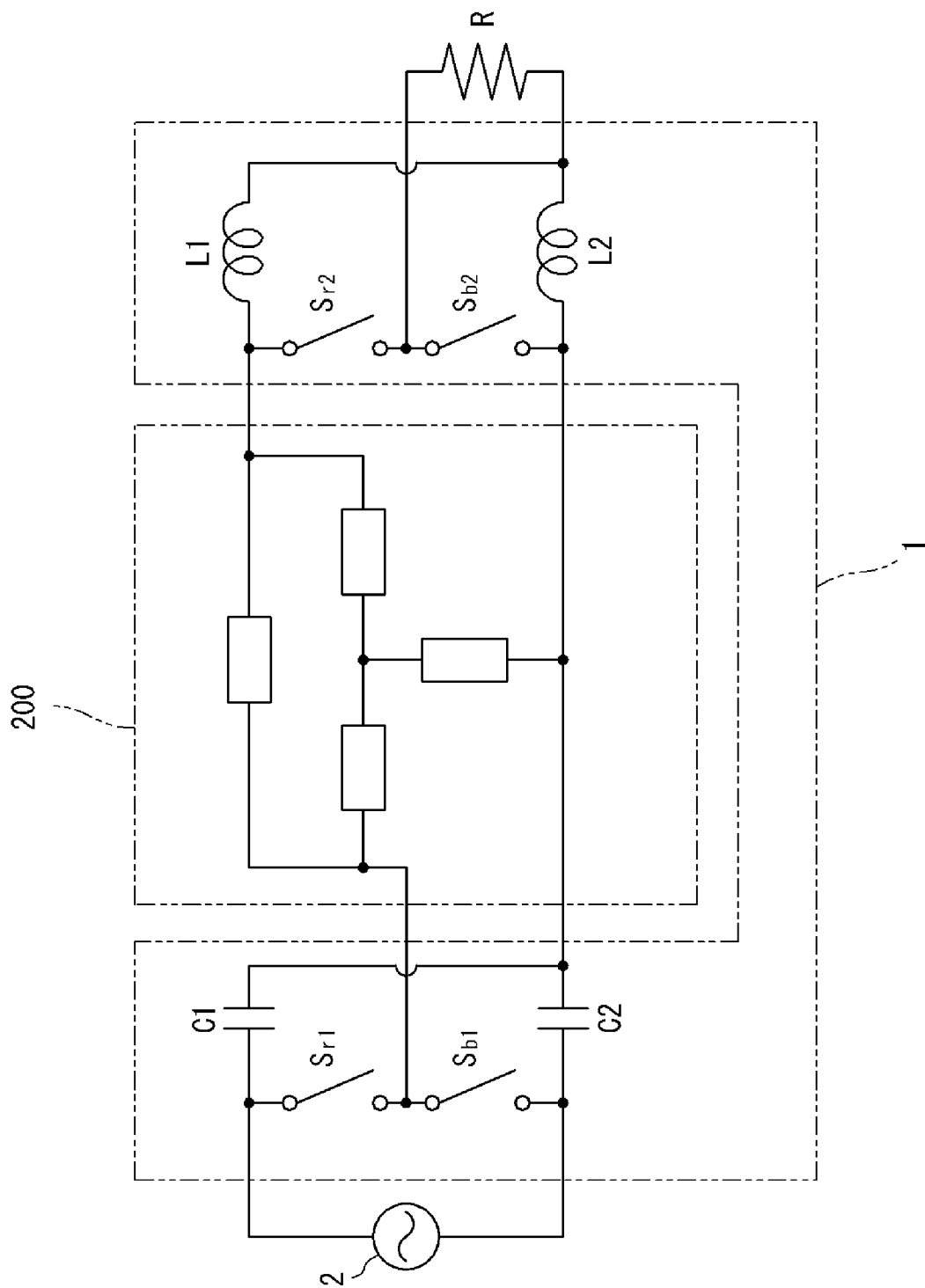
FIG. 38 is a circuit diagram showing a combination of the transformer shown in FIG. 1 and the transformer having the circuit configuration of 4C type.

FIG. 38 is a circuit diagram showing a combination of the transformer 1 shown in FIG. 1 and the transformer 200 having the circuit configuration of 4C type as described above. In FIG. 38, the transformer 200 is interposed between the capacitor stage and the inductor stage in the transformer 1 shown in FIG. 1. By thus combining transformation functions of the two kinds of transformers 1 and 200, it becomes possible to design the voltage transformation ratio in a wide range.

<<4D Type>>

Figure 39:
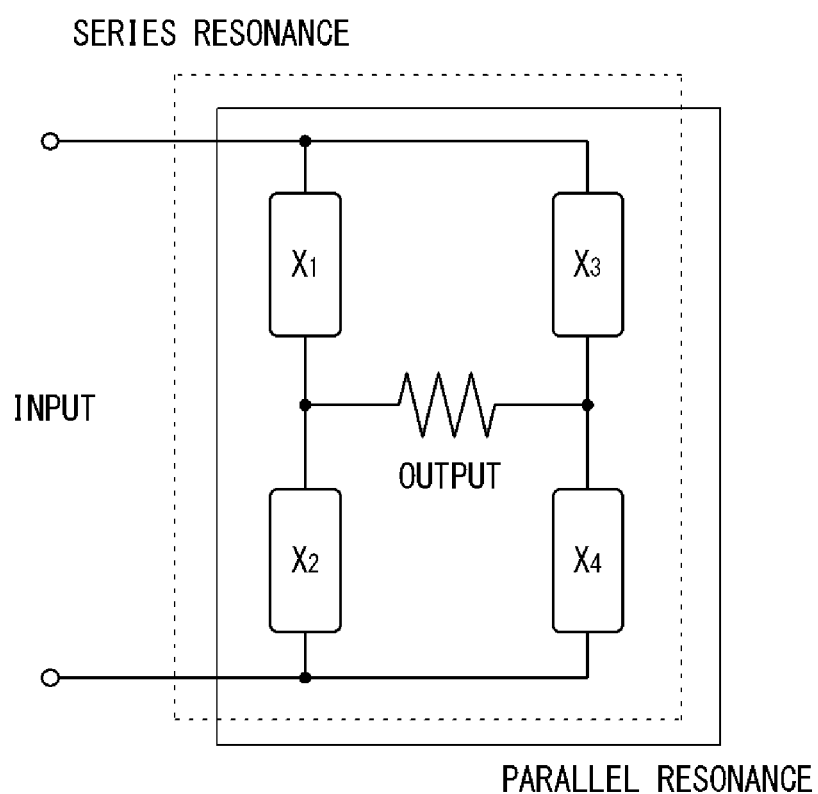
FIG. 39 is a diagram showing a circuit configuration of 4D type.

FIG. 39 is a diagram showing the circuit configuration of 4D type. To describe in words, for example, in the case where reactances of the four reactance elements are $X_1$, $X_2$, $X_3$, and $X_4$, a two-terminal pair circuit is composed of, starting from the input side, a first series unit of $X_1$ and $X_2$ present between two lines of the two-terminal pair circuit, and a second series unit of $X_3$ and $X_4$ present between the two lines, such that a mutual connection point in the first series unit and a mutual connection point in the second series unit are output terminals. In this case, the input impedance $Z_{in}$ is represented as the upper part of the following expression. In addition, in the case of setting a condition for causing the imaginary number component to be 0 by parallel resonance and series resonance, the input impedance $Z_{in}$ is represented as the lower part.

$$Z_{in} = \frac{-X_1X_2(X_3 + X_4) - X_3X_4(X_1 + X_2) + jR(X_1 + X_2)(X_3 + X_4)}{R(X_1 + X_2 + X_3 + X_4) + j\{(X_1 + X_3)(X_2 + X_4)\}}$$

$$= \frac{(X_1 + X_2)^2}{(X_1 - X_2)^2}R, \left(X_1 + X_2 + X_3 + X_4 = 0 \wedge \frac{1}{X_1} + \frac{1}{X_2} + \frac{1}{X_3} + \frac{1}{X_4} = 0\right)$$

That is, when the parameter condition satisfies $X_1+X_2+X_3+X_4=0 \wedge (1/X_1)+(1/X_2)+(1/X_3)+(1/X_4)=0$, $Z_{in}=\{(X_1+X_2)^2/(X_1-X_2)^2\}\cdot R$ is satisfied, and thus output voltage proportional to input voltage is obtained.

Figure 40:
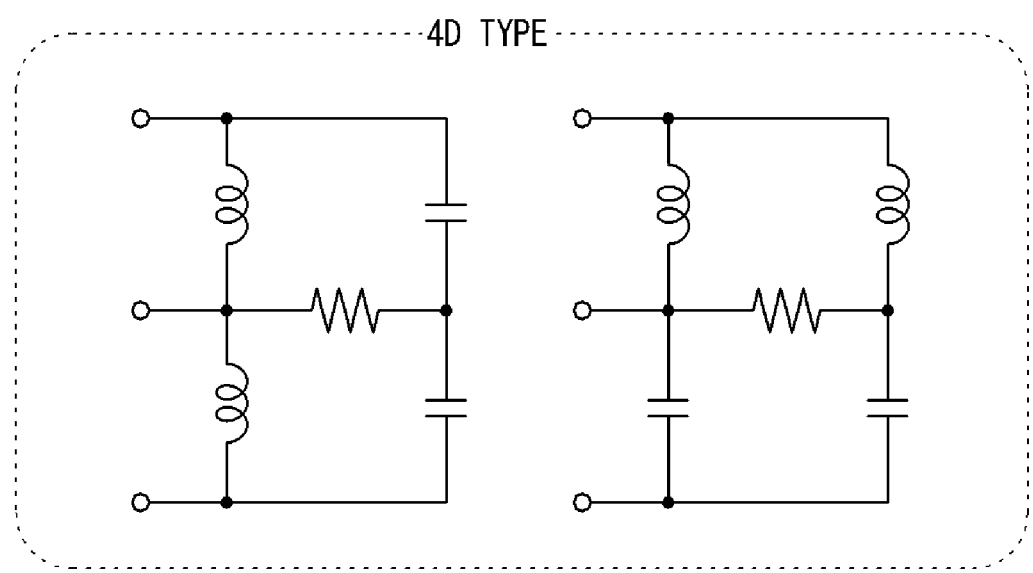
FIG. 40 is a diagram showing two patterns as actual examples of the circuit configuration of 4D type.

FIG. 40 is a diagram showing two patterns as actual examples of the circuit configuration of 4D type.

Figure 41:
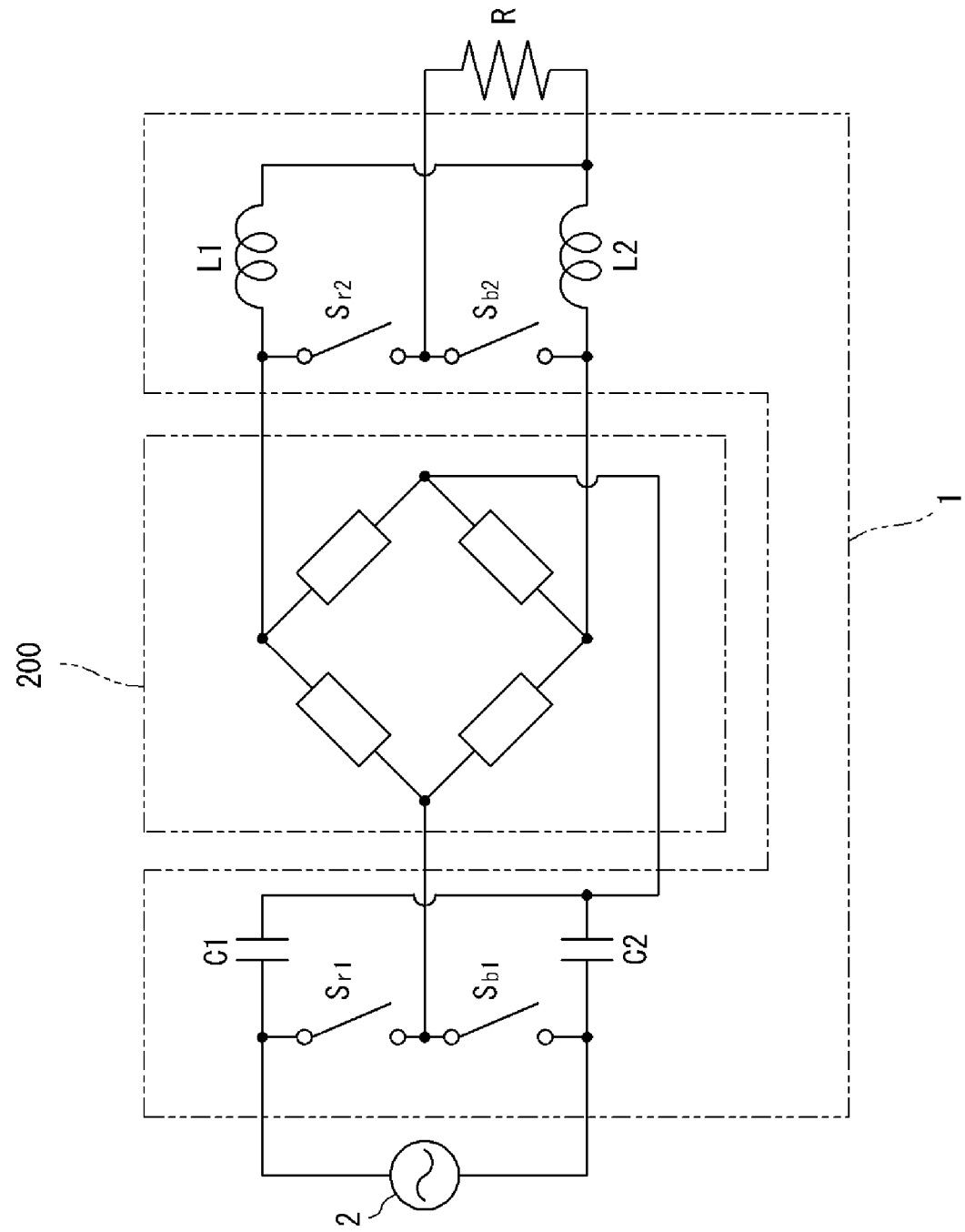
FIG. 41 is a circuit diagram showing a combination of the transformer shown in FIG. 1 and the transformer having the circuit configuration of 4D type.

FIG. 41 is a circuit diagram showing a combination of the transformer 1 shown in FIG. 1 and the transformer 200 having the circuit configuration of 4D type as described above. In FIG. 41, the transformer 200 is interposed between the capacitor stage and the inductor stage in the transformer 1 shown in FIG. 1. By thus combining transformation functions of the two kinds of transformers 1 and 200, it becomes possible to design the voltage transformation ratio in a wide range.

<<n=5 (Application of T Type)>>

Next, the circuit configuration with the element number n=5 will be described. Although the element number increases by one from the case of n=4, this circuit configuration is practical.

Figure 42:
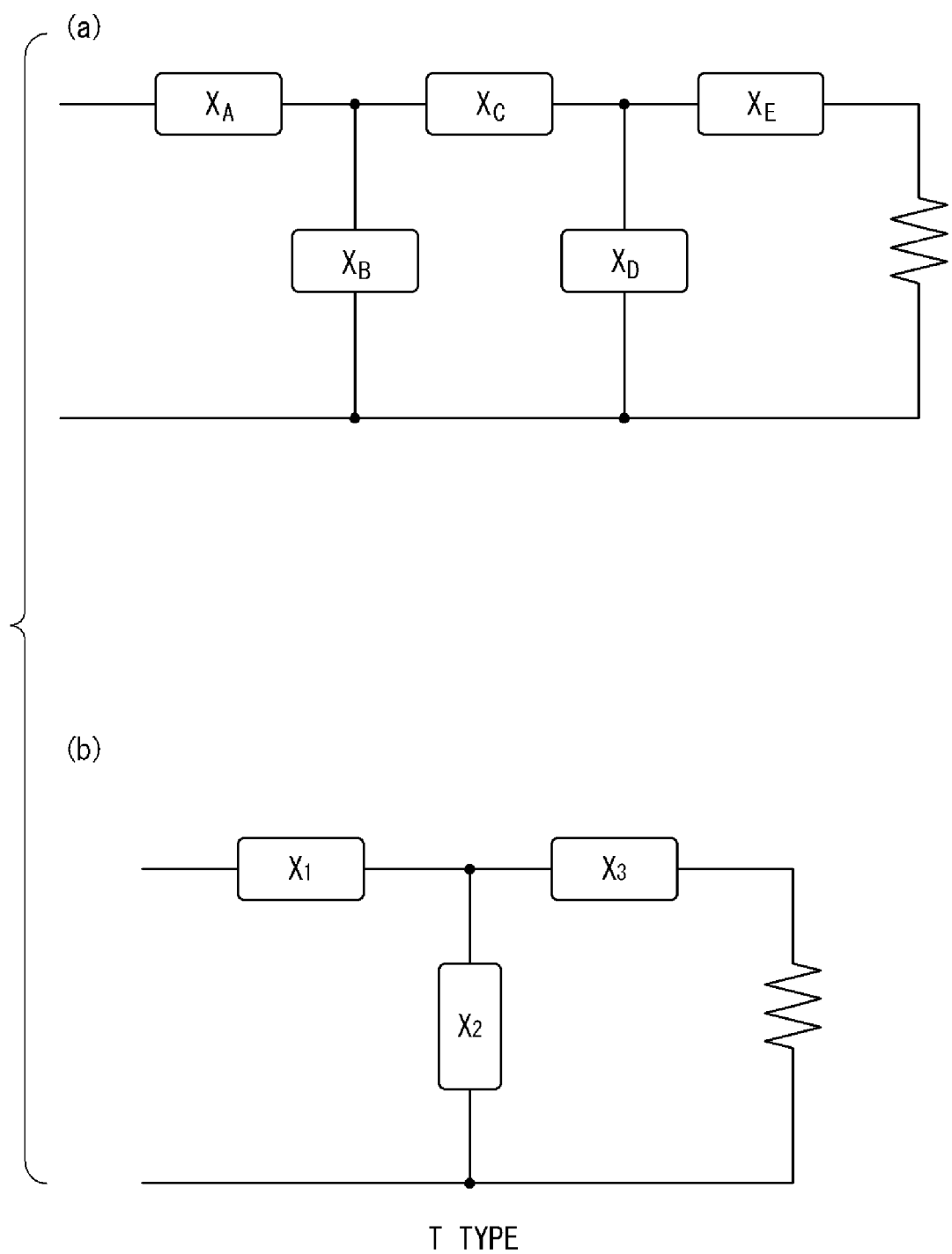
FIG. 42 is a circuit diagram in which (a) shows a first example of circuit configuration with n=5, and (b) shows a T-shaped circuit.

In FIG. 42, (a) is a diagram showing a first example of circuit configuration with n=5. To describe in words, in the case where reactances of the five reactance elements are $X_A$, $X_B$, $X_C$, $X_D$, and $X_E$, a two-terminal pair circuit is composed of, starting from the input side, $X_A$ present on one line of the two-terminal pair circuit, $X_B$ present between two lines thereof, $X_C$ present on the one line, $X_D$ present between the two lines, and $X_E$ present on the one line.

On the other hand, in FIG. 42, (b) shows a T-shaped circuit. In this T-shaped circuit, the input impedance $Z_{in}$ is represented as the upper part of the following expression, and in order to cause the imaginary number component to be 0, a parameter condition shown as the lower part needs to be satisfied.

$$Z_{in} = \frac{-(X_1X_2 + X_2X_3 + X_3X_1) + jR(X_1 + X_2)}{R + j(X_2 + X_3)}$$

$$= \frac{X_1^2}{R}, (X_1 = X_3 = -X_2)$$

In the case of T-shaped circuit, since R is present in the denominator, an LILT is not obtained. However, if the T-shaped circuit is configured in a two-stage form, $Z_{in}=k\cdot R$ is satisfied, and thus output voltage proportional to input voltage is obtained. Considering this, in the case where reactances of the five reactance elements in the circuit shown in (a) of FIG. 42 are $X_A$, $X_B$, $X_C$, $X_D$, and $X_E$, the two-terminal pair circuit composed of, starting from the input side, $X_A$ present on one line of the two-terminal pair circuit, $X_B$ present between two lines thereof, $X_C$ present on the one line, $X_D$ present between the two lines, and $X_E$ present on the one line, is set to satisfy the following relationship.

$$X_A = -X_B \wedge X_E = -X_D \wedge X_C = X_A + X_E$$

In this case, the input impedance $Z_{in}$ is represented as $Z_{in}=(X_A^2/X_E^2)\cdot R$, and is proportional to the resistance value R of the load, and thus output voltage proportional to input voltage is obtained.

Also for this LILT circuit, similarly, by combination with the transformer 1, it becomes possible to design the voltage transformation ratio in a wide range.

<<n=5 (Application of π Type)>>

Figure 43:
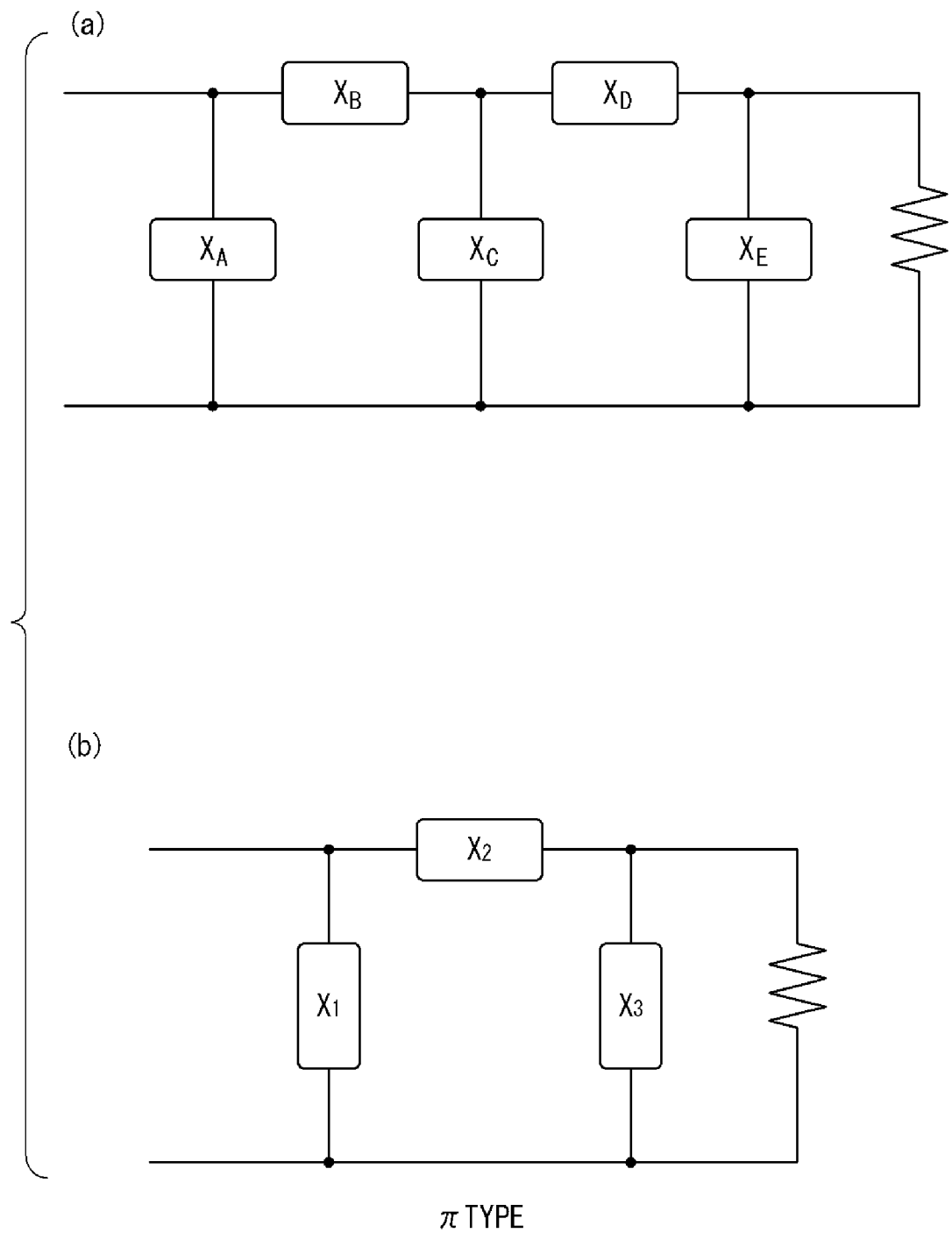
FIG. 43 is a circuit diagram in which (a) shows a second example of circuit configuration with n=5, and (b) shows a π-shaped circuit.

In FIG. 43, (a) is a diagram showing a second example of circuit configuration with n=5. To describe in words, in the case where reactances of the five reactance elements are $X_A$, $X_B$, $X_C$, $X_D$, and $X_E$, a two-terminal pair circuit is composed of, starting from the input side, $X_A$ present between two lines of the two-terminal pair circuit, $X_B$ present on one line thereof, $X_C$ present between the two lines, $X_D$ present on the one line, and $X_E$ present between the two lines.

On the other hand, in FIG. 43, (b) shows a π-shaped circuit. In this π-shaped circuit, the input impedance $Z_{in}$ is represented as the upper part of the following expression, and in order to cause the imaginary number component to be 0, a parameter condition shown as the lower part needs to be satisfied.

$$Z_{in} = \frac{RX_1(X_2+X_3) + jX_1X_2X_3}{X_3(X_1+X_2) - jR(X_1+X_2+X_3)}$$
$$= \frac{X_1^2}{R}, (X_1 = X_3 = -X_2)$$

In the case of π-shaped circuit, since R is present in the denominator, an LILT is not obtained. However, if the n-shaped circuit is configured in a two-stage form, $Z_{in}$=k·R is satisfied, and thus output voltage proportional to input voltage is obtained. Considering this, in the case where reactances of the five reactance elements in the circuit shown in (a) of FIG. 43 are $X_A$, $X_B$, $X_C$, $X_D$, and $X_E$, the two-terminal pair circuit composed of, starting from the input side, $X_A$ present between two lines of the two-terminal pair circuit, $X_B$ present on one line thereof, $X_C$ present between the two lines, $X_D$ present on the one line, and $X_E$ present between the two lines, is set to satisfy the following relationship.

$$X_A = -X_B \wedge X_E = -X_D \wedge X_C = X_A \cdot X_E/(X_A + X_E)$$

In this case, the input impedance $Z_{in}$ is represented as $Z_{in} = (X_A^2/X_E^2) \cdot R$, and is proportional to the resistance value R of the load, and thus output voltage proportional to input voltage is obtained.

Also for this LILT circuit, similarly, by combination with the transformer 1, it becomes possible to design the voltage transformation ratio in a wide range.

<<n=6 (T at Front Stage and π at Rear Stage)>>

Next, the circuit configuration with the element number n=6 will be described. Although the element number increases by two from the case of n=4, this circuit configuration is practical.

Figure 44:
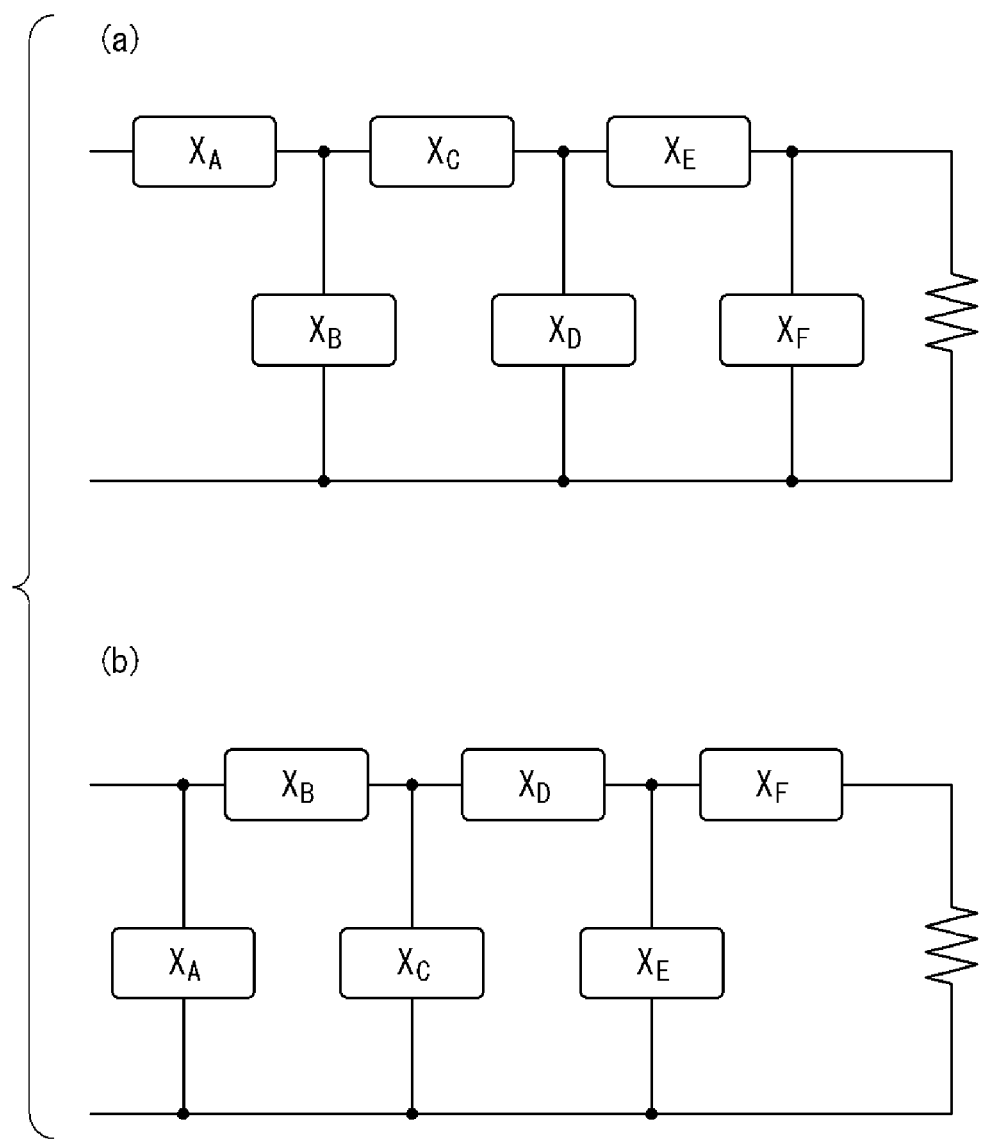
FIG. 44 is a circuit diagram in which (a) shows a first example of circuit configuration with n=6, and (b) shows a second example of circuit configuration with n=6.

In FIG. 44, (a) is a diagram showing a first example of circuit configuration with n=6. To describe in words, in the case where reactances of the six reactance elements are $X_A$, $X_B$, $X_C$, $X_D$, $X_E$, and $X_F$, a two-terminal pair circuit is composed of, starting from the input side, $X_A$ present on one line of the two-terminal pair circuit, $X_B$ present between two lines thereof, $X_C$ present on the one line, $X_D$ present between the two lines, $X_E$ present on the one line, and $X_F$ present between the two lines.

As described above, in either case of T-shaped circuit or π-shaped circuit, since R is present in the denominator, an LILT is not obtained. However, if the T-shaped circuit and the π-shaped circuit are combined, $Z_{in}$=k·R is satisfied, and thus output voltage proportional to input voltage is obtained. Considering this, in the case where reactances of the six reactance elements in the circuit shown in (a) of FIG. 44 are $X_A$, $X_B$, $X_C$, $X_D$, $X_E$, and $X_F$, the two-terminal pair circuit composed of, starting from the input side, $X_A$ present on one line of the two-terminal pair circuit, $X_B$ present between two lines thereof, $X_C$ present on the one line, $X_D$ present between the two lines, $X_E$ present on the one line, and $X_F$ present between the two lines, is set to satisfy the following relationship.

$$X_A = X_C = -X_B \wedge X_D = X_F = -X_E$$

In this case, the input impedance $Z_{in}$ is represented as $Z_{in} = (X_A^2/X_F^2) \cdot R$, and is proportional to the resistance value R of the load, and thus output voltage proportional to input voltage is obtained.

Also for this LILT circuit, similarly, by combination with the transformer 1, it becomes possible to design the voltage transformation ratio in a wide range.

<<n=6 (π at Front Stage and T at Rear Stage)>>

In FIG. 44, (b) is a diagram showing a second example of circuit configuration with n=6. To describe in words, in the case where reactances of the six reactance elements are $X_A$, $X_B$, $X_C$, $X_D$, $X_E$, and $X_F$, a two-terminal pair circuit is composed of, starting from the input side, $X_A$ present between two lines of the two-terminal pair circuit, $X_B$ present on one line thereof, $X_C$ present between the two lines, $X_D$ present on the one line, $X_E$ present between the two lines, and $X_F$ present on the one line.

As described above, in either case of π-shaped circuit or T-shaped circuit, since R is present in the denominator, an LILT is not obtained. However, if the π-shaped circuit and the T-shaped circuit are combined, $Z_{in}$=k·R is satisfied, and thus output voltage proportional to input voltage is obtained. Considering this, in the case where reactances of the six reactance elements in the circuit shown in (b) of FIG. 44 are $X_A$, $X_B$, $X_C$, $X_D$, $X_E$, and $X_F$, the two-terminal pair circuit composed of, starting from the input side, $X_A$ present between two lines of the two-terminal pair circuit, $X_B$ present on one line thereof, $X_C$ present between the two lines, $X_D$ present on the one line, $X_E$ present between the two lines, and $X_F$ present on the one line, is set to satisfy the following relationship.

$$X_A = X_C = -X_B \wedge X_D = X_F = -X_E$$

In this case, the input impedance $Z_{in}$ is represented as $Z_{in} = (X_A^2/X_F^2) \cdot R$, and is proportional to the resistance value R of the load, and thus output voltage proportional to input voltage is obtained.

Also for this LILT circuit, similarly, by combination with the transformer 1, it becomes possible to design the voltage transformation ratio in a wide range.

<<Others>>

In FIGS. 1 to 41, a capacitance of a cable and an inductance of a cable may be used as the reactance elements.

In this case, there is an advantage that the cable can easily ensure voltage withstanding performance and the cost thereof is low.

It is noted that the embodiments disclosed herein are merely illustrative in all aspects and should not be recognized as being restrictive. The scope of the present invention is defined by the scope of the claims, and is intended to include meaning equivalent to the scope of the claims and all modifications within the scope.

REFERENCE SIGNS LIST

1 transformer
1*f* front stage circuit
1*r* rear stage circuit
2 AC power supply
3 switching control section
4 switch device
10 photovoltaic panel
11, 12, 13 string
14 measurement device
15, 16, 17 current sensor
18 power conditioner
100 transformer
101 first converter
102 second converter
200 transformer
C1 to C6, CX, C21 capacitor L1 to L6 inductor
$S_{b1}$ to $S_{b4}$ switch
$S_{r1}$ to $S_{r4}$ switch
M1, M2 connection point
P1 to P8 port
PL power line
PL1, PL2, PL3 output power line
R load

The invention claimed is:

1. A transformer provided between a power supply and a load to execute voltage transformation from AC to AC, the transformer not having a core and windings, the transformer comprising:
 a front stage circuit having input ports (P1 and P2) on a front end side connected to the power supply, and output ports (P3 and P4) on a rear end side; and
 a rear stage circuit having output ports (P7 and P8) on a rear end side connected to the load, and input ports (P5 and P6) on a front end side, wherein
as the front stage circuit, one of the following (F1) to (F5):
 (F1) a front stage circuit in which both ends of a series unit composed of a pair of capacitors connected in series to each other via a capacitor connection point are respectively connected to the input port P1 and the input port P2, the capacitor connection point being connected to the output port P4, and in which a first switch provided between the input port P1 and the output port P3, and a second switch provided between the input port P2 and the output port P3 are alternately turned on through switching;
 (F2) a front stage circuit including a plurality of units each of which is obtained by interposing a capacitor on a line directly connected to the output port P3 in the front stage circuit of (F1), the input ports P1 and P2 of the plurality of units being connected in series to each other, the output ports P3 and P4 of the plurality of units being connected in parallel to each other;
 (F3) a front stage circuit in which both ends of a series unit composed of a pair of inductors connected in series to each other via an inductor connection point are respectively connected to the output port P3 and the output port P4, the inductor connection point being connected to the input port P2, and in which a first switch provided between the input port P1 and the output port P3, and a second switch provided between the input port P1 and the output port P4 are alternately turned on through switching;
 (F4) a front stage circuit including a plurality of units each of which is obtained by interposing an inductor on a line directly connected to the input port PI in the front stage circuit of (F3), the input ports PI and P2 of the plurality of units being connected in parallel to each other, the output ports P3 and P4 of the plurality of units being connected in series to each other; and
 (F5) a front stage circuit configured to be a full-bridge circuit with four switches so as to receive input through the input ports P1 and P2 and perform output through the output ports P3 and P4, and
as the rear stage circuit, one of the following (R1) to (R5):
 (R1) a rear stage circuit in which both ends of a series unit composed of a pair of inductors connected in series to each other via an inductor connection point are respectively connected to the input port P5 and the input port P6, the inductor connection point being connected to the output port P8, and in which a first switch provided between the input port P5 and the output port P7, and a second switch provided between the input port P6 and the output port P7 are alternately turned on through switching;
 (R2) a rear stage circuit including a plurality of units each of which is obtained by interposing an inductor on a line directly connected to the output port P7 in the rear stage circuit of (R1), the input ports P5 and P6 of the plurality of units being connected in series to each other, the output ports P7 and P8 of the plurality of units being connected in parallel to each other;
 (R3) a rear stage circuit in which both ends of a series unit composed of a pair of capacitors connected in series to each other via a capacitor connection point are respectively connected to the output port P7 and the output port P8, the capacitor connection point being connected to the input port P6, and in which a first switch provided between the input port P5 and the output port P7, and a second switch provided between the input port P5 and the output port P8 are alternately turned on through switching;
 (R4) a rear stage circuit including a plurality of units each of which is obtained by interposing a capacitor on a line directly connected to the input port P5 in the rear stage circuit of (R3), the input ports P5 and P6 of the plurality of units being connected in parallel to each other, the output ports P7 and P8 of the plurality of units being connected in series to each other; and
 (R5) a rear stage circuit configured to be a full-bridge circuit with four switches so as to receive input through the input ports P5 and P6 and perform output through the output ports P7 and P8,
wherein one of the front stage circuits (F1) to (F5) and one of the rear stage circuits (R1) to (R5) are directly combined with each other, excluding a combination that the front stage circuit is (F5) and the rear stage circuit is (R5), to thereby execute simultaneous voltage transformation of AC to AC at the front stage circuit and AC to AC at the rear stage circuit, and a voltage transformation ratio is derived from a combination of the front stage circuit and the rear stage circuit, and,
the voltage transformation is executed irrespective of polarity of AC voltage given from the power supply, and
on-time period of any one of the first switch and the second switch in case of (F1) to (F4) or any two of the switches in case of (F5) in regard to the front stage circuit and
on-time period of any one of the first switch and the second switch in case of (R1) to (R4) or any two of the switches in case of (R5) in regard to the rear stage circuit are synchronized with each other, whereas
there is no time period when both the first switch and the second switch are simultaneously turned on within any one of the front stage circuit and the rear stage circuit.

2. The transformer according to claim 1, wherein
the series unit is a series unit of a pair of inductors, and $2\pi f_o L \ll R \ll 2\pi fsL$ is satisfied,
where $f_o$ is a frequency of the power supply, fs is a switching frequency, L is an inductance value of any of the inductors, and R is a resistance value of the load.

3. The transformer according to claim 1, wherein
the series unit is a series unit of a pair of capacitors, and $1/(2\pi fsC) \ll R \ll 1/(2\pi f_o C)$ is satisfied,
where $f_o$ is a frequency of the power supply, fs is a switching frequency, C is a capacitance value of any of the capacitors, and R is a resistance value of the load.

4. The transformer according to claim 1, wherein
in a circuit in which the series unit is provided, a capacitor is interposed on an output line that is not linked to the connection point of the series unit.

5. The transformer according to claim 1, wherein
a distributed constant circuit is interposed between the front stage circuit and the rear stage circuit, and
in the case where a frequency of output of the front stage circuit is f and a wavelength at the frequency f is $\lambda$, the distributed constant circuit includes a first converter with a length of $\lambda/4$, and a second converter with a length of $\lambda/4$ provided between an end of the first converter and the rear stage circuit.

6. The transformer according to claim 1, wherein
a two-terminal pair circuit is interposed between the front stage circuit and the rear stage circuit, the two-terminal pair circuit being composed of n-number of reactance elements that are mutually connected, where n is a natural number equal to or greater than 4, and
with respect to any value of a resistance value R of the load, an input impedance Zin of the two-terminal pair circuit has a real number component of k·R, where k is a constant, and an imaginary number component of 0.

7. A transformer comprising a plurality of the transformers according to claim 1, the plurality of transformers being connected in cascade.

8. The transformer according to claim 1, wherein
a capacitance and an inductance of a cable are used as a capacitor, an inductor, or a reactance element.

9. A transformer provided between a power supply and a load, the transformer not having a core and windings, the transformer comprising a front stage circuit and a rear stage circuit directly connected with the front stage circuit, each of the front stage circuit and the rear stage circuit having a circuit which generates an output with an alternately inverted polarity through switching by a plurality of switches to thereby execute simultaneous voltage transformation of AC to AC at the front stage circuit and AC to AC at the rear stage circuit, at least one of the front stage circuit and the rear stage circuit including:
a series unit composed of a pair of reactance elements connected in series to each other via a connection point as a reactance-element connection point; and
a switch device including a pair of switches alternately turned on by switching and connected in series with each other via a connection point of the switches as a switch-connection point, in which both ends of the series unit serve as a first port while an electric path coming from the switch-connection point and an electric path coming from the reactance-element connection point serve as a second port, the switch device executing one of power transmission from the first port to the second port, and power transmission from the second port to the first port, wherein
the voltage transformation is executed irrespective of polarity of AC voltage given from the power supply,
a voltage transformation ratio is derived from a combination of the front stage circuit and the rear stage circuit, and,
during the power transmission being executed, an on-time period of any one of the switches in the front stage circuit is synchronized with an on-time period of any one of the switches in the rear stage circuit, whereas the switch device has no time period when the pair of switches are simultaneously turned on within any one of the front stage circuit and the rear stage circuit.

10. The transformer according to claim 9, wherein
the series unit is a series unit of a pair of inductors, and $2\pi f_o L \ll R \ll 2\pi fsL$ is satisfied,
where $f_o$ is a frequency of the power supply, fs is a switching frequency, L is an inductance value of any of the inductors, and R is a resistance value of the load.

11. The transformer according to claim 9, wherein
the series unit is a series unit of a pair of capacitors, and $1/(2\pi fsC) \ll R \ll 1/(2\pi f_o C)$ is satisfied,
where $f_o$ is a frequency of the power supply, fs is a switching frequency, C is a capacitance value of any of the capacitors, and R is a resistance value of the load.

12. The transformer according to claim 9, wherein
in a circuit in which the series unit is provided, a capacitor is interposed on an output line that is not linked to the connection point of the series unit.

13. The transformer according to claim 9, wherein
a distributed constant circuit is interposed between the front stage circuit and the rear stage circuit, and
in the case where a frequency of output of the front stage circuit is f and a wavelength at the frequency f is $\lambda$, the distributed constant circuit includes a first converter with a length of $\lambda/4$, and a second converter with a length of $\lambda/4$ provided between an end of the first converter and the rear stage circuit.

14. The transformer according to claim 9, wherein
a two-terminal pair circuit is interposed between the front stage circuit and the rear stage circuit, the two-terminal pair circuit being composed of n-number of reactance elements that are mutually connected, where n is a natural number equal to or greater than 4, and
with respect to any value of the resistance value R of the load, an input impedance Zin of the two-terminal pair circuit has a real number component of k·R, where k is a constant, and an imaginary number component of 0.

15. A transformer comprising a plurality of the transformers according to claim 9, the plurality of transformers being connected in cascade.

16. The transformer according to claim 9, wherein
a capacitance and an inductance of a cable are used as a capacitor, an inductor, or a reactance element.

* * * * *